US012026364B2

(12) United States Patent
de Vries

(10) Patent No.: US 12,026,364 B2
(45) Date of Patent: Jul. 2, 2024

(54) SYSTEMS AND METHODS FOR INTERACTING WITH USER INTERFACES

(71) Applicant: Apple Inc., Cupertino, CA (US)

(72) Inventor: Nathan de Vries, Alameda, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 17/745,782

(22) Filed: May 16, 2022

(65) Prior Publication Data

US 2022/0365669 A1    Nov. 17, 2022

Related U.S. Application Data

(60) Provisional application No. 63/189,652, filed on May 17, 2021.

(51) Int. Cl.
*G06F 3/04883* (2022.01)
*G06F 3/0482* (2013.01)
*G06F 3/0485* (2022.01)

(52) U.S. Cl.
CPC ........ *G06F 3/04883* (2013.01); *G06F 3/0482* (2013.01); *G06F 3/0485* (2013.01)

(58) Field of Classification Search
CPC ... G06F 3/04883; G06F 3/0482; G06F 3/0485
See application file for complete search history.

(56) References Cited

U.S. PATENT DOCUMENTS

2009/0228825 A1* 9/2009 Van Os ............... G06F 16/14
  715/780
2014/0365945 A1* 12/2014 Karunamuni ....... G06F 3/04883
  715/773
2018/0335920 A1* 11/2018 Tyler .................. G06F 21/36

FOREIGN PATENT DOCUMENTS

EP    3 349 105 A1    7/2018
EP    3 757 743 A1    12/2020

OTHER PUBLICATIONS

Haselton, "iPhone 12 Gestures and Hidden Menus", Jan. 23, 2021, https://www.cnbc.com/2021/01/iphone-12-gestures_and_hidden-menus.html, Jan. 23, 2021, 4 pages.

* cited by examiner

*Primary Examiner* — Stephen S Hong
*Assistant Examiner* — Darrin Hope
(74) *Attorney, Agent, or Firm* — Morgan, Lewis & Bockius LLP

(57) ABSTRACT

A device detects, while displaying a first user interface that includes a first plurality of notifications in a list of notifications, a first user input that includes a first input. In response to detecting the first user input, the device, in accordance with a determination that the first input includes a swipe input in a first direction and a determination that an end of the list of notifications has been reached, displays a search input region. In response to detecting the first user input, the device, in accordance with a determination that the first input includes the swipe input in the first direction and that an end of the list of notifications has not been reached, displays a second plurality of notifications that are between the first plurality of notifications and the end of the list of notifications.

42 Claims, 66 Drawing Sheets

6000

> 6012 The first portion of the first edge and the second portion of the first edge are operationally adjacent to each other.

> 6014 Replacing the portion of the first user interface with the first search user interface in the display region includes displaying a search input region in a respective portion of the display region and replacing the portion of the first user interface with the plurality of previously received notifications includes displaying a notification in the respective portion of the display region.

> 6016 Detecting the first touch gesture includes detecting movement of the first set of contacts from outside of the touch-sensitive surface across the first edge of the touch-sensitive surface onto the touch-sensitive surface and the first direction is substantially perpendicular to the first edge of the touch-sensitive surface.

> 6018 In response to detecting the first touch gesture, in accordance with a determination that the first touch gesture meets third criteria, where the third criteria include a third requirement that is met in accordance with a determination that the first touch gesture includes third movement of the first contact across the touch-sensitive surface in the first direction and a determination that third movement begins in a first interior portion of the touch-sensitive surface that is outside of the first portion and the second portion of the first edge and positioned away from the first edge, replace the at least a portion of the first user interface with the first search user interface in the display region.

6020 In response to detecting the first touch gesture, in accordance with a determination that the first touch gesture meets fourth criteria, wherein the fourth criteria include a fourth requirement that is met in accordance with a determination that the first touch gesture includes fourth movement of the first contact across a third portion of the first edge of the touch-sensitive surface, different from the first portion and the second portion of the first edge of the touch-sensitive surface in the first direction, replace the at least a portion of the first user interface with a control panel user interface. The control panel user interface includes a plurality of user interface objects corresponding to different device control functions.

---

6022 The first criteria and the second criteria are capable of being met while displaying an application user interface.

---

6024 The first criteria and the second criteria are capable of being met while displaying a home screen user interface that includes a plurality of application icons corresponding to different applications. A respective application icon of the plurality of application icons, when activated in accordance with preset criteria, causes display of a respective application of the different applications that corresponds to the respective application icon.

---

6026 The first criteria and the second criteria are capable of being met while displaying a wake screen that is displayed in response to detecting a request to wake the display generation component from a low power mode.

---

6028 The first criteria and the second criteria are capable of being met while displaying a cover screen user interface that covers a currently displayed user interface in a plurality of contexts in response to a preset touch gesture. The currently displayed user interface is redisplayed when the cover screen user interface is dismissed.

> 6030 In response to detecting the first touch gesture, in accordance with a determination that the first touch gesture meets fifth criteria, where the fifth criteria include a fifth requirement that is met in accordance with a determination that the first touch gesture includes fifth movement of a preset number of concurrently detected contacts across the touch-sensitive surface in the first direction that begins in a respective portion of the touch-sensitive surface that is different from the first portion and the second portion of the first edge of the touch-sensitive surface, replace the at least a portion of the first user interface with the first search input region on the display region.

> 6032 In response to detecting the first touch gesture, in accordance with a determination that the first touch gesture meets sixth criteria, wherein the sixth criteria include a sixth requirement that is met in accordance with a determination that the first touch gesture includes sixth movement of the preset number of concurrently detected contacts across the touch-sensitive surface in a second direction, different from the first direction, replace display of the first user interface with display of application selection user interface including a plurality of representations of recently open applications. A respective representation of the plurality of representations, when activated in accordance with preset criteria, causes redisplay of a respective application of the recently open applications that corresponds to the respective representation.

6034 In response to detecting the first touch gesture, in accordance with a determination that the first touch gesture meets seventh criteria, where the seventh criteria include a requirement that is met in accordance with a determination that the first touch gesture includes seventh movement of the preset number of concurrently detected contacts across the touch-sensitive surface in a second direction, different from the first direction, replace display of the first user interface with display of a home screen user interface. The home screen user interface includes a plurality of application icons corresponding to different applications. A respective application icon, when activated in accordance with present criteria, causes display of a respective application of the different applications that corresponds to the respective application icon.

---

6036 In response to detecting the first touch gesture, in accordance with a determination that the first touch gesture meets eighth criteria, where the eighth criteria include a eighth requirement that is met in accordance with a determination that the first touch gesture includes eighth movement of the preset number of concurrently detected contacts across the touch-sensitive surface in a third direction, different from the first direction and the second direction, replace display the user interface of the first application with a second user interface. The second user interface is a user interface of a recently open application.

---

6038 In response to detecting the first touch gesture, in accordance with a determination that the first touch gesture meets nineth criteria, where the nineth criteria includes a nineth requirement that is met in accordance with a determination that the first touch gesture includes nineth movement of the first contact in the first direction that begins in a third interior portion of the touch-sensitive surface that is outside of the first portion and the second portion of the first edge and positioned away from the first edge and a determination that the first user interface is a wake screen user interface or a cover screen user interface, replace the at least a portion of the first user interface with the first search input region on the display region provided by the display generation component.

6040 The first user interface includes a plurality of notifications. In response to detecting the first touch gesture, in accordance with a determination that the first touch gesture includes tenth movement of the first contact across the touch-sensitive surface and the tenth movement begins in a fourth interior portion of the touch-sensitive surface: In accordance with a determination that an end of the plurality of notifications has been reached in the display region provided by the display generation component in accordance with a movement direction of the tenth movement of the first contact, replace display of the at least a portion of the first user interface with the first search input region. In accordance with a determination that the end of the plurality of notifications has not been reached in the display region provided by the display generation component in accordance with the movement direction of the tenth movement of the first contact, scroll the plurality of notifications in accordance with the tenth movement of the first contact.

6042 While displaying the first user interface, detect a second touch gesture that includes movement of a second set of contacts on the touch-sensitive surface. In response to detecting the second touch gesture, in accordance with a determination that the second touch gesture meets eleventh criteria, wherein the eleventh criteria include eleventh requirement that is met in accordance with a determination that the second touch gesture includes eleventh movement of a second contact across a second edge, distinct from the first edge, of the touch-sensitive surface, replace display of the first user interface with a second user interface distinct from the first user interface.

6044 While displaying a second user interface, detect a third touch gesture that includes detecting a third set of contacts on the touch-sensitive surface. In response to detecting the third touch gesture, in accordance with a determination that the third touch gesture meets either the first criteria, or additional preset criteria different from the first criteria, replace at least a portion of the second user interface with the first search user interface in the display region.

6102 Display, via the display generation component, a first user interface. The first user interface includes a first plurality of notifications in a list of notifications.

6104 While displaying the first user interface, detect a first user input that includes a first input.

6106 In response to detecting the first user input:

6108 In accordance with a determination that the first input includes a swipe input in a first direction and a determination that an end of the list of notifications has been reached, display a search input region.

6110 In accordance with a determination that the first input includes the swipe input in the first direction and that an end of the list of notifications has not been reached, display a second plurality of notifications that are between the first plurality of notifications and the end of the list of notifications.

6112 In response to detecting the first user input, in accordance with a determination that the first input includes a swipe input in a second direction that is different from the first direction, display a plurality of previously received notifications in the first user interface. The plurality of previously received notification include notifications that are not in the first plurality of notifications in the list of notifications.

---

6114 The first user interface is a wake screen user interface that is displayed in response to detecting a request to wake the display generation component from a low power mode.

6116 The wake screen user interface includes a first region that displays notifications, including the first plurality of notifications.

6118 The wake screen user interface includes a second region that displays stored notification history.

6120 The wake screen user interface includes a user interface object that displays a current time.

6122 In response to detecting the first user input, cease to display one or more user interface objects of the wake screen user interface.

6124 In response to detecting the first user input, in accordance with the determination that the first input includes the swipe input in the first direction and that the end of the list of notifications has not been reached, cease to display one or more notifications of the first plurality of notification in the list of notifications.

6126 In response to detecting the first user input, in accordance with the determination that the first input includes the swipe input in the first direction and that the end of the list of notifications has been reached, display, concurrently with displaying the search input region, a keyboard for entering search input into the search input region.

6128 In response to detecting the first user input, in accordance with the determination that the first input includes the swipe input in the first direction and that the end of the list of notifications has been reached, display, concurrently with displaying the search input region, one or more suggested searches.

6130 Detect a second user input that includes a second input moving across the touch-sensitive surface. In response to detecting the second user input, in accordance with a determination that the second input includes a swipe input in a second direction that is different from the first direction, scroll through notifications in the list of notifications in accordance with the movement of the second contact in the second direction.

6132 The second user input is detected after detection of the first user input, and while the search input region is displayed as a result of the first user input.

6134 Prior to detecting the first user input, detect a third user input that includes a third input moving across the touch-sensitive surface. In response to detecting the third user input, in accordance with a determination that the third input includes a swipe input in a second direction that is different from the first direction, scroll through the list of notification in accordance with the first direction to reveal the plurality of notifications in the first user interface.

6136 While the second plurality of notifications is displayed, detect a fourth user input that includes a fourth moving across the touch-sensitive surface. In response to detecting the fourth user input, in accordance with a determination that the fourth input includes a swipe input in the first direction and a determination that an end of the list of notifications has been reached, display a search input region. In accordance with a determination that the fourth input includes a swipe input in the first direction and that an end of the list of notifications has not been reached, display a third plurality of notifications that are between the second plurality of notifications and the end of the list of notifications.

Figure 6J

SYSTEMS AND METHODS FOR INTERACTING WITH USER INTERFACES

RELATED APPLICATIONS

This application claims priority to U.S. Provisional Patent Application No. 63/189,652, filed May 17, 2021, which is hereby incorporated by reference in its entirety.

TECHNICAL FIELD

This disclosure relates generally to electronic devices with touch-sensitive surfaces, including but not limited to electronic devices with touch-sensitive surfaces that provide functionality through graphical user interfaces, and more particularly, to devices and methods for displaying a search user interface in accordance with user interaction.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to select, launch, and manage software applications.

For portable electronic devices, existing methods for searching and accessing content and/or applications of interest is inefficient and cumbersome. For example, portable devices with small screens (e.g., smart phones and other pocket-sized devices) typically display a single application at a time. With such devices, locating desired content in an application or desired functions within an application without precise knowledge of their whereabouts on the device is difficult and may take multiple steps and multiple inputs from the user. This situation creates a significant cognitive burden on a user when searching for content and/or applications of interest on the device. In addition, existing methods for searching and accessing content take longer than necessary, which frustrates the user experience and consumes more energy. This latter consideration is exacerbated in battery-operated devices.

SUMMARY

Accordingly, there is a need for computing devices with faster, more efficient methods and interfaces for searching and accessing content and applications on portable electronic devices. Such methods and interfaces may complement or replace conventional methods for searching and accessing content and applications. Such methods and interfaces may reduce the cognitive burden on a user and produce a more efficient human-machine interface. For battery-operated computing devices, such methods and interfaces conserve power and increase the time between battery charges.

An electronic device with a display generation component and a touch-sensitive surface displays a first user interface in a display region. While displaying the first user interface, the device detects a first touch gesture that includes detecting a first set of one or more contacts on the touch-sensitive surface. In response to detecting the first touch gesture and in accordance with a determination that the first touch gesture meets first criteria, the device replaces at least a portion of the first user interface with a first search user interface in the display region. The first criteria include a first requirement that is met in accordance with a determination that the first touch gesture includes first movement of a first contact across a first portion of a first edge of the touch-sensitive surface in a first direction. In accordance with a determination that the first touch gesture meets second criteria different from the first criteria, the device replaces at least a portion of the first user interface with a plurality of previously received notifications in the display region. The second criteria include a second requirement that is met in accordance with a determination that the first touch gesture includes second movement of the first contact across a second portion of the first edge of the touch-sensitive surface in the first direction. The second portion of the first edge is different from the first portion of the first edge.

In some embodiments, the first criteria and the second criteria are capable of being met while displaying a home screen of the device, an application user interface, or a wake screen user interface, or a cover sheet user interface (see, e.g., FIGS. 5A, 5R, 5U and 5X) In some embodiments, the device detects an additional touch gesture while displaying a second user interface. In accordance with a determination that the additional gesture meets the first criteria or additional preset criteria different from the first criteria, the device replaces at least a portion of the second user interface with the first search user interface. In some other embodiments, the device replaces the at least a portion of the second user interface with the first search user interface only in accordance with a determination that the additional gesture meets the first criteria.

Thus, electronic devices are provided with faster and more efficient methods for displaying a search user interface in a variety of contexts, such as over an application, home screen, wake screen, lock screen, or notification center user interface. The displayed search user interface is capable of being used to search and thereafter present search results from a variety of content sources, including webpages, documents, applications (e.g., messages, photos, calendar, contacts, etc.). The search user interface can be displayed in response to a convenient downward swipe gesture that begins from a middle portion of a top-edge of the electronic device. Furthermore, the methods further provide displaying a notification center user interface in response to a downward swipe gesture that begins from a different portion of the top-edge of the electronic device (e.g., the middle of the top edge). The user, therefore, is provided with a convenient and efficient way of displaying frequently desired user interfaces with different edge swipe gestures.

An electronic device that is in communication with a display generation component and one or more input devices displays a first user interface. The first user interface includes a first plurality of notifications in a list of notifications. While displaying the first user interface, the device detects a first user input that includes a first input. In response to detecting the first user input and in accordance with a determination that the first input includes a swipe input in a first direction and a determination that an end of the list of notifications has been reached, the device displays a search input region. In accordance with a determination that the first input includes the swipe input in the first direction and that an end of the list of notifications has not been reached, the device displays a second plurality of notifications that are between the first plurality of notifications and the end of the list of notifications.

In some embodiments, in accordance with a determination that the first input includes a swipe input in a second direction that is different from the first direction, the device displays a plurality of previously received notifications in the first user interface. The plurality of previously received notification include notifications that are not in the first plurality of notifications in the list of notifications. In some embodiments, the first user interface is a wake screen user interface that is displayed in response to detecting a request to wake the display generation component from a low power mode.

Thus, electronic devices are also provided with faster and more efficient methods for navigating between a search user interface and a notification center user interface. A user may, for example, scroll through a list of notifications including notifications generated by a plurality of applications by applying downward and upward gestures while displaying the notification center user interface. The user may further display the search user interface by applying a swipe gesture when an end of the list of notifications has been reached. The ability to navigate from the notification center user interface to the search user interface without the need for providing additional user inputs for closing and opening the respective user interfaces improves efficiency and convenience.

The methods for intuitively accessing frequently used user interfaces described herein overall reduce the cognitive burden on a user when locating content, applications, and/or notifications on an electronic device. In addition, the methods reduce the time for accessing such frequently used user interfaces thereby increasing operation time of battery-operated electronic devices between charges.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6J are flow diagrams illustrating methods of displaying a search user interface in response to user interaction, in accordance with some embodiments.

DESCRIPTION OF EMBODIMENTS

Figure 1A:
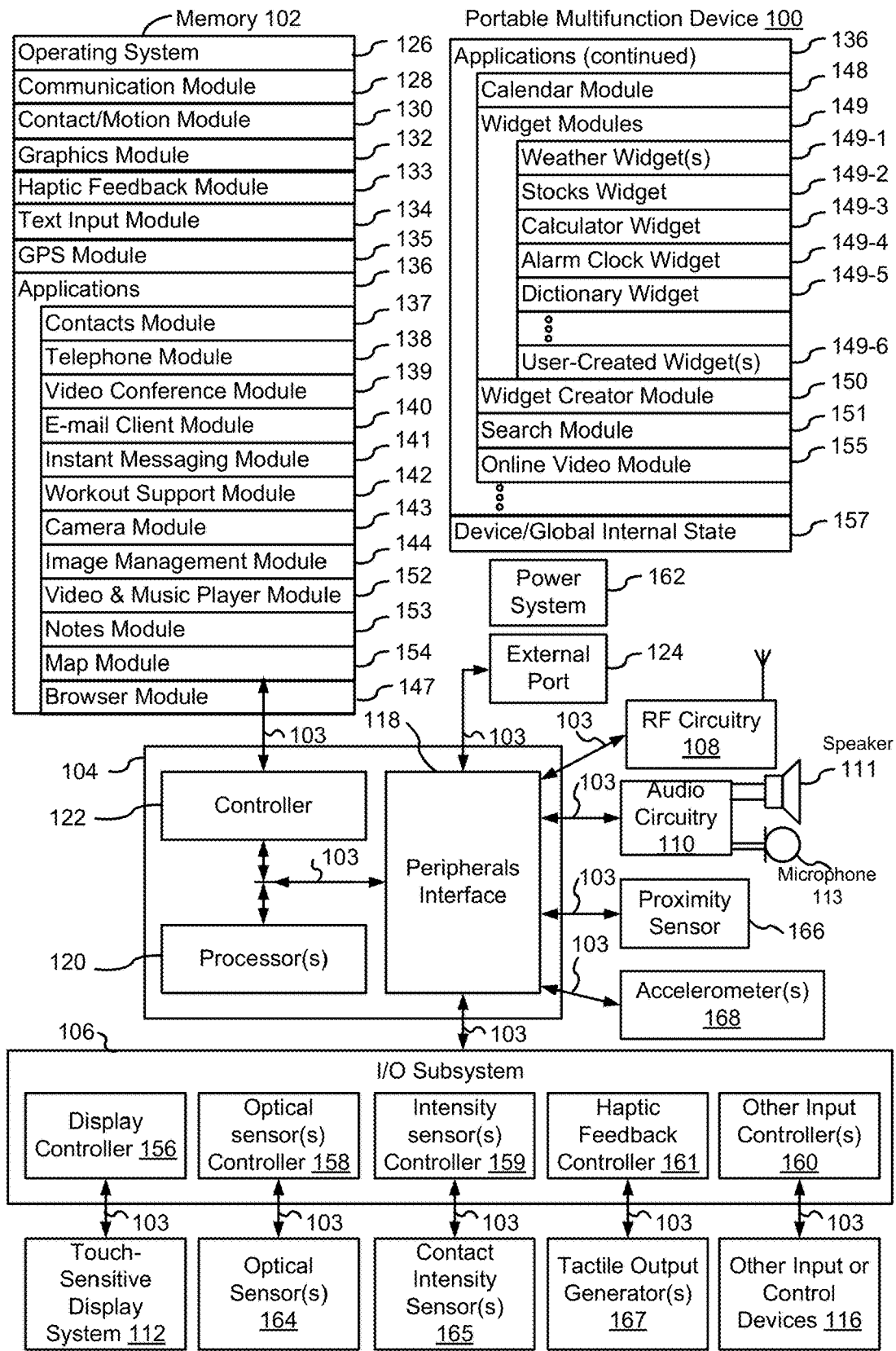
FIG. 1A is a block diagram illustrating a portable multifunction device with a touch-sensitive display in accordance with some embodiments.

The methods, devices, and GUIs described herein improve interaction and functionality of the search user interface in multiple ways.

In some embodiments, an electronic device with a display generation component and a touch-sensitive surface displays a first user interface in a display region. While displaying the first user interface, the device detects a first touch gesture that includes detecting a first set of one or more contacts on the touch-sensitive surface. In some embodiments, the first user interface is a home screen of the device, an application user interface, a wake screen user interface, or a cover sheet user interface. In response to detecting the first touch gesture and in accordance with a determination that the first touch gesture meets first criteria, the device replaces at least a portion of the first user interface with a first search user interface in the display region. The first criteria include a first requirement that is met in accordance with a determination that the first touch gesture includes first movement of a first contact across a first portion of a first edge of the touch-sensitive surface in a first direction. In some embodiments, detecting the first touch gesture includes detecting movement of the first set of one or more contacts from outside of the touch-sensitive surface across the first edge of the touch-sensitive surface onto the touch-sensitive surface. In accordance with a determination that the first touch gesture meets second criteria different from the first criteria, the device replaces at least a portion of the first user interface with a plurality of previously received notifications in the display region (e.g., a notification center user interface). The second criteria include a second requirement that is met in accordance with a determination that the first touch gesture includes second movement of the first contact across a second portion of the first edge of the touch-sensitive surface in the first direction. The second portion of the first edge is different from the first portion of the first edge. In some embodiments, the first portion and the second portion of the first edge are operationally adjacent to each other (e.g., a left portion of the first edge and a middle portion of the first edge). In some embodiments, the device further detects an additional touch gesture (e.g., a multi-contact swipe gesture or a swipe gesture that begins from a middle-portion of the touch-sensitive surface) while displaying a second user interface. In accordance with a determination that the additional gesture meets the first criteria or additional preset criteria different from the first criteria, the device replaces at least a portion of the second user interface with the first search user interface.

In some embodiments, an electronic device that is in communication with a display generation component and one or more input devices displays a first user interface (e.g., a wake screen user interface). The first user interface includes a first plurality of notifications in a list of notifications. While displaying the first user interface, the device detects a first user input that includes a first input. In response to detecting the first user input and in accordance with a determination that the first input includes a swipe input in a first direction and a determination that an end of the list of notifications has been reached, the device displays a search input region. In accordance with a determination that the first input includes the swipe input in the first direction and that an end of the list of notifications has not been reached, the device displays a second plurality of notifications that are between the first plurality of notifications and the end of the list of notifications (e.g., the device scrolls the list of notifications). In some embodiments, in accordance with a determination that the first input includes a swipe input in a second direction that is different from the first direction, the device displays a plurality of previously received notifications in the first user interface. The plurality of previously received notification include notifications that are not in the first plurality of notifications in the list of notifications.

Figure 5A:
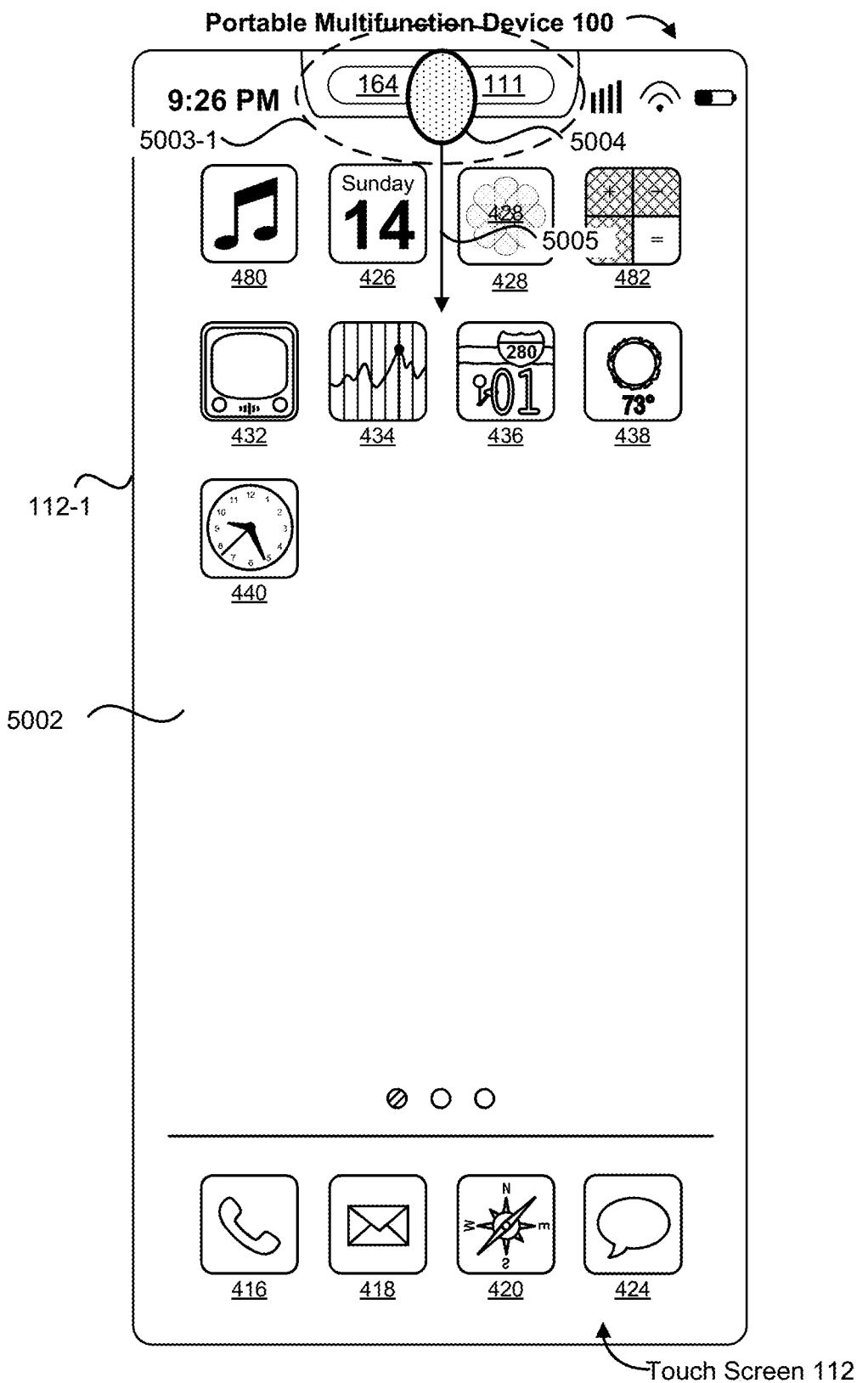
FIGS. 5A-5AX illustrate example user interactions for displaying a search user interface in a variety of contexts, in accordance with some embodiments.

Below, FIGS. 1A-1B, 2, and 3 provide a description of example devices. FIGS. 5A-5AX illustrate example user interactions for displaying a search user interface in a variety of contexts. FIGS. 6A-6J are flow diagrams illustrating methods of displaying a search user interface in response to user interaction. The user interfaces in FIGS. 5A-5AX are used to illustrate the processes in FIGS. 6A-6J.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messages application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes a contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
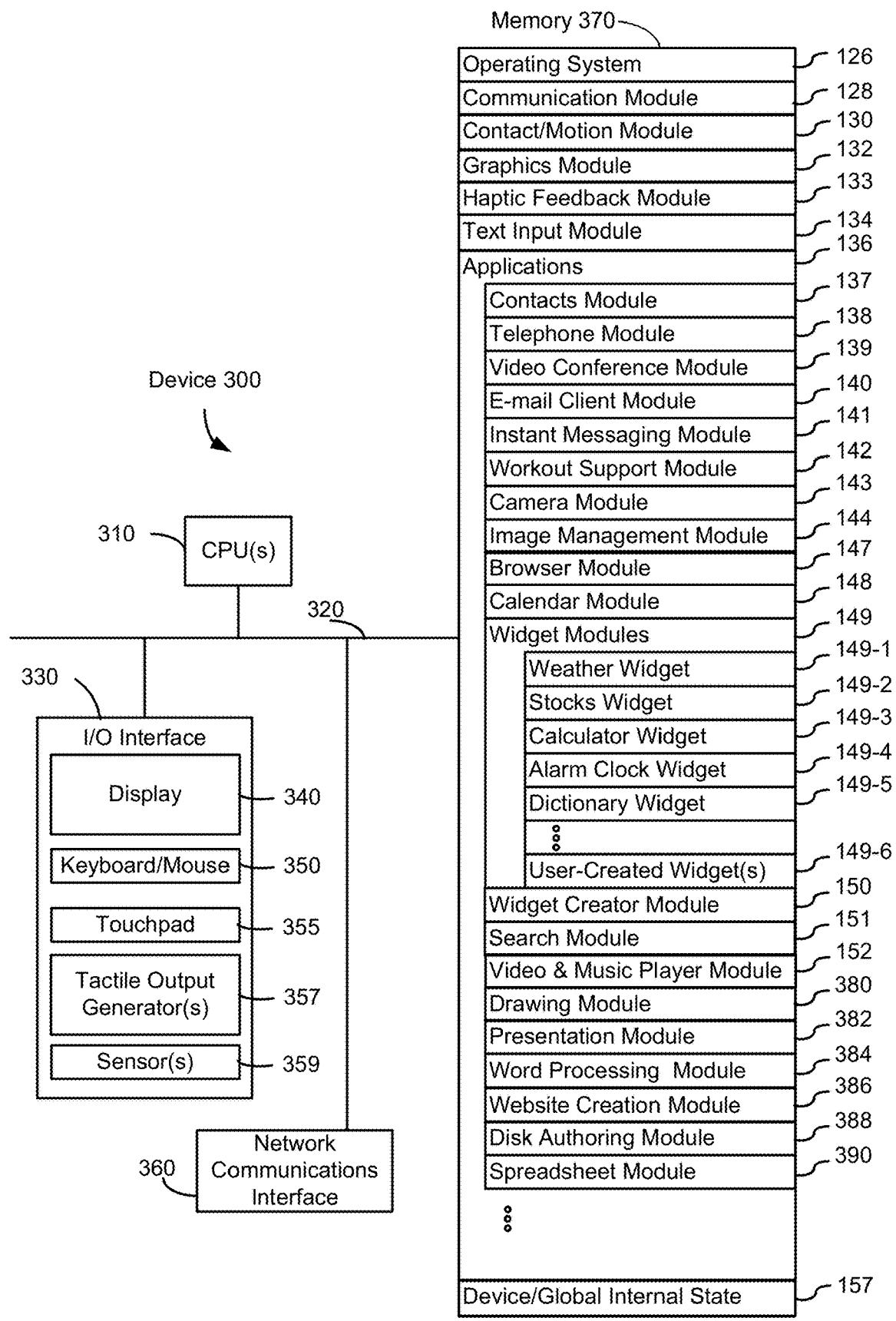
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of:

active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
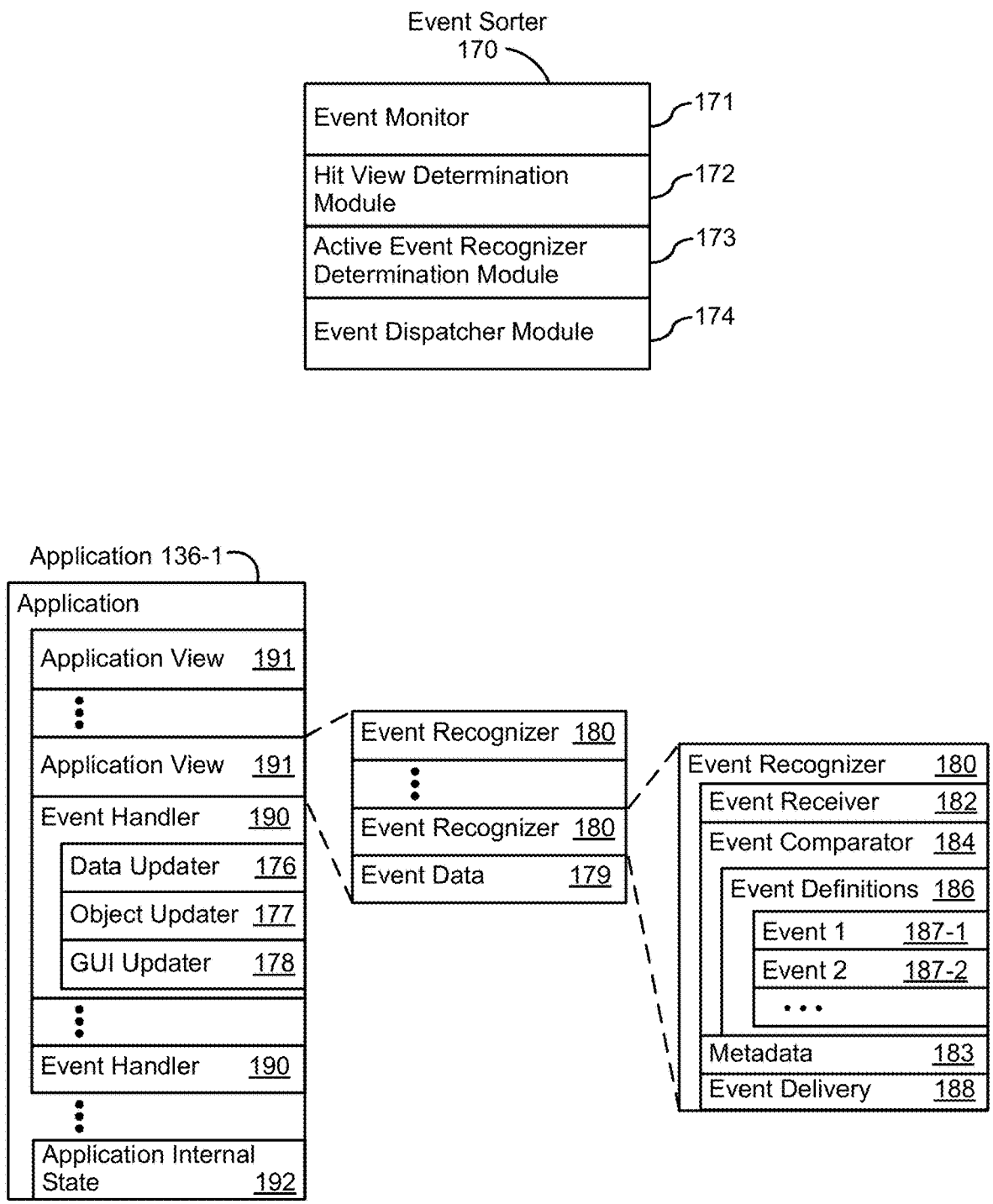
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
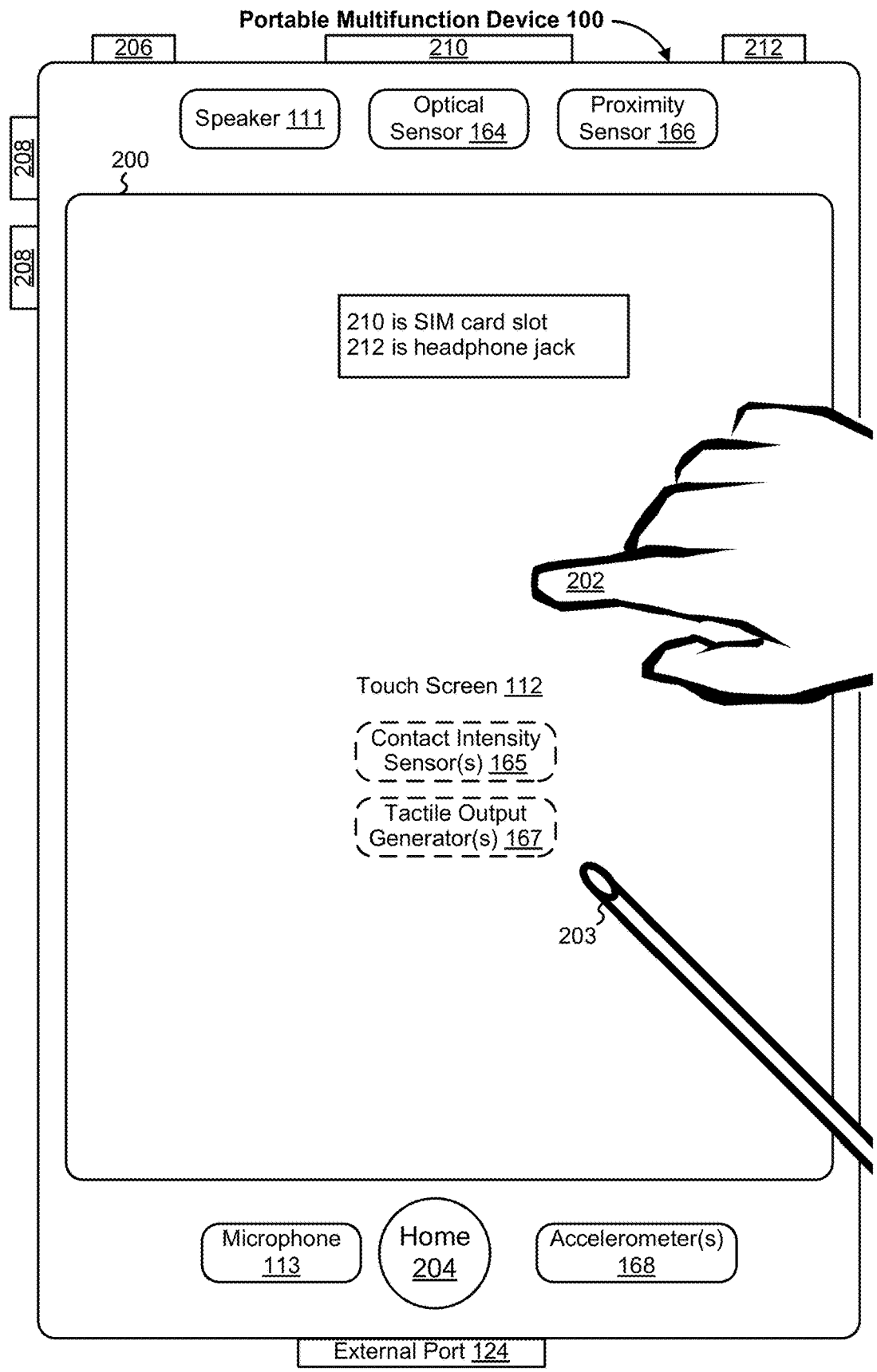
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch screen display.

In some embodiments, device 100 includes the touch screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
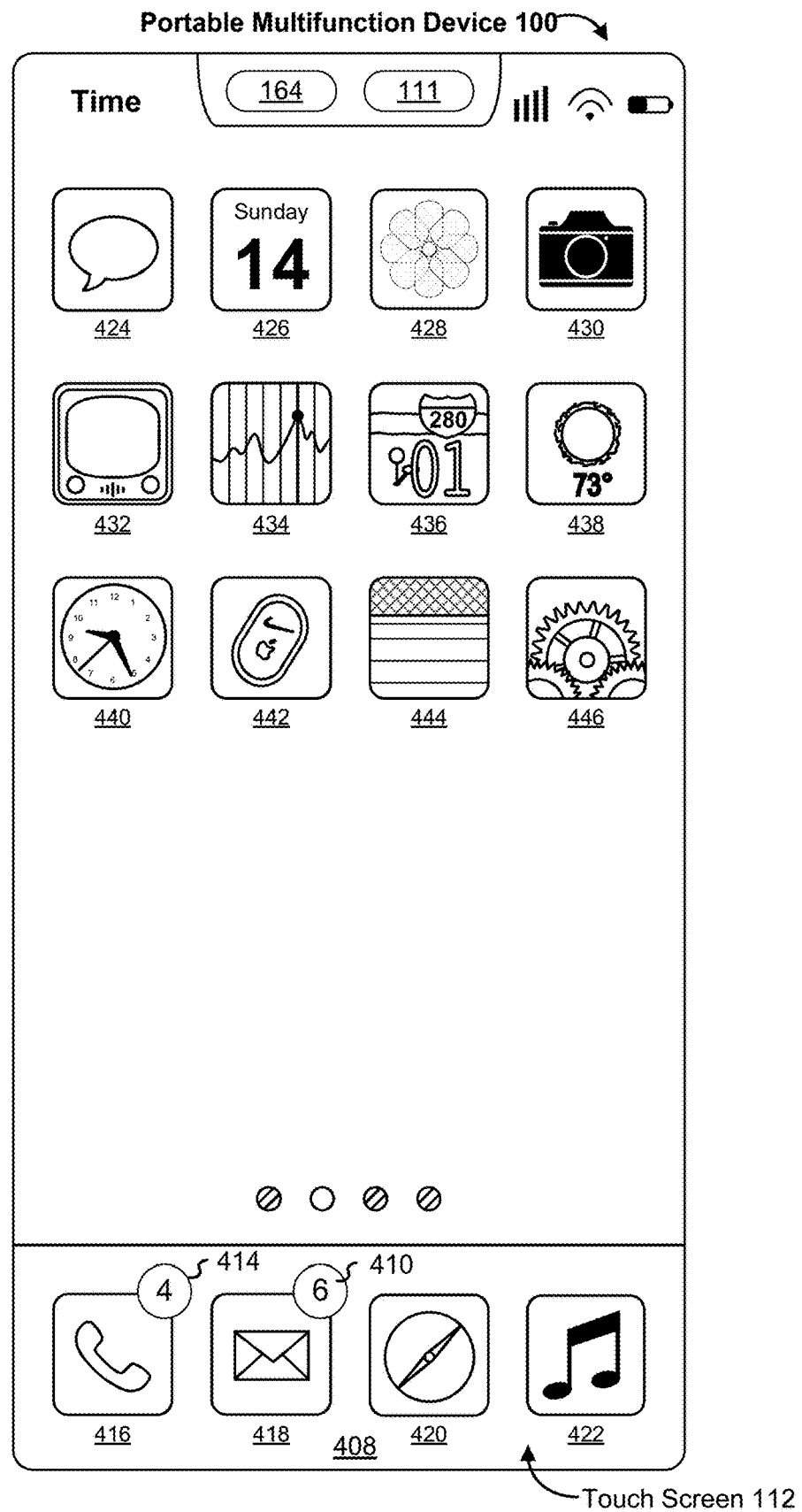
FIG. 4A illustrates an example user interface for a menu of applications on a portable multifunction device in accordance with some embodiments.

FIG. 4A illustrates an example user interface 400 for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator; Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, labeled "Music;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
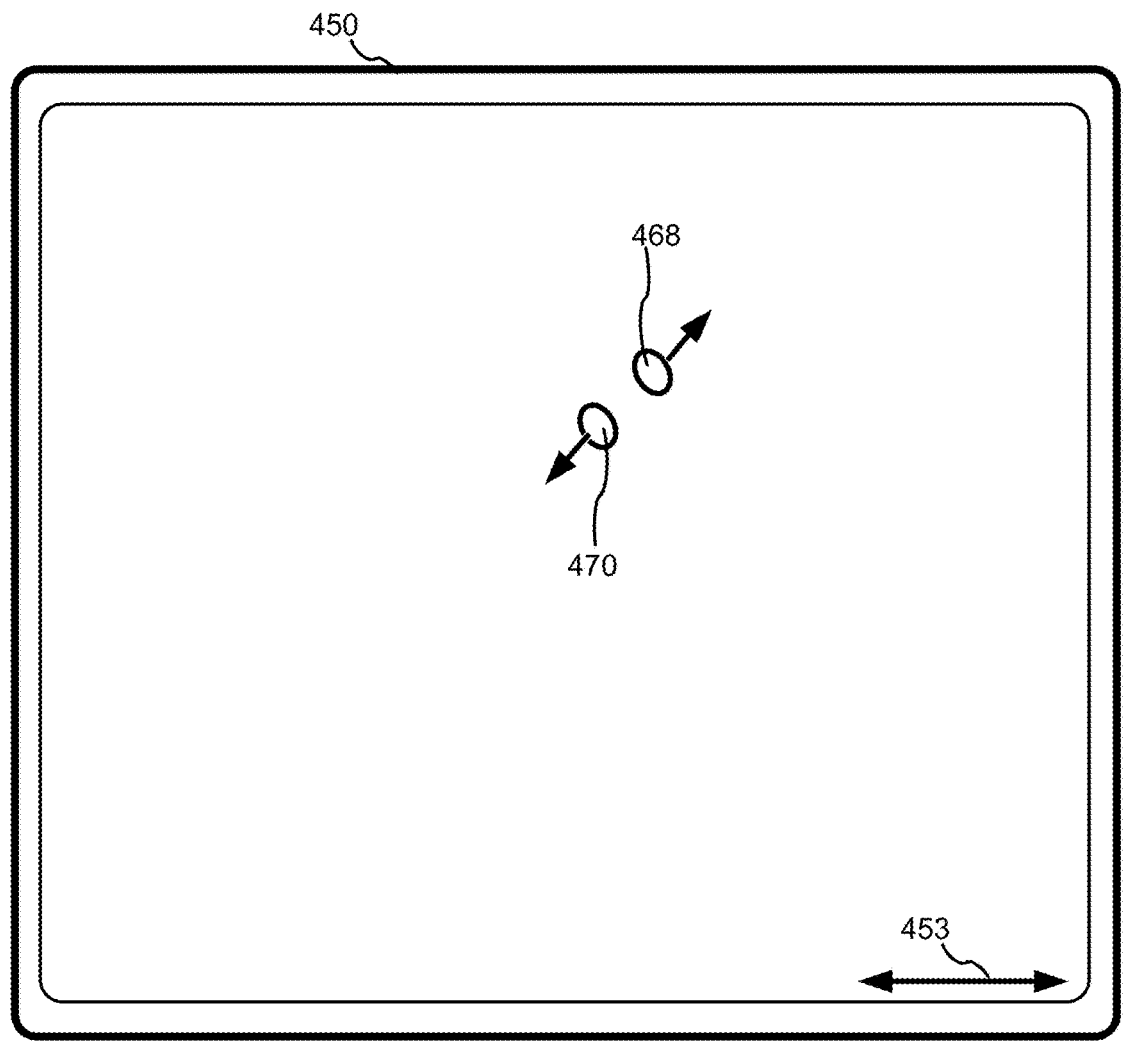
FIG. 4B illustrates an example user interface for a multifunction device with a touch-sensitive surface that is separate from the display in accordance with some embodiments.
Figure 4B:
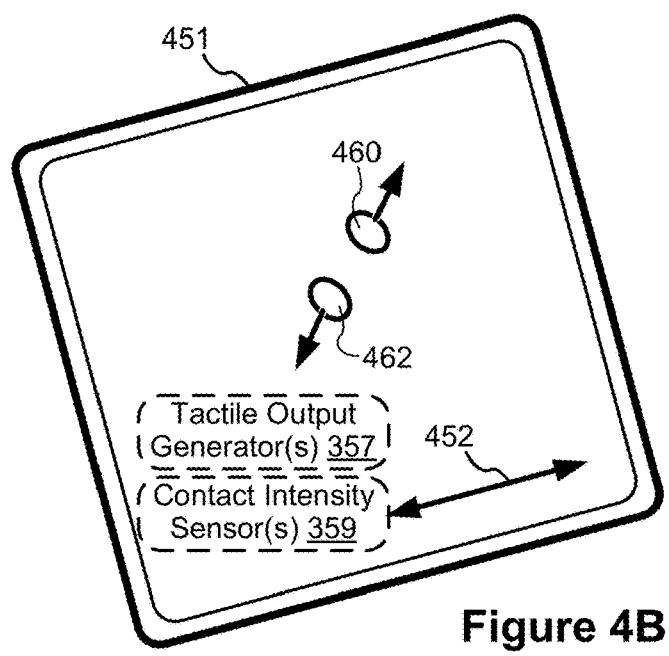

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or the touch screen in FIG. 4A) that enables direct interaction with user interface elements on the touch screen display, a detected contact on the touch screen acts as a "focus selector," so that when an input (e.g., a press input by the contact) is detected on the touch screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting lift-off of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

User Interfaces and Associated Processes

Attention is now directed towards embodiments of user interfaces ("UI") and associated processes that may be implemented on an electronic device, such as portable multifunction device 100 or device 300 (shown in FIGS. 1A, 2, 3, 4A and 4B, etc.), with a display, a touch-sensitive surface, (optionally) one or more tactile output generators for generating tactile outputs, and (optionally) one or more sensors to detect intensities of contacts with the touch-sensitive surface.

FIGS. 5A-5AX illustrate example user interactions for displaying and interacting with a search user interface in a variety of contexts and invoking other system and/or application functions, in accordance with some embodiments.

The user interfaces in these figures are used to illustrate the processes described below, including the processes in FIGS. 6A-6J. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 5B:
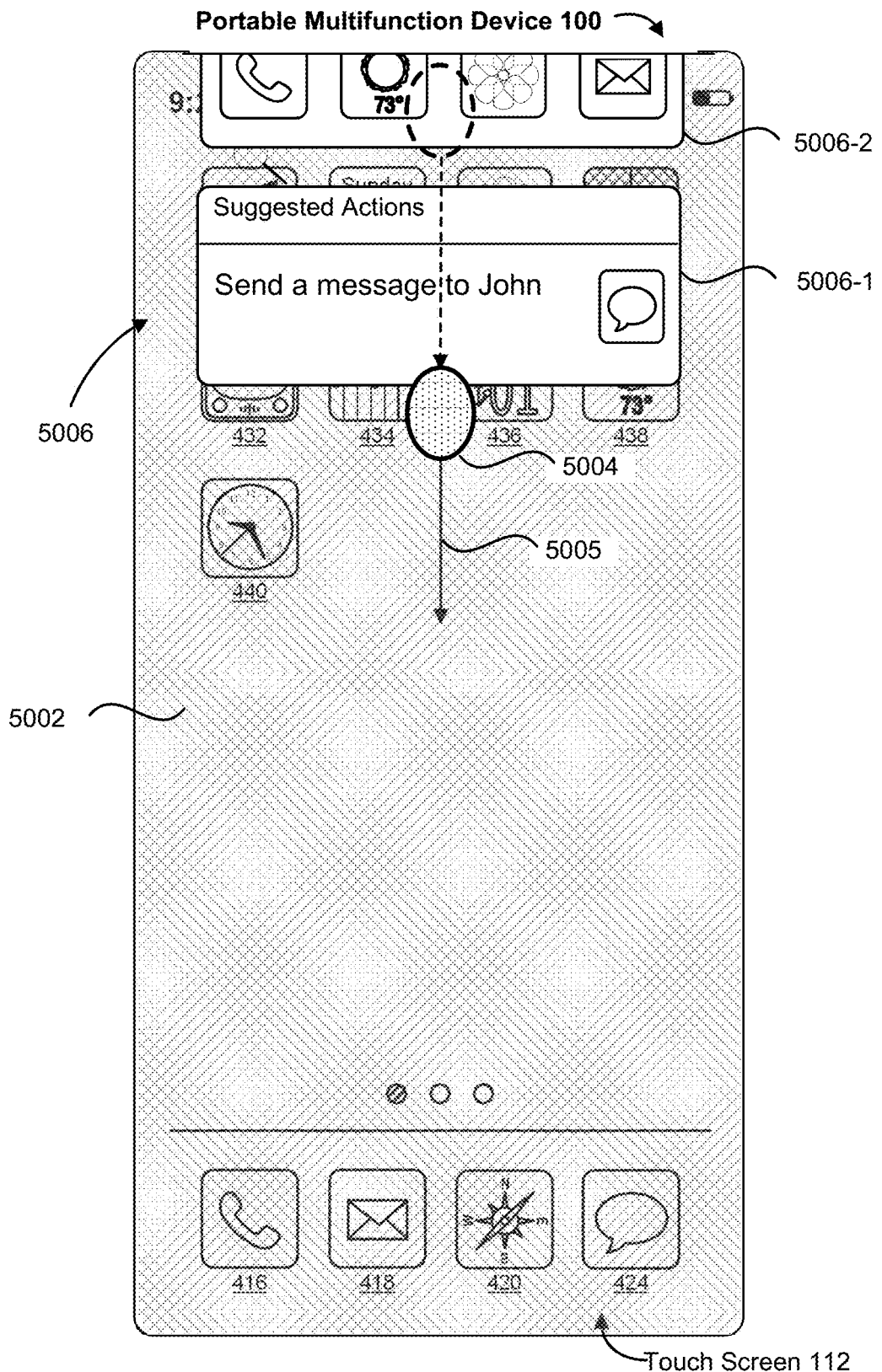
Figure 5C:
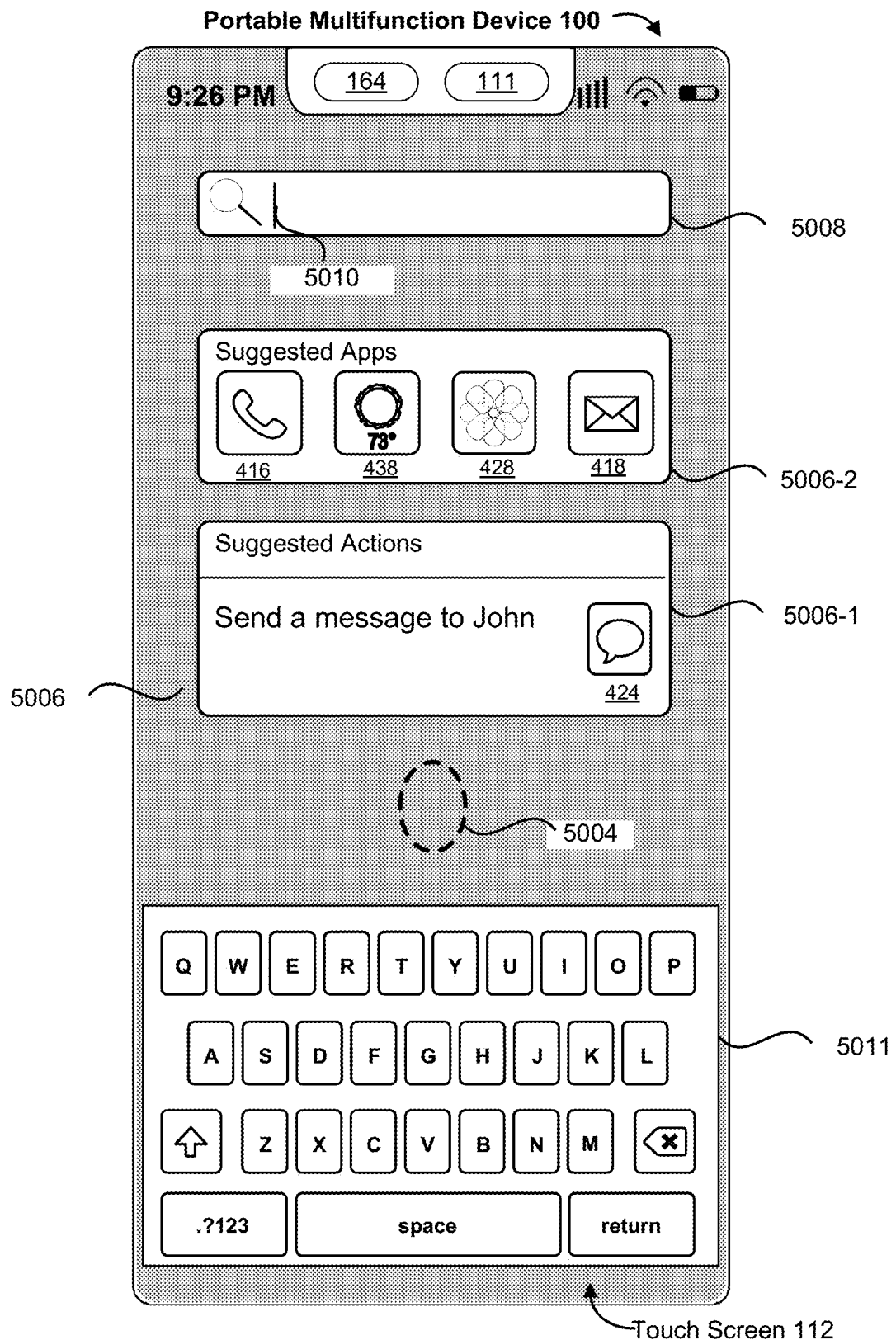

FIGS. 5A-5C illustrate a downward swipe gesture that causes the device to navigate from a home screen user interface of the device to a search user interface, in accordance with some embodiments.

In FIG. 5A, the device 100 displays a home screen user interface (e.g., user interface 5002 such as an application launch user interface, a respective page of a multipage home screen user interface, etc.) in a full-screen mode (e.g., user interface 5002 occupying substantially all of touch screen 112). The home screen user interface includes a plurality of application icons that correspond to different applications installed on the device. A respective application icon, when activated in accordance with preset criteria (e.g., activated by a tap gesture, a double tap gesture, etc.), causes the device to display the respective application corresponding to the respective application icon. In FIG. 5A, the device (e.g., the touch screen 112) detects a contact (e.g., contact 5004) in a first portion of an edge region (e.g., region 5003-1) of touch screen 112 (e.g., in a middle-top edge region of touch screen 112). In some embodiments, an edge of touch screen 112 refers to a location on the device where an area covered by a plurality of contact intensity sensors (e.g., contact intensity sensors 165 described with respect to FIG. 1A) ends and a bezel (e.g., an edge of a cover or casing) of the device (e.g., a portion of the edge of the device having no touch sensitivity) begins. In some embodiments, a relative width of region 5003-1 ranges from about 50% to about 20% of the width of the top edge of touch screen 112. In some embodiments, the relative width of region 5003-1 is about 50%, about 45%, about 40%, about 35%, about 33%, about 30%, about 25% or about 20%. The relative width may vary according to an orientation (e.g., a vertical vs. horizontal orientation) of the device. The width also varies in accordance with type of the device (e.g., whether the device is a mobile phone or a tablet computer). In some embodiments, the device detects a portion of contact 5004 on touch screen 112 right at the top edge of touch screen 112 (e.g., another portion of contact 5004 may be outside touch screen 112). In FIGS. 5A-5C, the device detects movement of contact 5004 in a first direction (e.g., downward movement 5005 of contact 5004 from the middle-top edge of touch screen 112 to an interior portion of touch screen 112). As shown, the movement 5005 of contact 5004 is substantially perpendicular to the top edge of touch screen 112. In some embodiments, the movement 5005 of contact 5004 corresponds to a downward swipe starting from the middle-top edge of touch screen 112. In some embodiments, the movement 5005 of contact 5004 includes downward movement from outside of touch screen 112 (e.g., across a bezel 112-1 surrounding the touch screen 112) across the top edge of touch screen 112 onto an interior portion of touch screen 112 (e.g., the movement 5005 of contact 5004 crosses the top edge of touch screen 112 and moves at least a threshold distance away from the top edge of touch screen 112). In some embodiments, detecting movement across an edge includes detecting a contact at the very outer perimeter of the touch screen edge with a continued movement towards an interior of the touch screen 112.

As shown in FIG. 5B, in accordance with a determination that the movement 5005 of contact 5004 satisfies first criteria for displaying a search user interface (e.g., user interface 5006 in FIG. 5C), the device initiates display of the search user interface. In some embodiments, the first criteria for displaying the search user interface include a requirement that the movement of contact 5004 begins from the middle portion of the top edge of touch screen 112 (e.g., region 5003-1), in order for the first criteria to be met. In some embodiments, the middle region 5003-1 is the middle half of the top touch screen edge. In other embodiments, the middle region 5003-1 is the middle third of the top touch screen edge. In yet other embodiments, the middle region 5003-1 is the middle quarter of the top touch screen edge. The smaller the region 5003-1, the less the chance that the user accidently invokes one feature instead of another, while the larger the region 5003-1, the better the chance of the user invoking a feature. The optimal size of the region 5003-1 depends on the side of the touch screen 112.

In some embodiments, the first criteria include a requirement that the movement of contact 5004 is in a substantially downward direction, in order for the first criteria to be met. In some embodiments, initiating display of the search user interface includes displaying the search user interface sliding onto the touch screen in accordance with the downward movement of contact 5004 (e.g., the search user interface sliding downward with the contact). For example, a lower edge of the search user interface follows the movement of contact 5004 as contact 5004 moves downward. In some embodiments, in accordance with a determination that termination of the swipe gesture is detected, and more than a threshold amount of movement in the downward direction has been made by the contact, the device displays the search user interface, completely replacing the home screen user interface on the touch-screen (e.g., the search user interface continues downward movement on the touch-screen until it replaces the home screen user interface completely on the touch-screen). In some embodiments, the device does not complete the process for displaying the search user interface and redisplays the home screen user interface after the termination of the swipe gesture, if the movement of contact 5004 is reversed and/or does not meet the threshold distance or direction requirements of the first criteria. In some embodiments, initiating display of the search user interface includes making the search user interface gradually appear on top of the home screen user interface (e.g., the search user interface gradually fades into the foreground while the home screen user interface gradually fades away into the background). In the example shown FIG. 5B, the device displays a portion of the search user interface (e.g., user interface 5006) in a top portion of touch screen 112. As shown, the device replaces a portion of the home screen user interface with a portion of the search user interface, as the home screen user interface recedes into the background and/or becomes visually deemphasized (e.g., blurred, darkened, reduced in size, etc.) relative to the portion of the search user interface. In FIG. 5B, the portion of the search user interface includes a first search user interface region (e.g., region 5006-1) that includes a suggested action and a portion of a second search user interface region (e.g., region 5006-2) that includes suggested applications (e.g., application icons for a plurality of automatically-selected applications). In some embodiments, the device displays the suggested actions (e.g., in region 5006-1) and/or the suggested applications (e.g., in region 5006-2) in accordance with contextual information (e.g., a previous searches performed on the device, recently accessed actions and/or applications, etc.). In some embodiments, the device displays the suggested actions and/or the suggested applications in accordance with common actions and/or applications accessed across a large number of devices similar to the device. While the portion of the search user interface gradually moves downward on the touch-screen, the device continuously changes the appearance of the home screen user interface that is displayed in the background of the portion of the search user interface, as shown in FIG. 5B, to further deemphasize the home screen user interface relative to the search user interface (e.g., further blur, darken, reducing in size of, etc., the home screen user interface relative to the search user interface). In some embodiments, the changes in appearance applied to the home screen user interface and the search user interface, and the movement of the home screen user interface and the search user interface, as described herein, is reversible and dynamically adjusted based on characteristics of the movement of contact 5004 (e.g., movement direction, movement speed, etc.) before the termination of the gesture (e.g., lift-off of contact 5004).

In FIG. 5C, the device has detected lift-off of contact 5004 at a location that is in roughly the middle portion of touch screen 112 (e.g., with a movement distance meeting the requirement of the first criteria, and/or with a movement speed at lift-off that meets the first criteria, etc.); and in accordance with a determination that the first criteria for displaying the search criteria are met by the downward swipe gesture at the lift-off of contact 5004, the device displays the search user interface (e.g., user interface 5006) in the full-screen mode. In some embodiments, the device replaces the home screen user interface (e.g., user interface 5002) with the search user interface (e.g., user interface 5006). In some embodiments, the home screen user interface is no longer displayed in the background of the search user interface. In some embodiments, a reduced visibility version of the home screen user interface serves as a background layer of the search user interface. In FIG. 5C, in addition to displaying search user interface region 5006-1 (e.g., suggested actions) and search user interface region 5006-2 (e.g., suggested apps) of the search user interface, the device displays a search input region in the search user interface (e.g., search input region 5008 positioned in a top portion of the search user interface). In some embodiments, the search input region includes a text cursor 5010 indicating a current position for inputting search criteria for a search query in accordance with an input received from a user (e.g., textual input entered through a keyboard or through speech-to-text function provided by the device, textual input or image input pasted from a clipboard, etc.). In some embodiments, the device further displays a virtual keyboard (e.g., virtual keyboard 5011) in response to a tap input in the search input area 5008 after the search user interface is displayed. In some embodiments, the device automatically displays the keyboard 5011 (e.g., as part of the search user interface, or overlaying the search user interface) in response to detecting termination of the swipe gesture by contact 5004 (e.g., without a user having tapped into the search input area). In some embodiments, the search user interface is scrollable to reveal additional portions that includes other suggested content that is automatically selected by the device, such as suggested images, suggested contacts, suggested search queries, etc. In some embodiments, the search user interface is scrolled, e.g., in response to swipe gestures in the vertical directions, underneath the virtual keyboard, while the virtual keyboard remains at the same location on the touch-screen. In some embodiments, the virtual keyboard ceases to be displayed from the touch screen in response to a user input that scrolls the search user interface.

In some embodiments, in response to detecting the swipe gesture by contact 5004, in accordance with a determination that the movement of contact 5004 does not meet the first criteria for displaying the search user interface, the device forgoes displaying the search user interface. For example, in accordance with a determination that the movement of the contact 5004 downwards does not reach a threshold distance away from the top edge of the touch-screen (e.g., reaching the middle portion of touch screen 112 (e.g., the location of touch lift off shown in FIG. 5C)), the device forgoes displaying the search user interface and instead redisplays the home screen user interface after the termination of the swipe gesture by contact 5004. In some embodiments, after the search user interface is displayed in response to the swipe gesture (e.g., movement 5005 of contact 5004 as shown in FIG. 5C), the device detects another input that corresponds to a request to dismiss the search user interface (e.g., another swipe gesture by another contact in an upward direction that starts from the bottom edge of the touch-screen, a tap gesture in a region of the search user interface that is unoccupied by a user interface object, etc.), the device ceases to display the search user interface (e.g., the search user interface is dismissed) and redisplays the home screen user interface (e.g., as shown in FIG. 5A).

In FIG. 5C, the search user interface responds to user inputs directed to different user interface objects included in the search user interface, and performs corresponding operations associated with the different user interface objects, in some embodiments. For example, if the device detects a contact (e.g., a tap) on region 5006-1 (e.g., suggested actions) or on region 5006-2 (e.g., suggested applications), the device determines which action to perform or which application to display, based on which action or application is selected by the contact. For example, if the device detects a tap gesture on a first application icon (e.g., application icon 416 for a telephone application) displayed in region 5006-2, the device displays a first application corresponding to the first application icon (e.g., replacing the search user interface with a user interface of the first application (e.g., a telephone user interface) on the touch-screen); and if the device detects the tap gesture on a second application icon (e.g., icon 418) displayed in region 5006-2, the device displays a second application corresponding to the second application icon (e.g., replacing the search user interface with a user interface of the second application (e.g., an email user interface) on the touch-screen). Further, if the device detects the tap gesture on a first action (e.g., Send a message to John") displayed in region 5006-1, the device replaces the search user interface with a user interface associated with the first action (e.g., a user interface of the messages application for composing a message to John); and, optionally, if the device detects the tap gesture on a second action (e.g., turn on call and notification silencing mode) displayed in region 5006-1, the device performs the second action (e.g., turning no the call and notification silencing mode, and displaying a notification that call and notification silencing mode is turned on), and, optionally, maintains display of the search user interface; and, optionally, if the device detects the tap input on a third action (e.g., Set Alarm) displayed in region 5006-1, the device replaces the search user interface with a user interface for setting the alarm or overlays a user interface object for setting the alarm over the search user interface. In some embodiments, region 5006-1 also includes application icons along with suggested actions, and a tap gesture on a respective application icon also causes display of the corresponding application. For example, in accordance with detecting a tap gesture on icon 424 for "Messages" in region 5006-1, the device displays a user interface of the messaging application. In some embodiments, tapping an application icon in region 5006-1 results in a different user interface of the corresponding application than the user interface of the corresponding application displayed in response to a tap gesture on the same application icon shown in region 5006-2. In some embodiments, a respective user interface object (e.g., application icon, action, container objects for suggested applications and/or actions, etc.) also respond to other types of gesture inputs, such as swipe gestures in different directions, touch-hold gestures, light press gestures, etc., and perform different operations corresponding to the respective user interface object and the type of the currently detected gesture input.

Figure 5D:
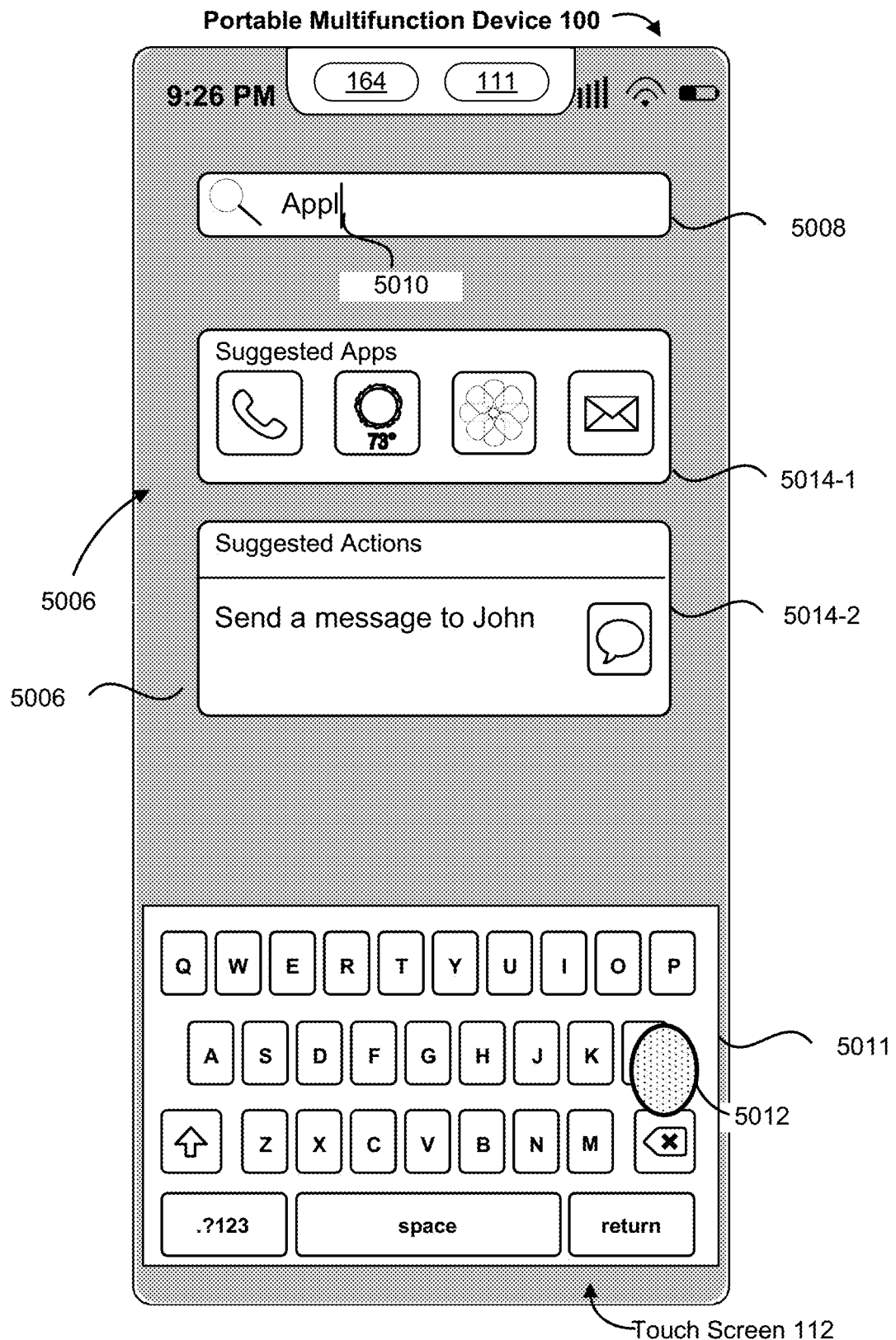
Figure 5E:
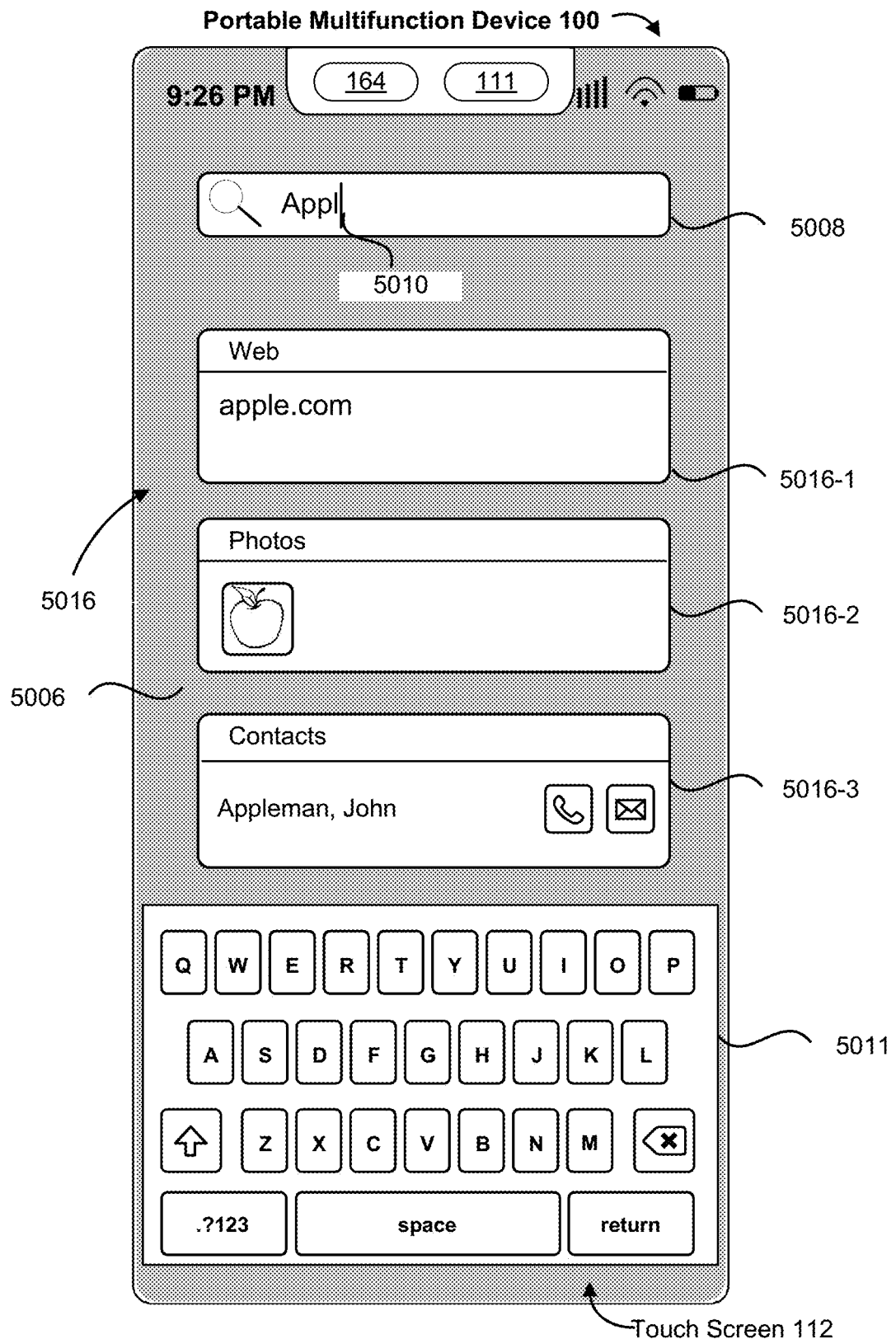

FIGS. 5D-5E illustrate example user interaction with the search user interface to conduct a search, in accordance with some embodiments.

In FIG. 5D, the device detects a user input including a sequence of touch inputs (e.g., a sequence of tap gestures by contacts on different keys of the virtual keyboard 5011, including contact 5012 on virtual key "1"). For example, the sequence of touch inputs on the virtual keyboard corresponding to a textual input (e.g., a sequence of characters, or words, etc.). In response to detecting the textual input, the device displays corresponding text in the search input region 5008. For example, as shown in FIG. 5D, the textual input includes the textual string "Appl." In response to receiving the textual input in the search input area 5008, the device (e.g., search module 115 of device 100) performs a search using the textual input as search criteria (e.g., optionally, with other contextual information (e.g., time, location, past searches, past user interactions, etc.) as supplemental search criteria and/or search filters) to identify relevant content corresponding to the search criteria. In some embodiments, the search is performed in search corpora corresponding to different sources of content, including content associated with applications installed on the device (e.g., content and/or data within applications (e.g., files, messages, generated or stored within applications), metadata associated with applications (e.g., application name, application icons, etc.)), content from external sources (e.g., the Internet, on other related devices connected to the device, etc.), files stored on the device and/or stored on a user account associated with the device, etc. In some embodiments, the search is performed in search corpora corresponding to different categories or content types for search results, including images, photos, videos, media files, contacts with contact information (e.g., names, addresses, usernames, aliases, web addresses, social media handles, etc.), applications, actions or operations that can be performed on the device, etc. In some embodiments, the search is updated as the user types the input (e.g., without the user having to select "search" or "return."). In response to detecting the search input (e.g., partial or complete), the search user interface updates (e.g., refreshes or replaces) the displayed first search user interface region (e.g., region 5006-1) and the second search user interface region (e.g., region 5006-2) with search results (e.g., search results 5016) corresponding to the detected search input in the search input region 5008, as shown in FIG. 5E. In FIG. 5E, the search results include content from a variety of applications installed on the device that are identified as relevant to the search input that has been received. For example, as shown in FIG. 5E, the search results 5016 include a first region (e.g., region 5016-1) displaying content identified from a web browser application (e.g., the webpage "apple.com"), a second region (e.g., region 5016-2) displaying content identified from a photo application (e.g., an image illustrating an apple), and a third region (e.g., region 5016-3) displaying content identified from a contacts application (e.g., contact information associated with "Appleman, John"). In some embodiments, additional regions are included in the search results to show additional categories and/or types of search results, such as applications, photos, text messages, emails, actions, etc. In some embodiments, a respective region for a given type of search results include multiple search results of that given type. In some embodiments, a respective search result displayed in the search result user interface is associated with a respective set of operations, and the device performs a respective operation in the respective set of operation in response to a user input selecting the respective search result in accordance with preset criteria (e.g., using a tap input, using a swipe gesture, using a touch-hold gesture, etc.). For example, in response to a tap gesture on the search result "apple.com" in the region 5016-1, the device replaces display of the search result user interface with display of a user interface of the web browser application that displays the webpage at "apple.com"; and, optionally, in response to a touch-hold gesture on the search result "apple.com" in the region 5016-1, the device displays a preview of the webpage at "apple.com" overlaying a portion of the search result user interface (e.g., a blurred and/or darkened version of the search result user interface, which is restored once the touch-hold gesture is terminated or the preview is dismissed by another input); and, optionally, the device displays a plurality of selectable options associated with the search result (e.g., save, mark, delete, etc.) in response to a leftward or rightward swipe gesture across the search result "apple.com." Similarly, in response to a tap gesture on the search result "image of an apple" in the region 5016-2, the device replaces display of the search result user interface with display of a user interface of the photo library that displays the photo "image of an apple"; and, optionally, in response to a touch-hold gesture on the search result "image of an apple" in the region 5016-2, the device displays a preview of the photo overlaying a portion of the search result user interface (e.g., a blurred and/or darkened version of the search result user interface, which is restored once the touch-hold gesture is terminated or the preview is dismissed by another input); and, optionally, the device displays a plurality of selectable options associated with the search result (e.g., save, mark, delete, etc.) in response to a leftward or rightward swipe gesture across the search result "image of an apple." In some embodiments, search results include user interface objects that correspond to different operations that can be performed with respect to the search result. For example, a tap input on the telephone application icon or the email application icon without the search result "Contact-Appleman, John" in region 5016-3, causes the device to initiate a telephone call or start a composition of an email to John Appleman based on the contact information in the search result; and a tap input on the search result outside of the application icons causes the device to display the contact information of John Appleman that is stored in the Contacts application.

In some embodiments, the device detects a search input in the form of an image file or other objects. For example, the device detects that an image file is copied from another source onto the clipboard, and pasted into the search input area (e.g., by a touch-hold gesture in the search input region to invoke a selectable option "paste," followed by selection of the selectable option to paste content already saved/ copied onto the clipboard). In response to detecting the search input, the device (e.g., search module 115 of device 100) conducts a search to identify content corresponding to the image file and displays search results including content identified as being relevant to the image file.

The home screen user interface, search user interface, and search result user interface described above are illustrative, and in some embodiments, the user interface objects, appearances, and/or response behaviors of the home screen user interface, search user interface, and search result user interface, may be different or modified in one or more aspects.

Figure 5F:
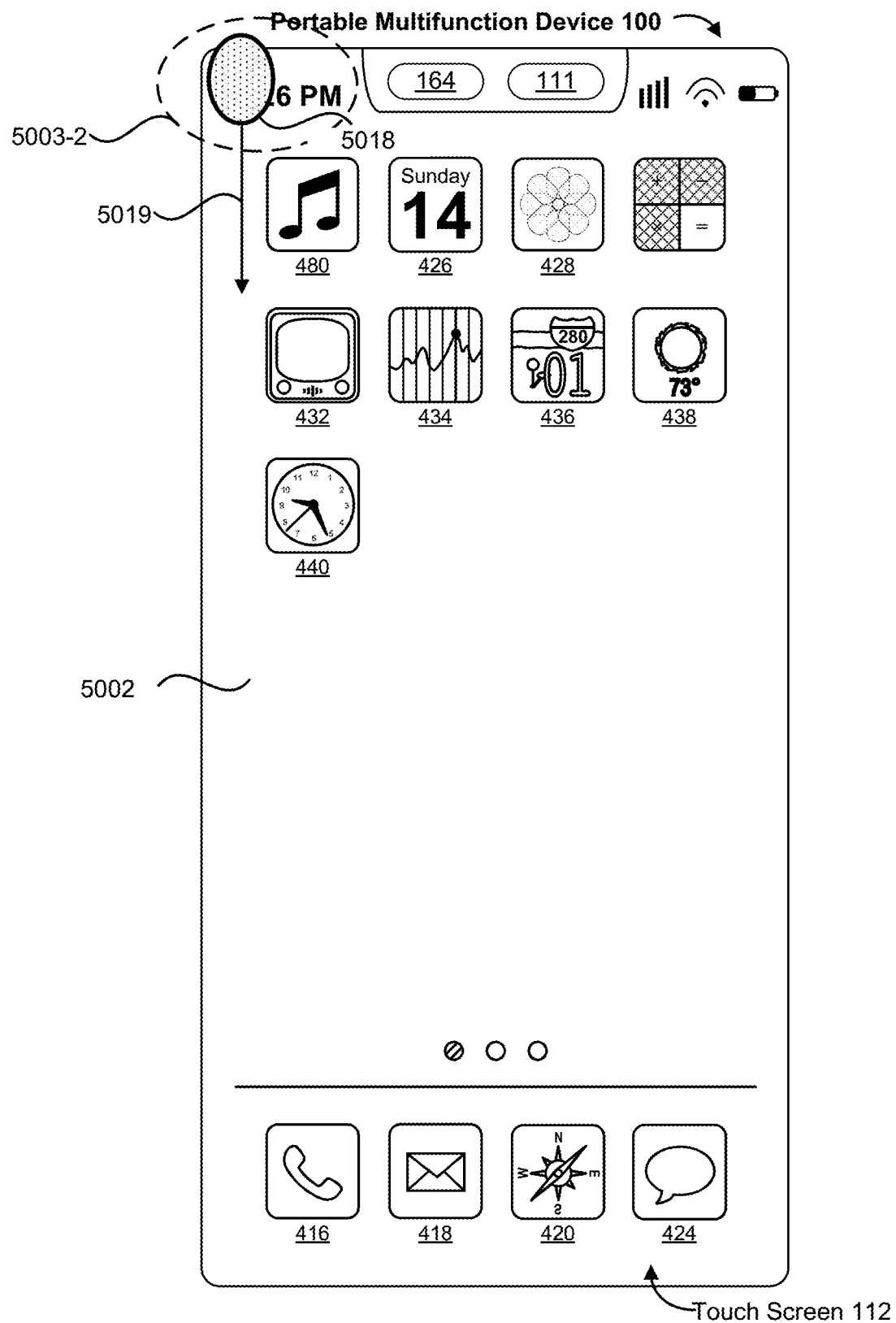
Figure 5G:
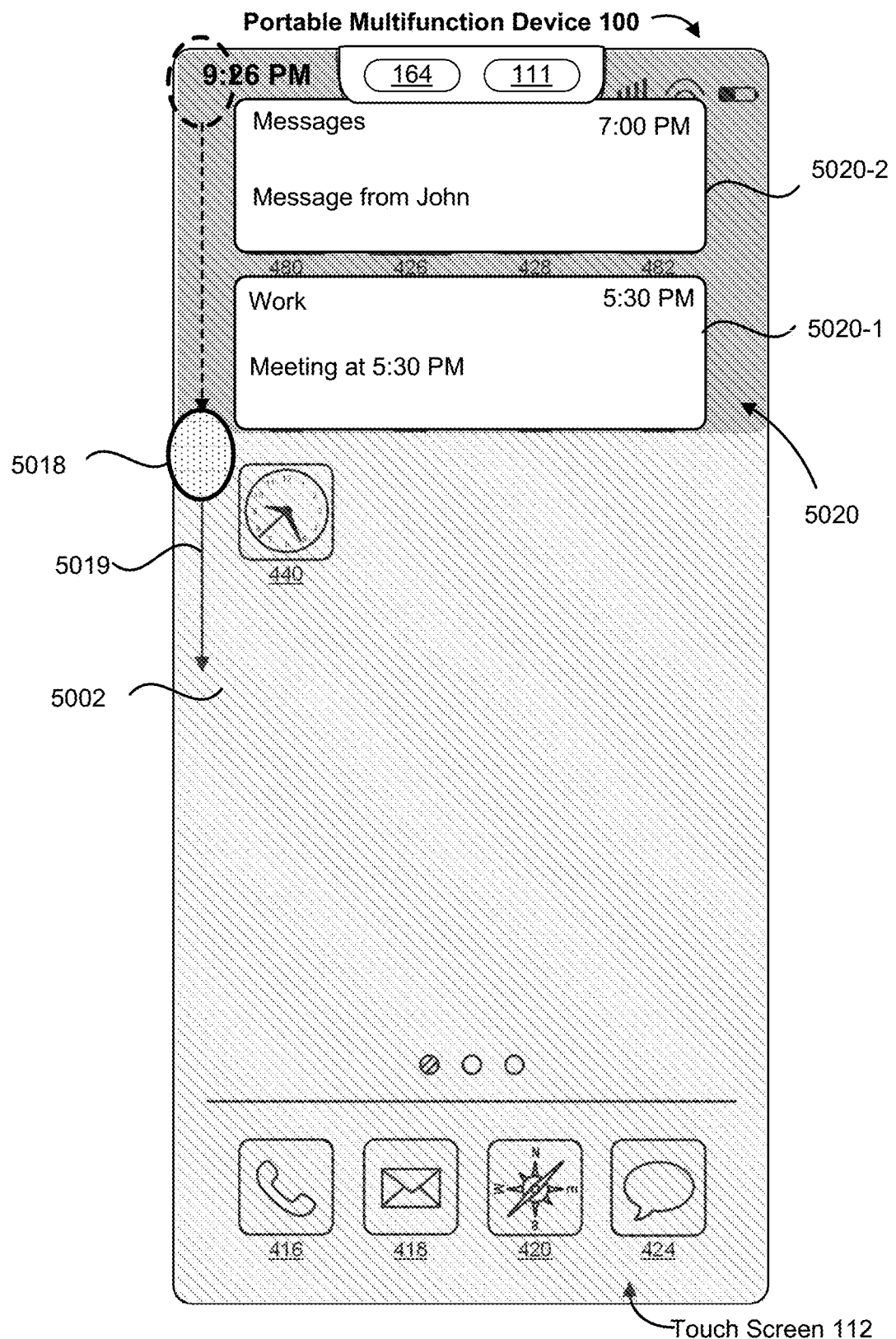
Figure 5H:
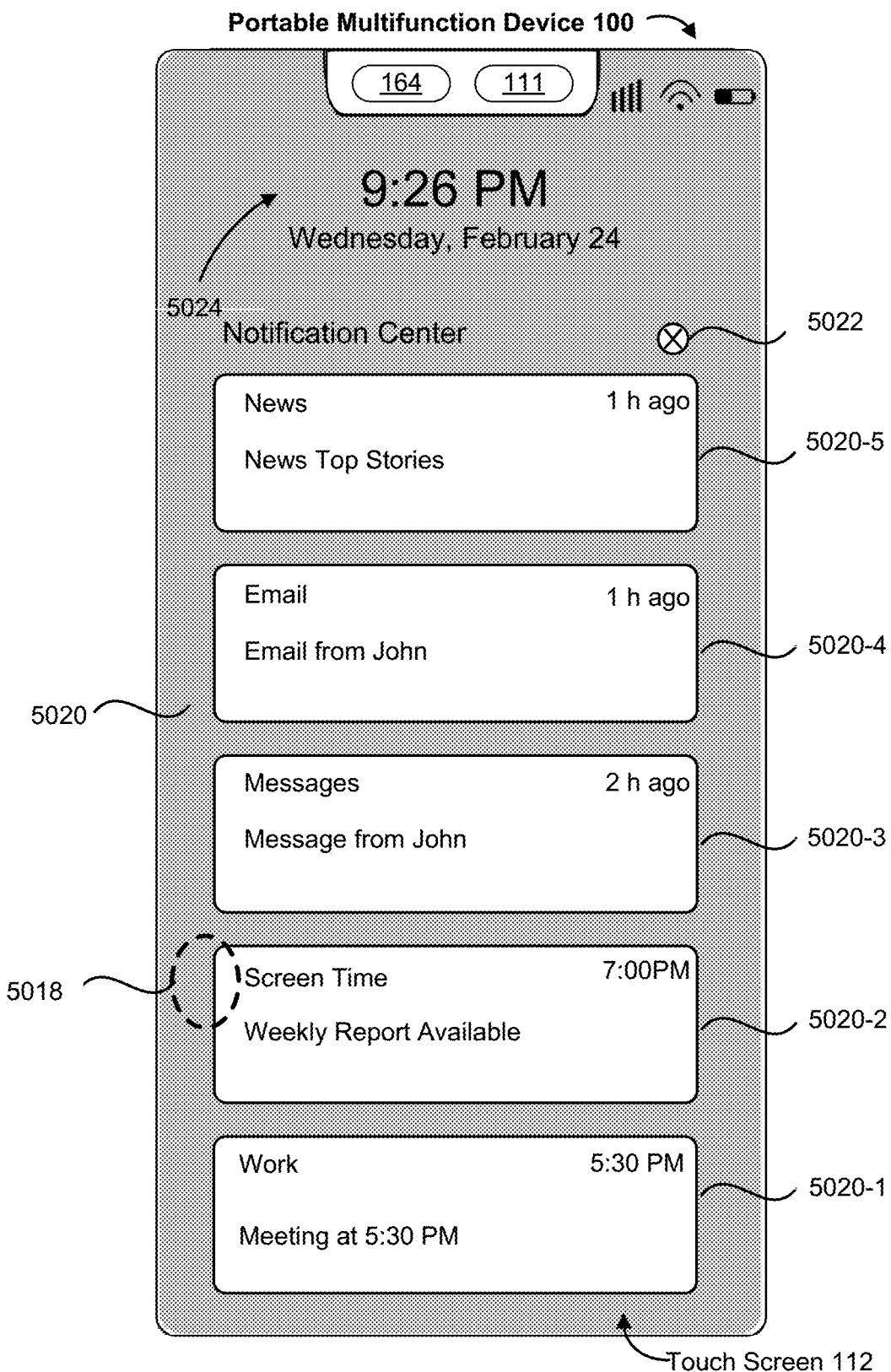

FIGS. 5F-5H illustrate a downward swipe gesture that causes the device to navigate from the home screen user interface of the device to a notification center user interface, in accordance with some embodiments.

In FIG. 5F, the device 100 displays the home screen user interface in the full-screen mode. The device detects a contact (e.g., contact 5018) in a second portion of the edge region (e.g., region 5003-2) of touch screen 112 (e.g., in a left-top edge region of touch screen 112). In some embodiments, the first portion and the second portion of the edge region of touch screen 112 are distinct from, and mutually exclusive to, each other. In some embodiments, a relative width of region 5003-2 ranges from about 50% to about 20% of the width of the top edge of touch screen 112. In some embodiments, the relative width of region 5003-2 is about 50%, about 45%, about 40%, about 35%, about 33%, about 30%, about 25% or about 20%. The relative width may vary according to an orientation (e.g., a vertical vs. horizontal orientation) of the device. The relative width also varies in accordance with type of a device (e.g., whether the device is a mobile phone or a tablet computer). The relative width of region 5003-2 may corresponds to the relative width of region 5003-1, be greater than the relative width of region 5003-1, or be less than the relative width of region 5003-1. In some embodiments, regions 5003-1 and 5003-2 are operationally adjacent to each other so that that there are no interaction regions between region 5003-1 and region 5003-2. In some embodiments, regions 5003-1 and 5003-2 are not visually marked with respective boundaries on the edge region of touch screen 112 (e.g., regions 5003-1 and 5003-2 do not have corresponding user interface elements displayed at or near the regions). In some embodiments, region 5003-2 is next to region 5002-1 (e.g., region 5003-2 is positioned on the left side of region 5002-1). In some embodiments, region 5003-2 is separated from region 5002-1 by a region where neither of the functionality associated with swiping over regions 5003-2 or 5002-1 is available. As with region 5003-1, region 5003 may occupy the top left most third, quarter, or less of the width of the top edge. In some embodiments, region 5003-2 includes a portion of the home screen user interface. For example, in FIG. 5F a time element of the home screen user interface is displayed in region 5003-2. In FIGS. 5F-5H, the device detects movement of contact 5018 in the first direction (e.g., downward movement 5019 of contact 5018 from the left-top edge of touch screen 112 to a middle-left portion of touch screen 112). As shown, movement 5019 of contact 5018 is substantially perpendicular to the top edge of touch screen 112. In some embodiments, movement 5005 of contact 5004 corresponds to a downward swipe starting from the left-top edge of touch screen 112. In some embodiments, movement 5019 of contact 5018 includes downward movement from outside of touch screen 112 across the top edge of touch screen 112 along a left portion of touch screen 112 (e.g., the movement 5019 of contact 5018 crosses the top edge of touch screen 112 and moves at least a threshold distance away from the top edge of touch screen 112 along the left portion of touch screen 112).

As shown in FIG. 5G, in accordance with a determination that the movement 5019 of contact 5018 satisfies first criteria for displaying a notification center user interface (e.g., user interface 5020 in FIG. 5G), the device initiates display of the notification center user interface. The notification center user interface includes a first group of notifications (e.g., one or more notifications) associated with applications of the device. In some embodiments, the first criteria for displaying the notification center user interface include a requirement that the movement of contact 5018 begins from the left portion of the top edge of touch screen 112 (e.g., region 5003-2 in FIG. 5F), in order for the first criteria to be met. In some embodiments, the first criteria for displaying the notification center include a requirement that the movement of contact 5018 is in a substantially downward direction, in order for the first criteria to be met. In some embodiments, initiating display of the notification center user interface includes displaying the notification user interface sliding onto the touch screen in accordance with the downward movement of contact 5018. For example, a lower edge of the notification center user interface follows the movement of contact 5018 as contact 5018 moves downward. In some embodiments, in accordance with a determination that the drag gesture is detected, and more than a threshold amount of movement in the downward direction has been made by the contact, the device displays the notification center user interface, completely replacing the home screen user interface on the touch-screen (e.g., the notification center user interface continues downward movement on the touch-screen until it replaces the home screen user interface completely on touch screen 112). In some embodiments, the device does not complete the process for displaying the notification center user interface and redisplays the home screen user interface after the termination of the swipe gesture, if the movement of contact 5018 is reversed and/or does not meet the threshold distance or direction requirements of the first criteria for displaying the notification center user interface. In some embodiments, initiating display of the notification center user interface includes making the notification center user interface gradually appear on top of the home screen user interface (e.g., the notification center user interface gradually fades in into the foreground while the home screen user interface gradually fades away into the background). In the example shown FIG. 5G, the device displays a portion of the notification center user interface (e.g., user interface 5006) in a top portion of touch screen 112. As shown, the device replaces a portion of the home screen user interface with a portion of the notification center user interface, as the home screen user interface recedes into the background and/or becomes visually deemphasized (e.g., blurred, darkened, reduced in size, etc.) relative to the portion of the search user interface.

In FIG. 5G, the portion of the search user interface includes a first notification center user interface region (e.g., region 5020-1) that includes a first notification and a second search user interface region (e.g., region 5020-2) that includes a second notification. The first notification and the second notification are associated with applications of the device. For example, the first notification is associated with "Work" application and the second notification is associated with "Messages" application. In some embodiments, a respective notification includes a description of the notification and a time indicating when the notification was generated by a respective application (e.g., a time when a message was received or a time when a reminder was prompted). In some embodiments, the first group of notifications is arranged in a list. In some embodiments, the list is arranged in a chronological order (e.g., a notification displayed at the lowest position of the list corresponding to the oldest notification of the first group of notifications and a notification displayed at the highest position of the list corresponding to the most recent notification of the first group of notifications). Similarly to the features described above with respect to FIG. 5B, while the portion of the notification center user interface gradually moves downward on the touch-screen, the device continuously changes the appearance of the home screen user interface that is displayed in the background of the portion of the notification center user interface, as shown in FIG. 5G.

In FIG. 5H, the device has detected lift-off of contact 5018 at a location that is in the middle-left portion of touch screen 112 (e.g., with a movement distance meeting the requirement of the first criteria for displaying the notification center user interface, and/or with a movement speed at lift-off that meets the first criteria, etc.); and in accordance with a determination that the first criteria for displaying the notification center user interface are met by the downward swipe gesture at the lift-off of contact 5018, the device displays the notification center user interface (e.g., user interface 5020) in the full-screen mode. In some embodiments, the device replaces the home screen user interface (e.g., user interface 5002) with the notification center user interface (e.g., user interface 5020). In some embodiments, the home screen user interface is no longer displayed in the background of the search user interface. In some embodiments, a reduced visibility version of the home screen user interface serves as a background layer of the notification center user interface. In accordance with a determination that the first criteria for displaying the notification center user interface not met by the downward swipe gesture at the lift-off of contact 5018, the device forgoes displaying the notification center user interface in the full-screen mode and instead continues displaying the home screen user interface.

In FIG. 5H, the device displays the notification center user interface in the full-screen mode. In FIG. 5H, in addition to displaying notification center user interface region 5020-1 (e.g., the first notification) and notification center user interface region 5020-2 (e.g., the second notification) of the notification center user interface, the device displays notification center region 5020-3 (e.g., including a third notification), notification center region 5020-4 (e.g., including a fourth notification), notification center region 5020-4 (e.g., including a fifth notification). In some embodiments, the device also displays an affordance for dismissing the displayed notification (e.g., affordance 5022). In some embodiments, in response to detecting a tap input on the affordance for dismissing the displayed notifications, the device ceases to display the notification center user interface regions 5020-1 to 5020-5. Instead, the device replaces the notification center user interface regions with the background of the notification center user interface. In some embodiments, the device also displays a time element (e.g., time element 5024) including the current time and optionally the current date. In some embodiments, the notification center user interface is scrollable to reveal additional notification center user interface regions that include other notifications (e.g., notifications that have been generated prior to the first notification). In some embodiments, the notification center interface can be scrolled, e.g., in response to swipe gestures in the vertical directions (e.g., upright or downward swipe gestures).

FIGS. 5I-5L illustrate upward and downward gestures that cause the device to scroll the notification center user interface to display different portions of a list of notifications, in accordance with some embodiments. In some embodiments, the upward and downward gestures described with respect to FIGS. 5I-5L for scrolling the notification center user interface may be used to scroll other user interfaces displaying a list of items (e.g., search user interface 5006 including a list of suggested actions (e.g., regions 5006-1 and 5006-1 shown in FIG. 5C).

Figure 5I:
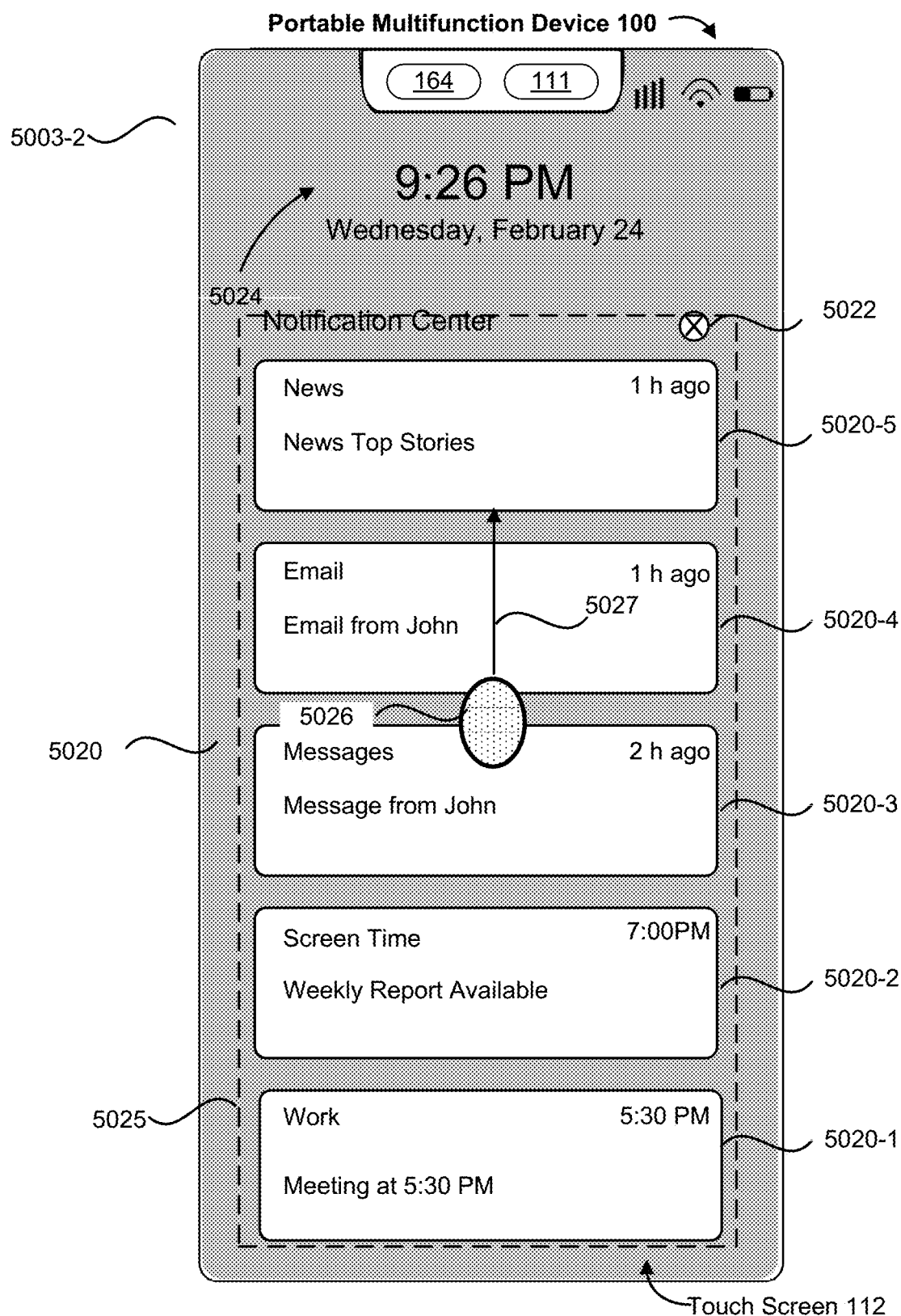
Figure 5J:
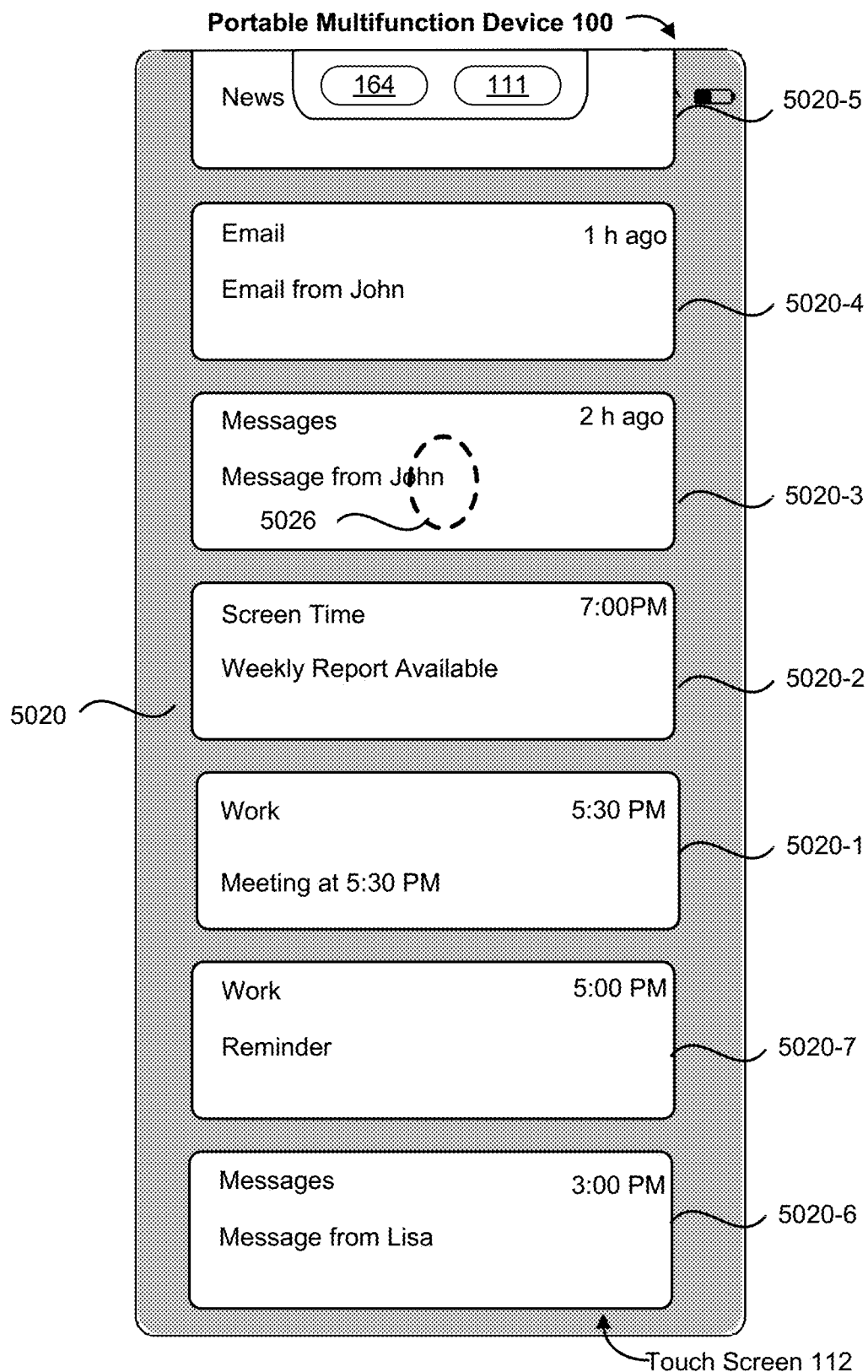

In FIG. 5I, the device displays the notification center user interface in the full-screen mode. The device displays the first group of notifications (e.g., notification center user interface regions 5020-1 to 5020-1). In FIG. 5I, the device detects a contact (e.g., contact 5026) in a middle portion (e.g., a middle-center portion) of touch screen 112 (e.g., portion 5025 positioned away from the edges of touch screen 112 corresponding to the interior portion of touch screen 112). In some embodiments, portion 5025 has a rectangular, oval, or other symmetric or asymmetric shape. In FIGS. 5I and 5J, the device detects movement of contact 5026 in a second direction (e.g., upward movement 5027 from the middle portion of touch screen 112). In some embodiments, the second direction is substantially parallel to, and substantially opposite to, the first direction. As shown, the movement 5027 of contact 5026 is substantially perpendicular to the top edge of touch screen 112. In some embodiments, the movement 5027 of contact 5026 corresponds to an upward swipe starting from the middle portion of touch screen 112 toward the top edge of touch screen 112.

In accordance with a determination that movement 5027 of contact 5026 satisfies first criteria for scrolling the notification center user interface, the device scrolls the notification user interface according to movement 5027 of contact 5026. In some embodiments, the first criteria for scrolling the notification center include a requirement that contact 5028 is detected while displaying the list of notifications (e.g., the first group of notifications including regions 5020-1 to 5020-5 arranged in a list corresponding to a portion of the list of notifications), in order for the first criteria to be met. In some embodiments, the list of notifications includes a threshold number of notifications so that less than all of the notifications of the list of notifications can be displayed concurrently (e.g., scrolling the list of notifications shifts the first group of notifications to display notifications that are not currently shown). In some embodiments, the first criteria include a requirement that contact 5028 is detected while the last notification (e.g., the oldest notification) in the list of notifications is not displayed, in order for the first criteria to be met. For example, the list of notifications includes a predefined number of notifications (e.g., the predefined number of notifications includes all notifications generated during a preset period of time or a fixed number of notifications). The list of notifications can be scrolled with an upward swipe gesture only when the last (e.g., the oldest) notification of the list of notifications is not being displayed. In some embodiment, the first criteria for scrolling the notification center user interface include a requirement that the movement of contact 5026 begins from the middle portion of touch screen 112, in order for the first criteria to be met. In some embodiments, the movement of contact 5026 begins from a portion of touch screen 112 at a location that is away from the top edge and bottom edges of touch screen 112 by a first threshold distance and away from the left and right edges of touch screen 112 by a second threshold distance, in order for the first criteria to be met.

In FIG. 5J, the device has detected lift-off of contact 5026 (e.g., with a movement distance meeting the requirement of the first criteria, and/or with a movement speed at lift-off that meets the first criteria for scrolling the notification center user interface, etc.); and in accordance with the determination that the first criteria for scrolling the notification center user interface are met, the device displays the notification user interface regions 5020-1 to 5020-5 that have shifted in accordance with the direction of the movement. In FIG. 5J, the device has ceased to display time element 5024 and has replaced time element 5024 with regions 5020-1 to 5020-5 that have shifted upwards on touch screen 112. For example, in FIG. 5J regions 5020-1 to 5020-5 have shifted upwards so that the device ceases to display a portion of region 5020-5 so that a top portion of region 5020-5 is no longer displayed. In some embodiments, the device shifts regions 5020-1 to 5020-5 upward in accordance with the direction of movement 5027 of contact 5026. In some embodiments, the device shifts regions 5020-1 to 5020-5 upward by a distance corresponding to a distance moved by contact 5026 on touch screen 112. In some embodiments, the shifting includes gradually moving the regions 5020-1 to 5020-5 upward in accordance with movement 5027 of contact 5026.

Additionally, in FIG. 5J the device is displaying a second group of notifications (e.g., regions 5020-6 and regions 5020-7) in the lower portion of touch screen 112 (e.g., regions 5020-6 to 5020-7 correspond to a second portion of the list of notifications of the notification center user interface). Region 5020-6 includes a sixth notification and region 5020-7 includes a seventh notification. In some embodiments, the sixth and seventh notifications have been generated by respective applications prior to the first notification (e.g., the sixth and seventh notifications are older than the first notification). In some embodiment, the first group of notifications and the second group of notifications are arranged in a continuous list. In some embodiments, displaying the second group of notifications includes gradually shifting the 5020-6 to 5020-7 upward from the bottom edge of touch screen 112 in accordance with the movement 5027 of contact 5026.

Figure 5K:
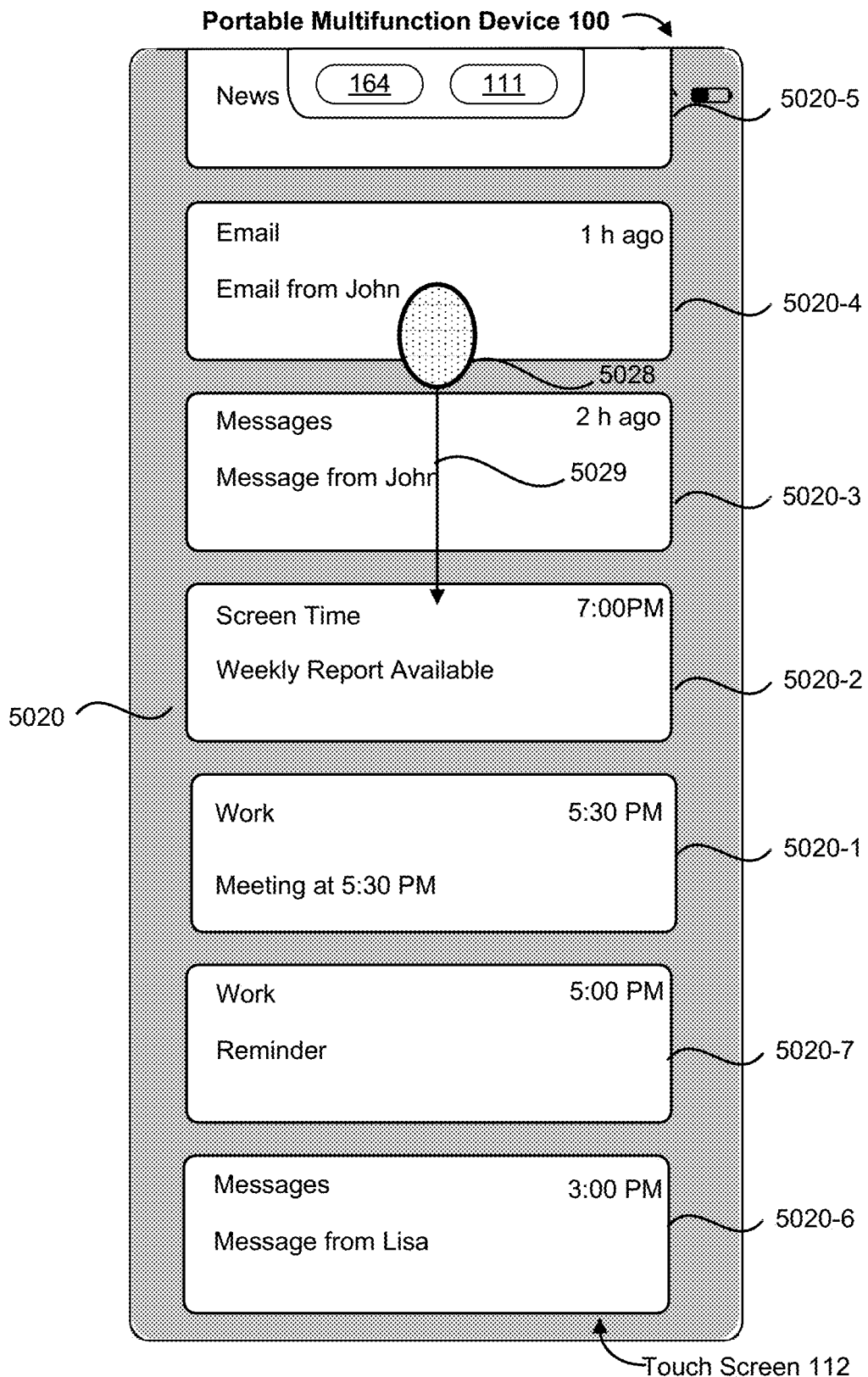
Figure 5L:
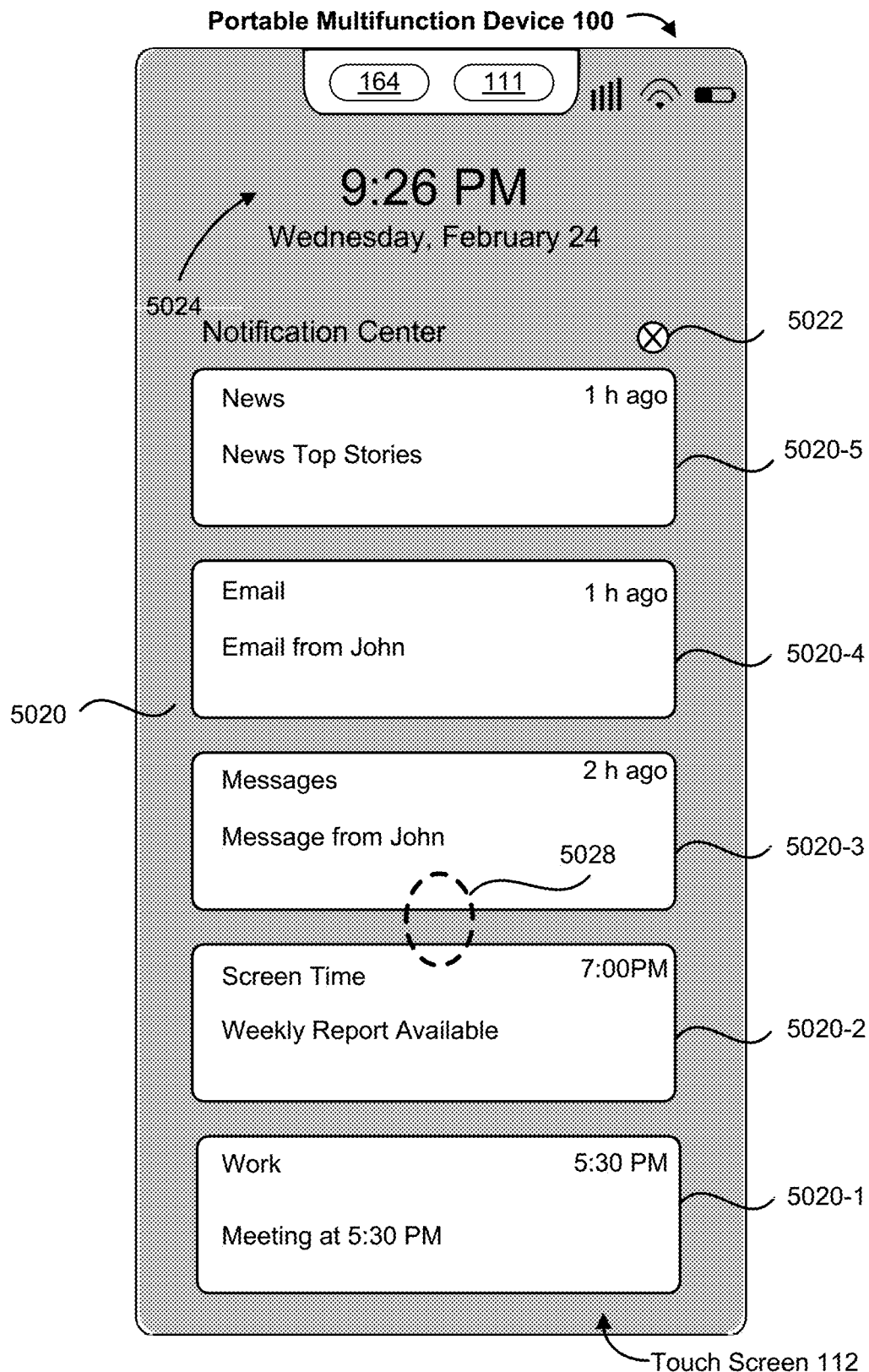

In FIG. 5K, the device displays the notification center user interface including the first group of notifications (e.g., regions 5020-1 to 5020-5) and the second group of notifications (e.g., regions 5020-6 and 5020-7). In FIG. 5K, the device detects a contact (e.g., contact 5028) in the middle portion (e.g., the middle-center portion) of touch screen 112. In FIGS. 5K and 5L, the device detects movement of contact 5028 in the first direction (e.g., downward movement 5029 from the middle portion of touch screen 112). In some embodiments, the movement 5029 of contact 5028 corresponds to a downward swipe starting from the middle portion of touch screen 112 toward the bottom edge of touch screen 112.

In accordance with a determination that movement 5029 of contact 5028 satisfies second criteria for scrolling the notification center user interface, the device scrolls the notification user interface according to movement 5029 of contact 5028. In some embodiments, the second criteria for scrolling the notification center include a requirement that contact 5028 is detected while displaying the list of notifications (e.g., regions 5020-1 to 5020-7 arranged in a list), in order for the second criteria to be met. In some embodiments, the second criteria for scrolling the notification center includes a requirement that a first notification of the list (e.g., the newest notification of the list) is not at least fully displayed, in order for the second criteria to be met. In some embodiments, the second criteria for scrolling the notification center include a requirement that the first notification of the list is not fully displayed in a preset position of touch screen 112, in order for the second criteria to be met. For example, the second criteria for scrolling the notification center user interface is met when the first notification of the list (e.g., region 5020-5) is displayed a threshold distance away from the top edge of touch screen 112, as shown in FIG. 5H. In some embodiments, the second criteria for scrolling the notification center further include a requirement that the time element 5024 shown in FIG. 5H is not displayed on touch screen 112, in order for the second criteria to be met. In some embodiment, the second criteria for scrolling the notification center user interface include a requirement that the movement of contact 5028 begins from the middle portion of touch screen 112, in order for the second criteria to be met. In some embodiments, the movement of contact 5028 begins from a portion of touch screen 112 at a location that is away from the top edge and bottom edges of touch screen 112 by a first threshold distance and away from the left and right edges of touch screen 112 by a second threshold distance.

In FIG. 5L, the device has detected lift-off of contact 5028 (e.g., with a movement distance meeting the requirement of the second criteria, and/or with a movement speed at lift-off that meets the second criteria for scrolling the notification center user interface, etc.); and in accordance with the determination that the second criteria are met, the device displays the list of notifications that has shifted downward in accordance with the direction of the movement of contact 5028. For example, in FIG. 5L, the device is displaying the notification center user interface, including the first group of notifications (e.g., regions 5020-1 to 5020-5), as described with respect to FIG. 5H. In some embodiments, the operations for scrolling the notification center user interface to display different portions of the list of notifications in accordance with movement of a detected gesture (e.g., upward or downward swipe gestures described with respect to FIGS. 5I-5L) may be repeated in order to display even further portions of the list of notifications. In some embodiments, the device detects lift-off of a contact after a first swipe gesture prior to detecting a beginning of a second swipe gesture. In some embodiments, the device does not detect lift-off of the first swipe gesture prior to detecting the beginning of the second swipe gesture. Instead, the first swipe gesture and the second swipe gesture are detected as a continuous movement of the contact. For example, in response to detecting an additional upward swipe gesture (e.g., a gesture having movement 5027 of contact 5026 in FIG. 5I) while displaying the first and second groups of notifications FIG. 5J, the device shifts the list of notifications upward. In some embodiments, the device displays a third group of notifications below the second group of notifications while ceasing to display at least a portion of the first group of notifications. As another example, in response to detecting another downward swipe gesture (e.g., a gesture having movement 5029 of contact 5028) while displaying the second and third groups of the notifications and optionally displaying a portion of the first group of notifications, the device shifts the list of notifications downward (e.g., the device ceases to display the third group of notifications).

Figure 5M:
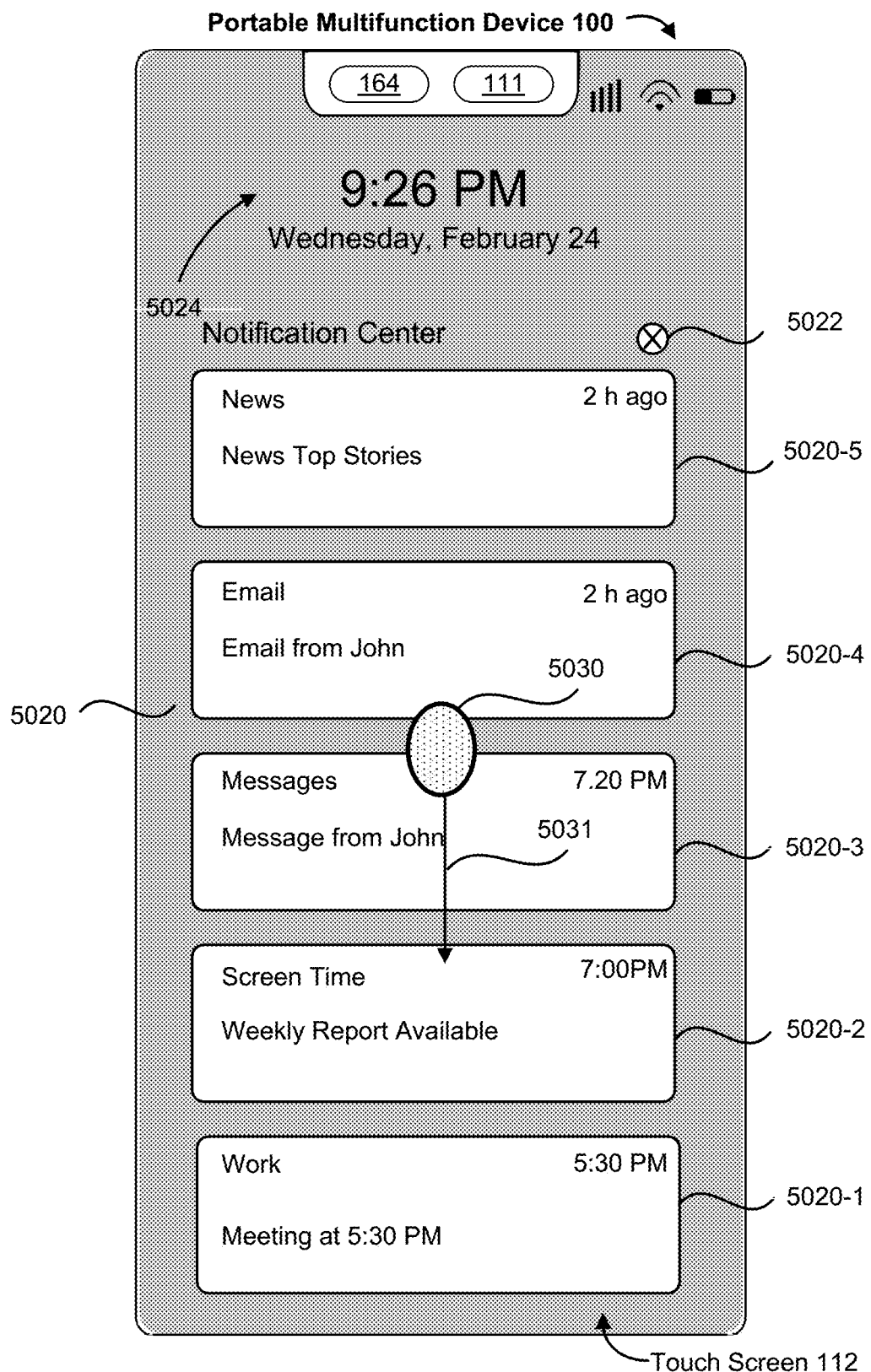
Figure 5N:
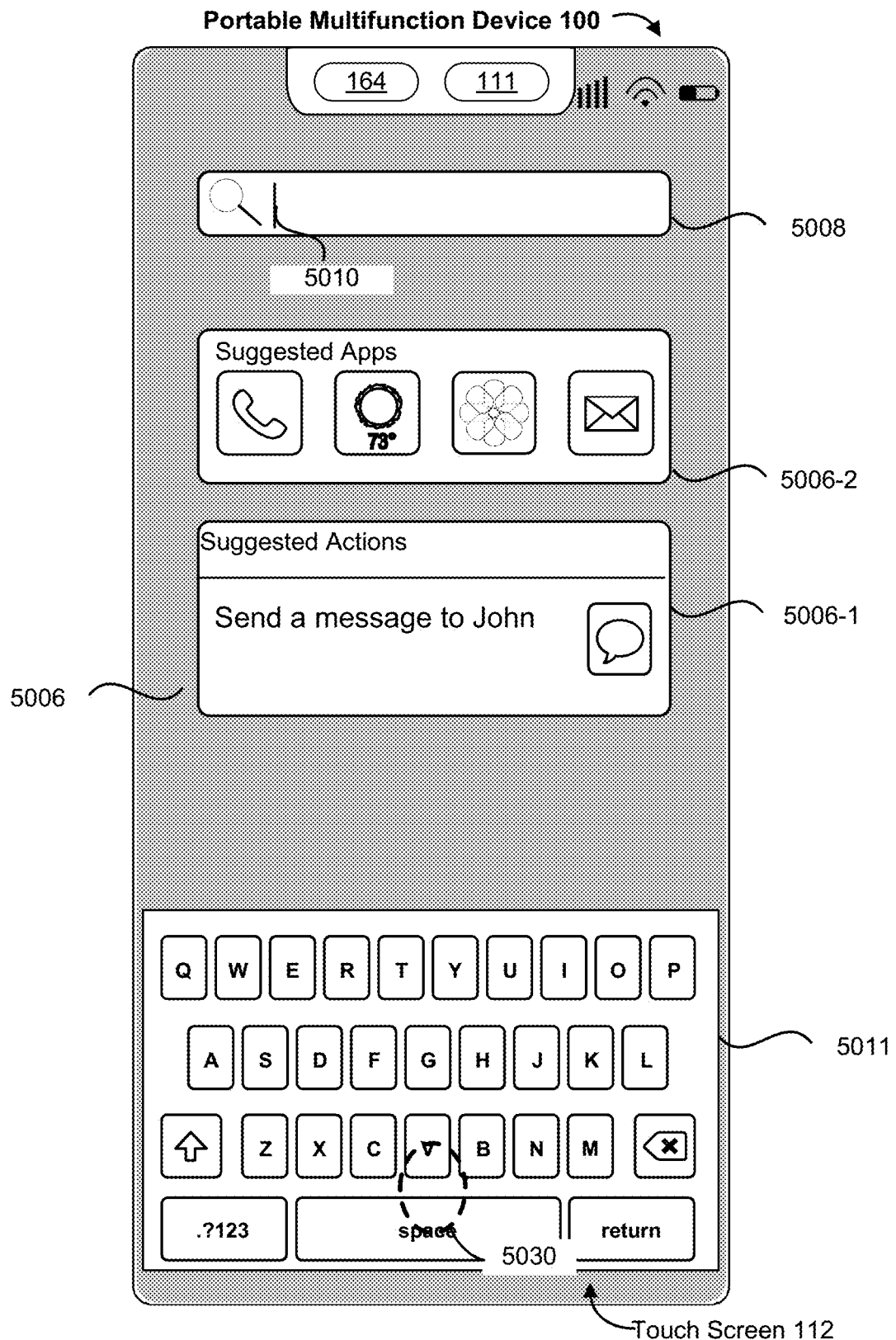

FIGS. 5M-5N illustrate a downward swipe gesture that causes the device to navigate from the notification center user interface of the device to the search user interface, in accordance with some embodiments.

As shown in FIG. 5M, the device displays the notification center user interface in the full screen mode, as described above with respect to FIG. 5H. The device (e.g., including the touch screen 112) detects a contact (e.g., contact 5030) in the middle portion of touch screen 112 (e.g., portion 5025 of touch screen 112 shown in FIG. 5I positioned away from the edges of touch screen 112 corresponding to the interior portion of touch screen 112). In FIGS. 5M-5N, the device detects movement of contact 5030 in the first direction (e.g., downward movement 5031 of contact 5030 from the middle portion of touch screen 112). As shown, movement 5031 of contact 5030 is substantially perpendicular to the top edge of touch screen 112. In some embodiments, the movement 5031 of contact 5030 corresponds to a downward swipe starting from the middle portion of touch screen 112.

In accordance with a determination that movement 5031 of contact 5030 satisfies second criteria for displaying the search user interface (e.g., user interface 5020), the device displays the search user interface. In some embodiments, the second criteria for displaying the center user interface include a requirement that movement 5031 of contact 5030 begins from the middle portion of touch screen 112 (e.g., portion 5025 of touch screen 112 in FIG. 5I), in order for the second criteria to be met. In some embodiments, the second criteria for displaying the search user interface include a requirement that movement 5031 of contact 5030 is in a substantially downward direction, in order for the second criteria to be met. In some embodiments, the second criteria for displaying the search user interface include a requirement that contact 5030 is detected while the device displays a top end (e.g., the top most notification corresponding to region 5020-5 in FIG. 5M) of the list of notifications of the notification center user interface, in order for the second criteria to be met. For example, the requirement is met when the device displays region 5020-5 corresponding to the most recent notification in the list of notifications. Alternatively, in accordance with a determination that the contact 5030 is detected while the device is not displaying the top end of the list of notifications of the notification center user interface, instead of displaying the search user interface, the device scrolls the list of notifications downwards (e.g., as described with respect to FIGS. 5I-5J).

In FIG. 5N, the device has detected lift-off of contact 5030 (e.g., with a movement distance meeting the requirement of the second criteria, and/or with a movement speed at lift-off that meets the second criteria for displaying the search user interface, etc.); and in accordance with the determination that the second criteria for displaying the search user interface are met, the device displays the search user interface (e.g., user interface 5006) in the full screen mode. In some embodiments, the device displays replacing the notification center user interface gradually with the search user interface in accordance with movement 5031 of contact 5030, as described above with respect to replacing the home screen user interface with the search user interface in FIGS. 5A-5C. In accordance with a determination that the second criteria for displaying the search user interface are not met by the downward swipe gesture at the lift-off of contact 5030, the device forgoes displaying the search user interface in the full screen mode and instead continues displaying the notification center user interface.

Figure 5O:
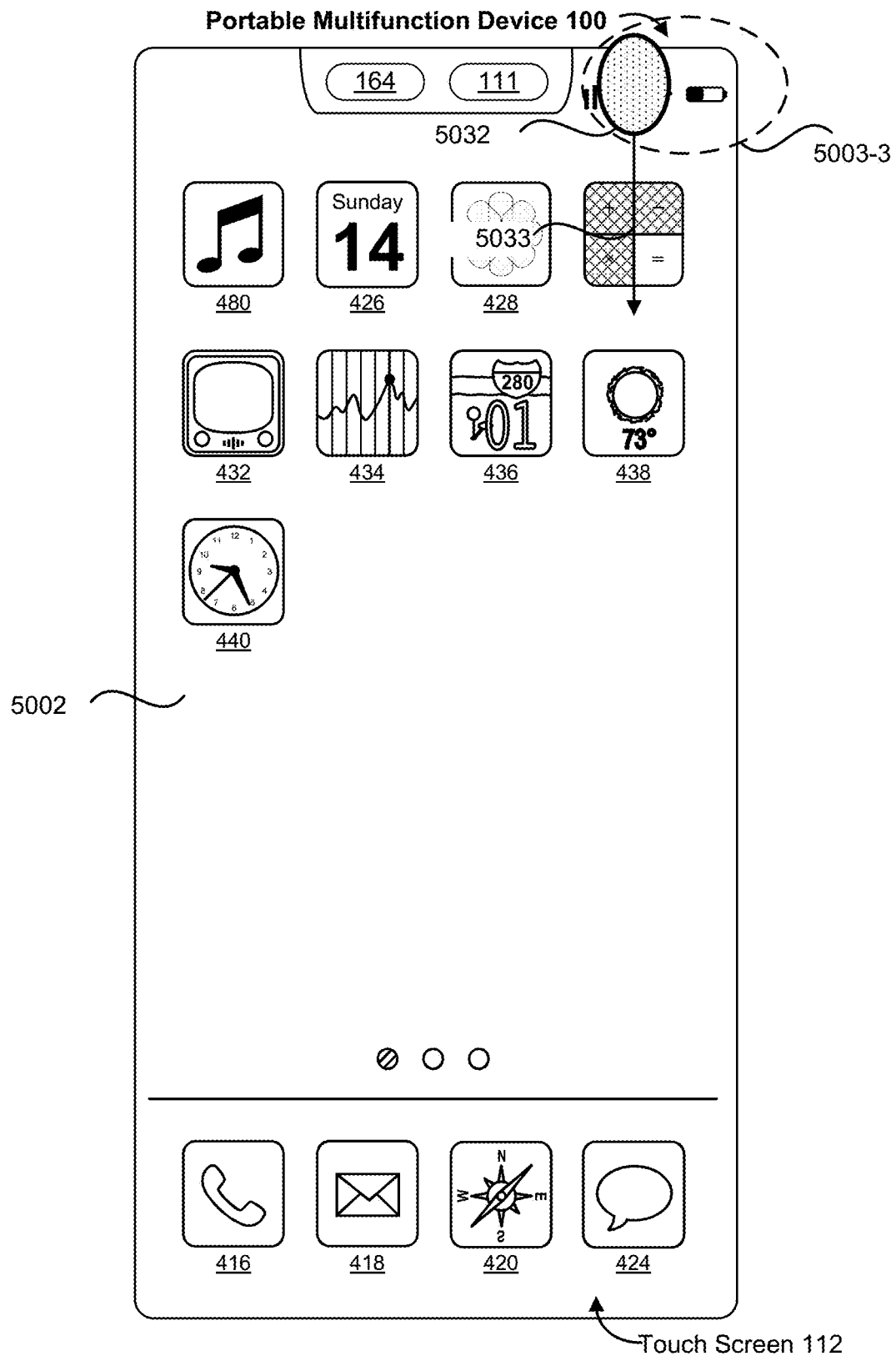
Figure 5P:
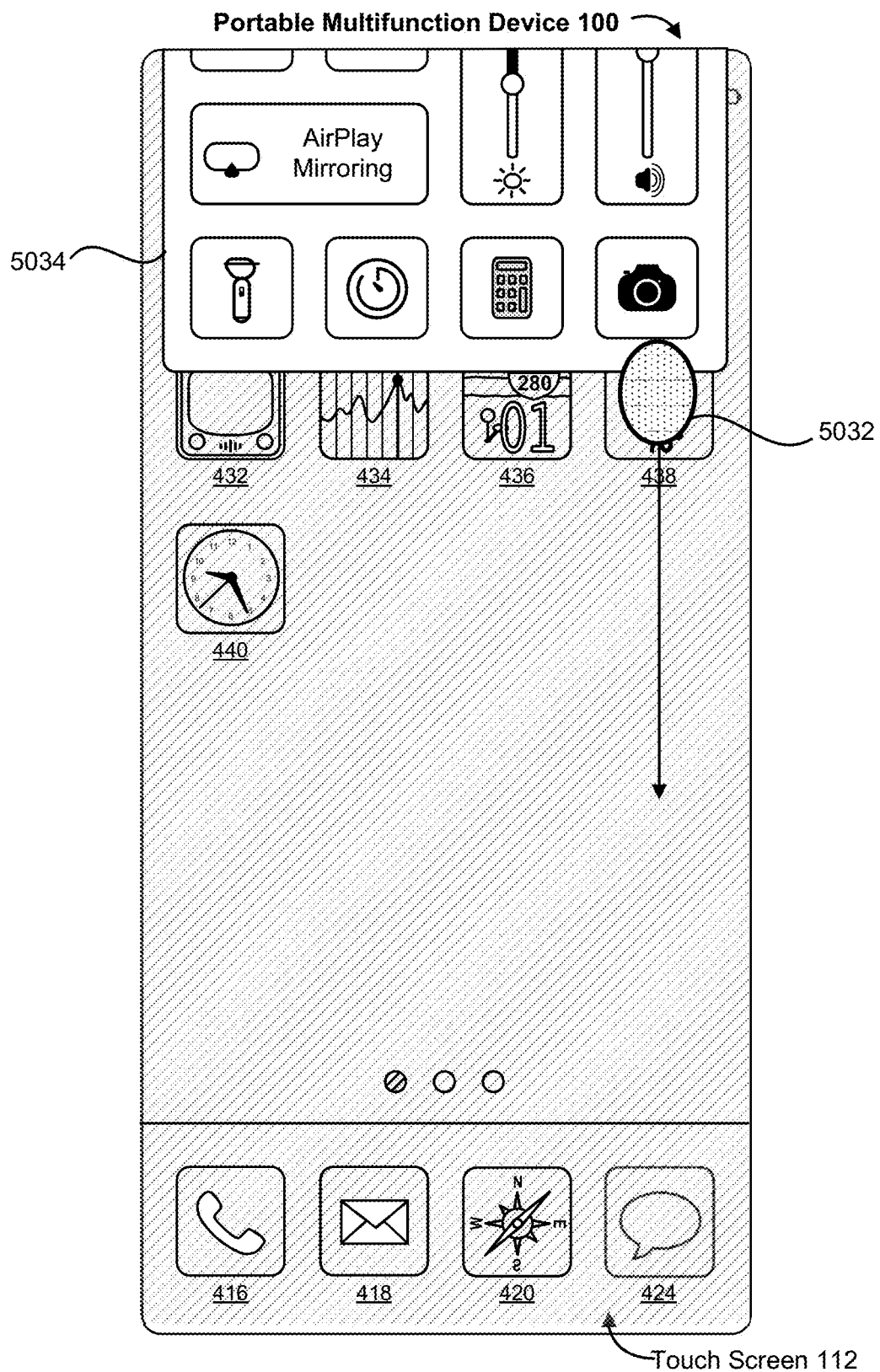
Figure 5Q:
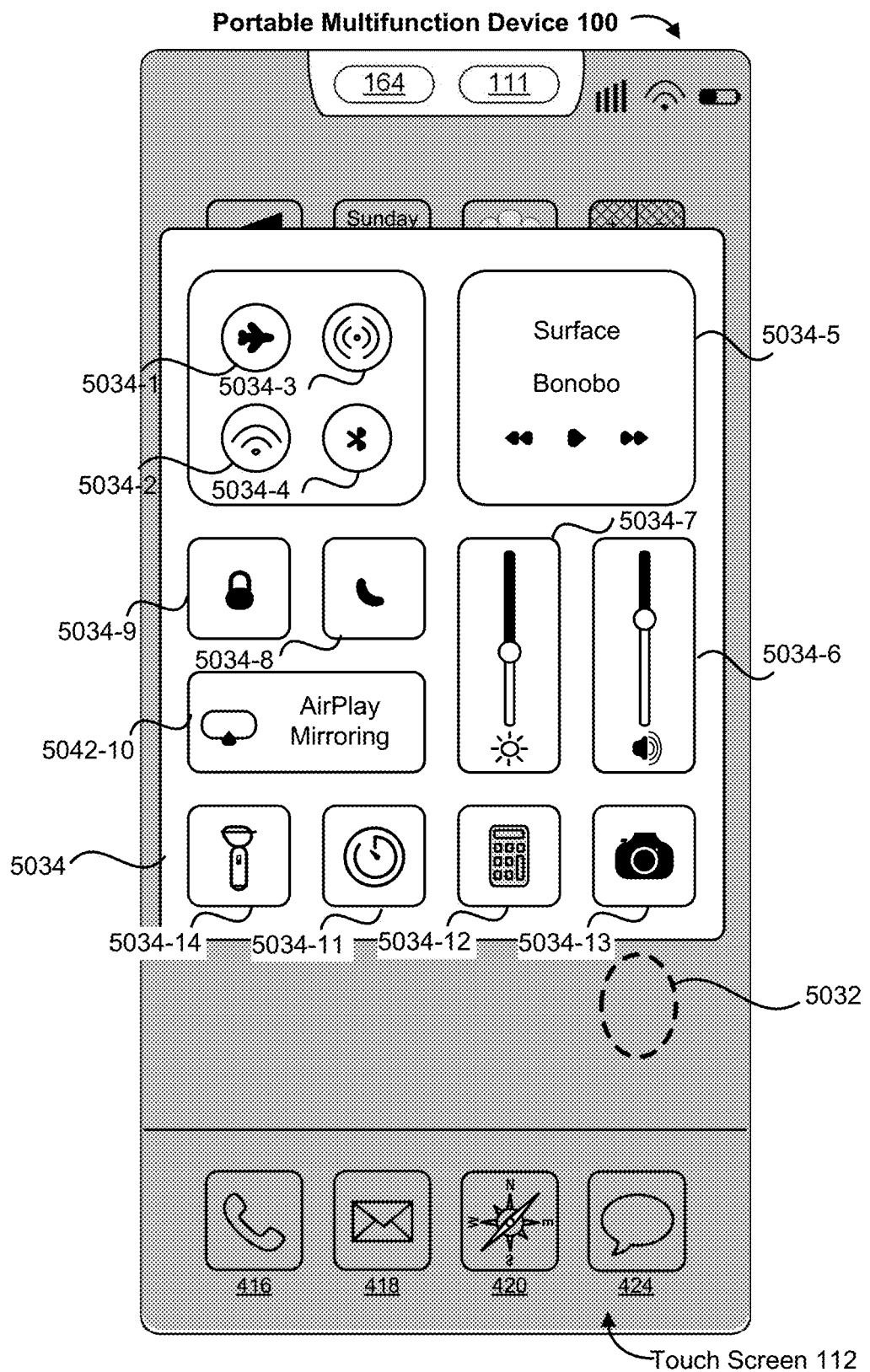

FIGS. 5-5Q illustrate a downward swipe gesture that causes the device to navigate from the home screen user interface of the device to the control panel user interface, in accordance with some embodiments.

In FIG. 5, the device 100 displays the home screen user interface in the full-screen mode. The device detects a contact (e.g., contact 5032) in a third portion of the edge region (e.g., region 5003-3) of touch screen 112 (e.g., in a right-top edge region of touch screen 112). In some embodiments, the first portion, the second portion, and the third portion of the edge region of touch screen 112 are distinct from, and mutually exclusive to, each other. In some embodiments, a relative width of region 5003-3 ranges from about 50% to about 20% of the width of the top edge of touch screen 112. The relative width may vary according to an orientation (e.g., a vertical vs. horizontal orientation) of the device. The relative width also varies in accordance with type of a device (e.g., whether the device is a mobile phone or a tablet computer). In some embodiments, regions 5003-1, 5003-2, and 5003-3 are operationally adjacent to each other so that that there are no interaction regions between regions 5003-1 and 5003-2 and regions 5003-1 and 5003-3. In some embodiments, regions 5003-1, 5003-2, and 5003-3 are separate from each other so that there are inactive regions between them (e.g., a downward swipe gesture detected on a respective inactive region between regions 5003-1 and 5003-2 or between regions 5003-1 and 5003-3 does not invoke any of the operations invoked by a downward swipe gesture detected on regions 5003-1, 5002-2 or 5003-3. In some embodiments, regions 5003-1, 5003-2, and 5003-3 have substantially corresponding widths (e.g., the top edge of touch screen 112 is divided into equal three portions). In some embodiments, regions 5003-1, 5003-2, and 5003-3 have different relative widths (e.g., the region 5003-1 positioned in the middle has a greater relative width than regions 5003-2 and 5003-3 or regions 5003-2 and 5003-3 have greater relative widths than the middle region 5003-1). It is understood that the relative widths and positions of the regions may vary in accordance with the type of the device or the orientation of the device. In some embodiments, regions 5003-1, 5003-2, and 5003-3 are not visually marked with respective boundaries on the edge region of touch screen 112 (e.g., regions 5003-1, 5003-2, and 5003-3 do not have corresponding user interface elements displayed at or near the regions). Region 5003-1 is positioned between regions 5003-2 and 5003-3. In some embodiments, region 5003-3 includes a portion of the home screen user interface. For example, in FIG. 5O a device status indicator (e.g., including a battery status indicator and signal strength indicators for cellular and Wi-Fi signals) of the home screen user interface is displayed in region 5003-3. In FIGS. 5O-5Q, the device detects movement of contact 5032 in the first direction (e.g., downward movement 5033 of contact 5032 from the right-top edge of touch screen 112 to the middle-right portion of touch screen 112). In some embodiments, the movement 5033 of contact 5032 corresponds to a downward swipe starting from the right-top edge of touch screen 112. In some embodiments, movement 5033 of contact 5032 includes downward movement from outside of touch screen 112 across the top edge of touch screen 112 along a right portion of touch screen 112 (e.g., movement 5033 of contact 5032 crosses the top edge of touch screen 112 and moves at least a threshold distance away from the top edge of touch screen 112 along the right portion of touch screen).

In accordance with a determination that movement 5033 of contact 5032 satisfies first criteria for displaying a control panel user interface (e.g., user interface 5034 in FIG. 5P), the device initiates display of the control panel user interface. As used herein, the control panel user interface (also referred to as control center user interface or control user interface) is used for controlling a plurality of system level operations. The control panel user interface includes a plurality of controls (e.g., affordances) that correspond to a plurality of system functions of the device. In some embodiments, the first criteria for displaying the control panel user interface include a requirement that the movement of contact 5032 begins from the right portion of the top edge of touch screen 112 (e.g., region 5003-3 in FIG. 5O), in order for the first criteria to be met. In some embodiments, the first criteria for displaying the control panel user interface include a requirement that the movement of contact 5032 is in a substantially downward direction, in order for the first criteria to be met. In some embodiments, initiating display of the control panel user interface includes displaying the notification panel user interface sliding onto the touch screen in accordance with the downward movement of contact 5032. In some embodiments, replacing the display of the home screen user interface with the control panel user interface in accordance with the movement of contact 5032 illustrated in FIGS. 5O-5Q is done as described with respect to replacing the home screen user interface with the search user interface in FIGS. 5A-5C. In some embodiments, the control panel user interface is dismissed as described with respect to dismissing of the search user interface in FIG. 5C.

In FIG. 5Q, the device has detected lift-off of contact 5032 at a location that is in the middle-right portion of touch screen 112 (e.g., with a movement distance meeting the requirement of the first criteria for displaying the control panel user interface, and/or with a movement speed at lift-off that meets the first criteria, etc.); and in accordance with a determination that the first criteria for displaying the control panel user interface are met by the downward swipe gesture at the lift-off of contact 5032, the device displays the control panel user interface (e.g., user interface 5034) in the full-screen mode. In some embodiments, the device replaces the home screen user interface (e.g., user interface 5002) with the control panel user interface (e.g., user interface 5034). In some embodiments, the home screen user interface is no longer displayed in the background of the control panel user interface. In some embodiments, a reduced visibility version of the home screen user interface serves as a background layer of the control panel user interface. In accordance with a determination that the first criteria for displaying the control panel user interface are not met by the downward swipe gesture at the lift-off of contact 5032, the device forgoes displaying the control panel user interface in the full screen mode and instead continues displaying the home screen user interface.

The control panel user interface includes one or more control affordances. As shown in FIG. 5Q, the control panel user interface includes airplane mode icon 5034-1 (that when activated causes the device to turn on/off a limited wireless connectivity mode), cellular data icon 5034-3, Wi-Fi icon 5034-2, Bluetooth icon 5034-4, audio control 5034-5, orientation lock icon 5034-9 (for locking an orientation of the touch screen so that the orientation does not change when an orientation of the device changes), call and notification silencing icon 5034-8 (for silencing call and notifications during selected time periods), content casting icon 5042-10 (for causing a nearby device to play content that is currently playing on the device), brightness control 5034-7, volume control 5034-6, and one or more user-configurable control affordances, including flashlight icon 5034-14, timer icon 5034-11, calculator icon 5034-12, and camera icon 5034-13. In some embodiments, one or more of the control affordances on the control panel user interface are not user-configurable (e.g., may not be removed or rearranged by a user of device 100). For example, in some embodiments, control affordances such as airplane mode icon 5034-1, cellular data icon 5034-3, Wi-Fi icon 5034-2, Bluetooth icon 5034-4, audio control 5034-5, orientation lock icon 5034-9, call and notification silencing icon 5034-8, content casting icon 5042-10, brightness control 5034-7, and volume control 5034-6 are not user-configurable. In some embodiments, one or more of the control affordances on the control panel user interface are user-configurable (e.g., may be added, removed, or rearranged by a user of device 100). For example, in some embodiments, control affordances such as flashlight icon 5034-14, timer icon 5034-11, calculator icon 5034-12, and camera icon 5034-13 are user-configurable.

Figure 5R:
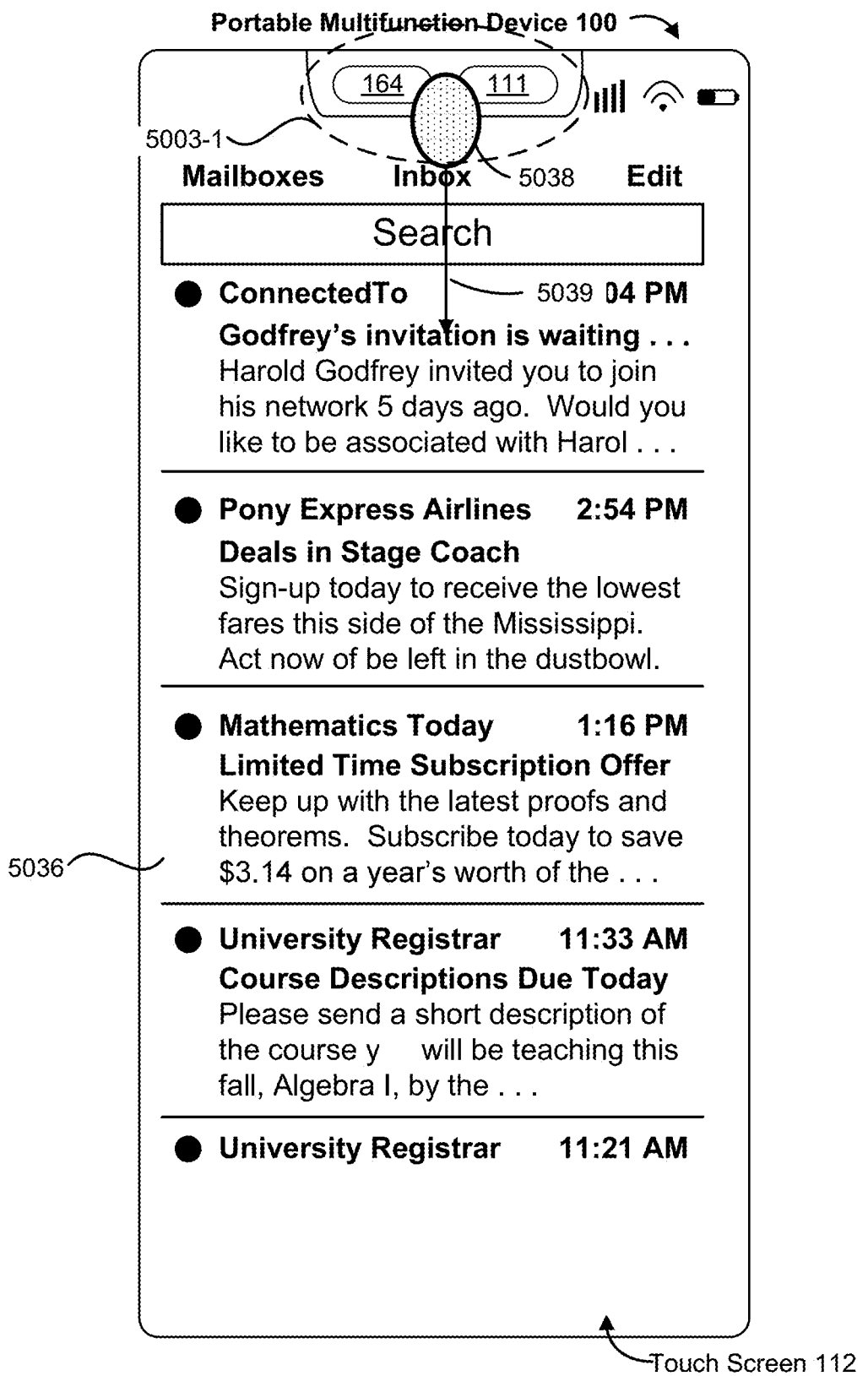
Figure 5S:
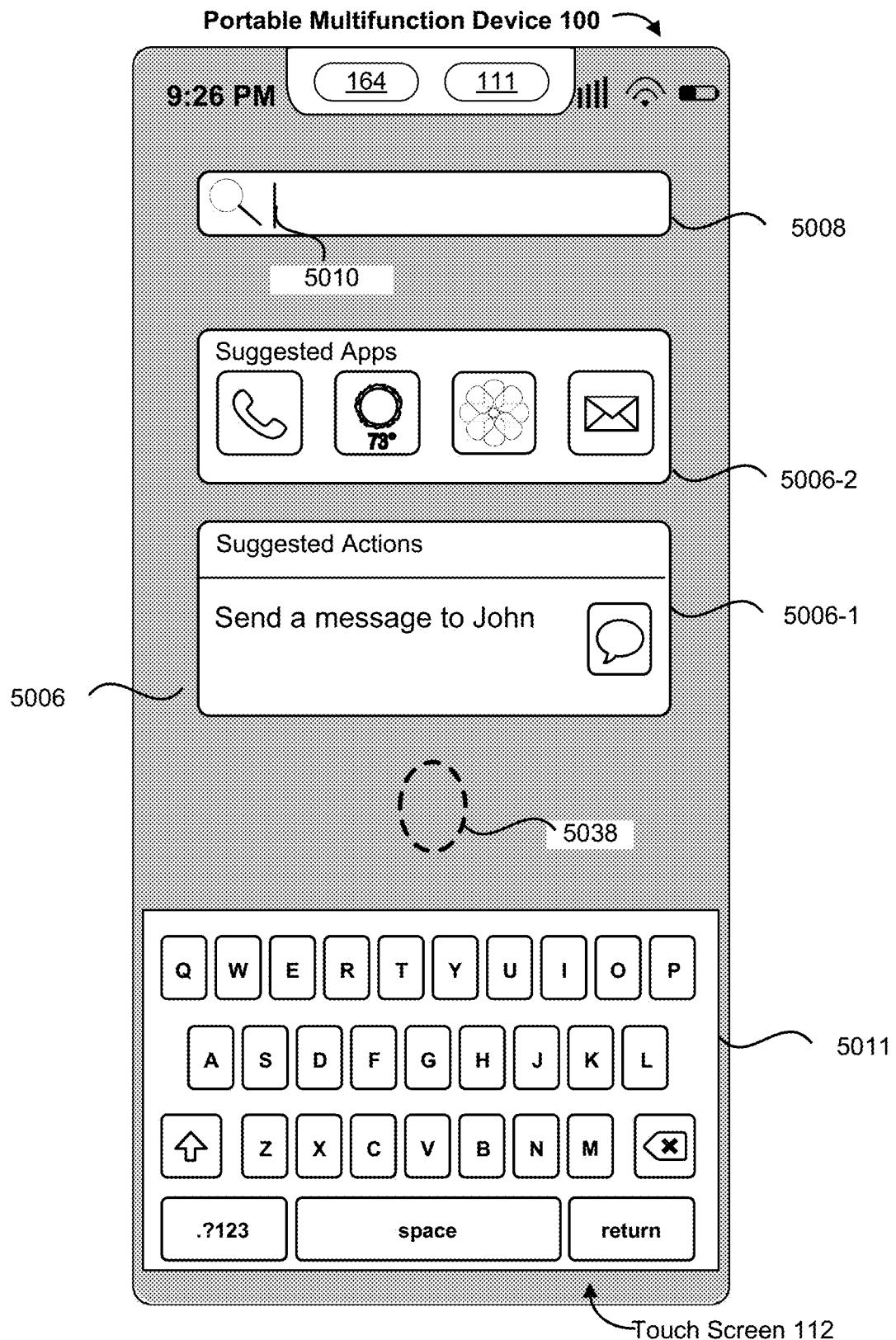

FIGS. 5R-5S illustrate a downward swipe gesture that causes the device to navigate from an application user interface of the device to the search user interface, in accordance with some embodiments.

In FIG. 5R, the device 100 displays an application user interface (e.g., email user interface 5036) in the full screen mode. The device detects a contact (e.g., contact 5038) in the first portion of the edge region (e.g., region 5003-1) of touch screen 112 (e.g., in a middle-top edge region of touch screen 112). In FIGS. 5R-5S, the device detects movement of contact 5038 in the first direction (e.g., downward movement 5039 of contact 5030 from the middle portion of touch screen 112). As shown, the movement 5031 of contact 5030 is substantially perpendicular to the top edge of touch screen 112. In some embodiments, the movement 5039 of contact 5038 corresponds to movement 5005 of contact 5004 described above with respect to FIGS. 5A-5C.

In accordance with a determination that movement 5039 of contact 5038 satisfies third criteria for displaying the search user interface (e.g., user interface 5006),), the device displays the search user interface. In some embodiments, the third criteria for displaying the search user interface corresponds to the first criteria for displaying the search user interface, described above with respect to FIGS. 5A-5C. The device thereby displays the search user interface in accordance with a determination that the movement of the contact meets the first criteria for displaying the search user interface regardless of detecting the contact while displaying the home screen user interface (e.g., user interface 5002) or displaying an application user interface (e.g., email user interface 5036). In accordance with a determination that the movement of contact 5038 does not meet the third criteria for displaying the search user interface, the device forgoes displaying the search user interface in the full screen mode and instead continues displaying the application user interface.

As shown in FIG. 5S, the device has detected lift-off of contact 5038 (e.g., with a movement distance meeting the requirement of the third criteria, and/or with a movement speed at lift-off that meets the third criteria for displaying the search user interface, etc.); and in accordance with a determination that the movement of contact 5038 satisfies third criteria for displaying the search user interface (e.g., user interface 5006) the device displays the search user interface. In some embodiments, the device displays replacing the application user interface gradually with the search user interface in accordance with movement 5039 of contact 5038, as described above with respect to replacing the home screen user interface with the search user interface in FIGS. 5A-5C.

FIGS. 5T-5W illustrates downward swipe gestures that cause the device to navigate from a low power mode to a wake screen user interface and further to the search user interface, in accordance with some embodiments.

Figure 5T:
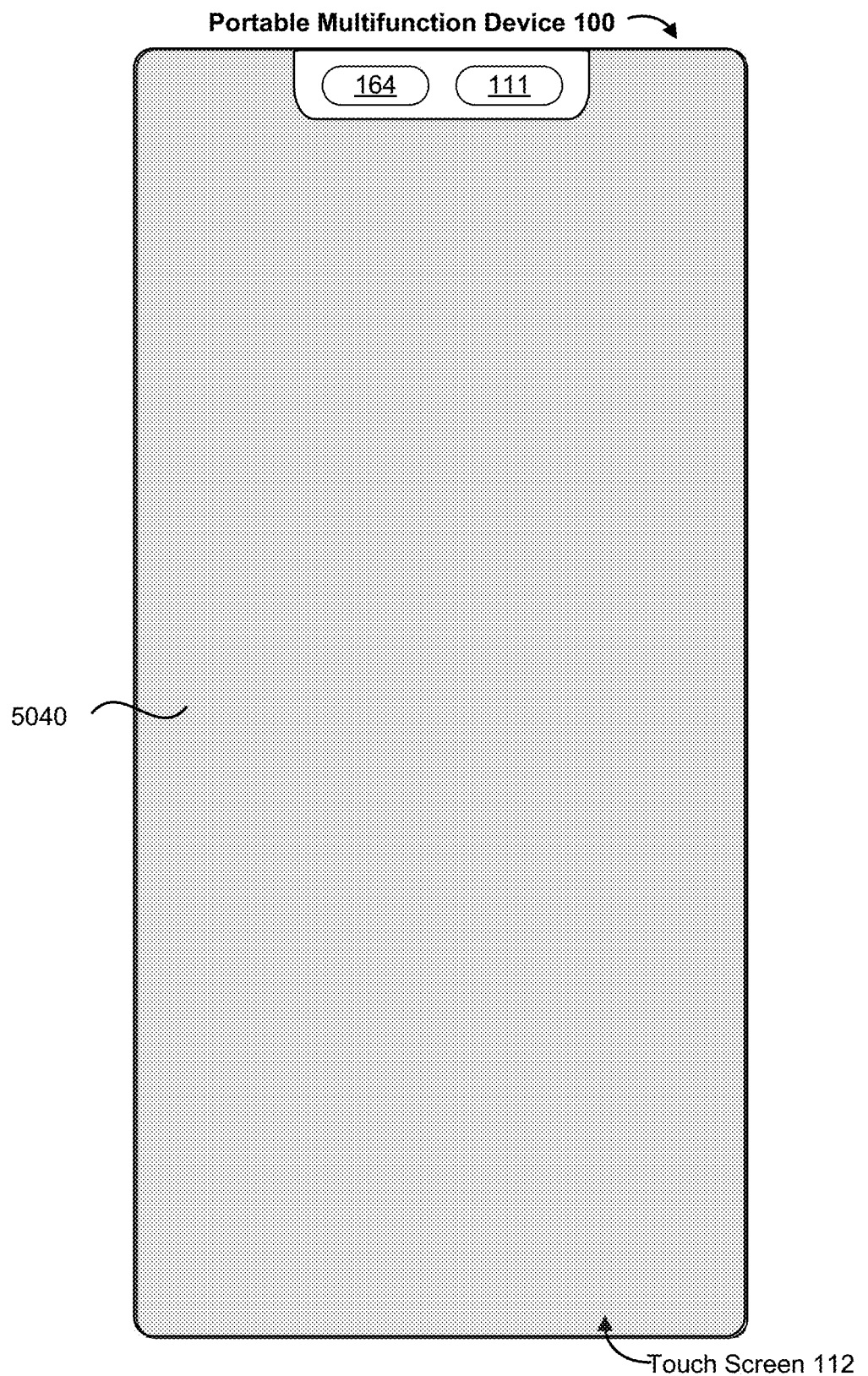
Figure 5U:
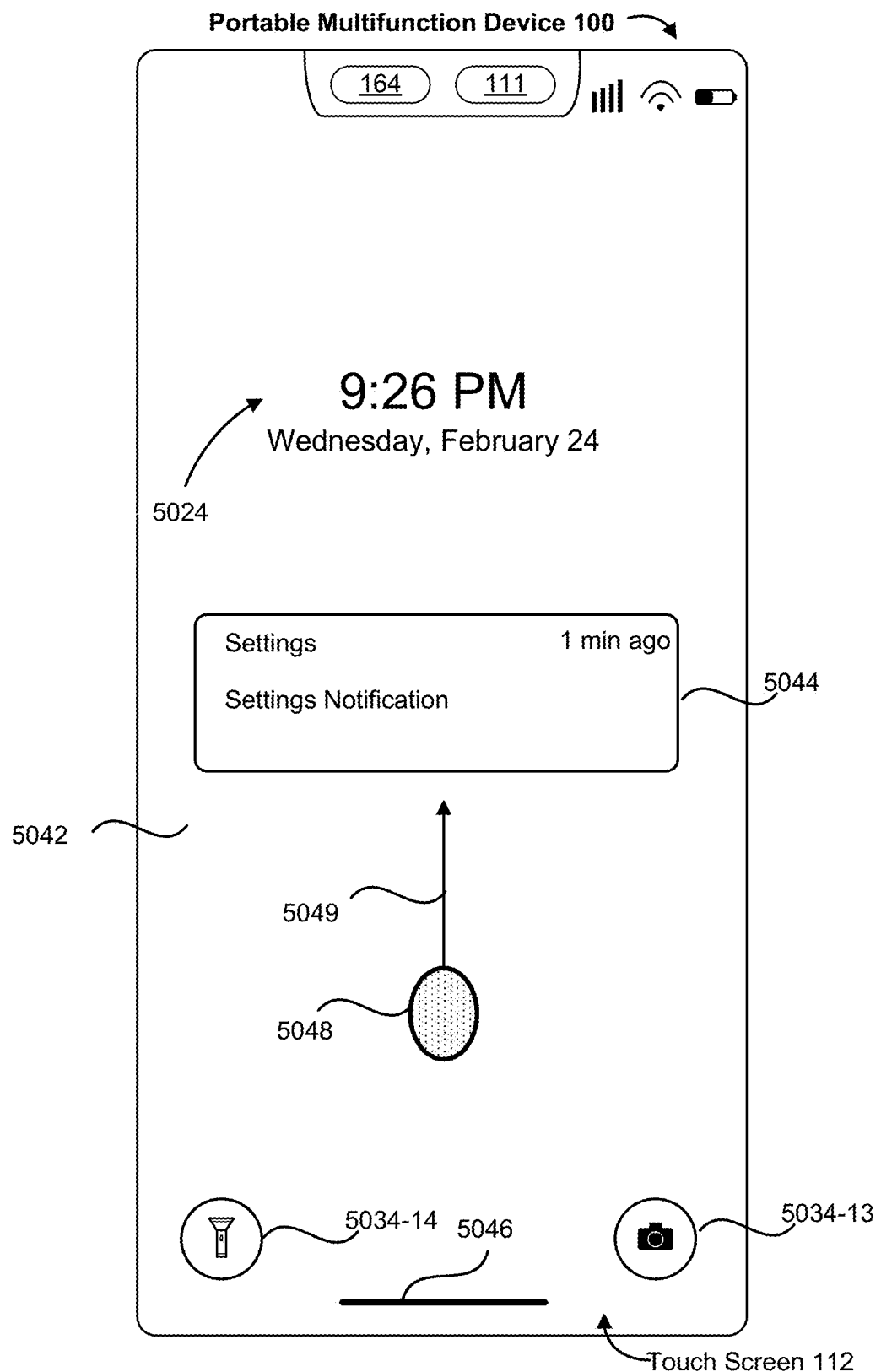

In FIG. 5T, the device 100 is in a low power mode (e.g., low power mode 5040) (e.g., a low power always-on mode, a display-off mode, a power-saving sleep mode, etc.). In some embodiments, when in the low power mode, the device has turned touch screen 112 off thereby reducing the power consumption of the device. For example, the device has turned off any display by a display generation component (e.g., display controller 156 associated with touch screen 112). In some embodiments, the device turns on the low power mode in accordance with a determination that there has been no user interaction with the touch screen 112 for a predetermined time period. In some embodiments, the device turns on the low power mode in response to detecting a user input for turning on the low power mode. In some embodiments, the device turns off the low power mode in response to detecting a change in the orientation of the device. For example, the orientation of the device has changed from a horizontal orientation (e.g., lying flat) to a vertical position. When the device exits the low power mode (e.g., wakes up when a communication is received, the user picks up the phone, hits the on/off button, or touches the screen) the display generation component displays a wake screen user interface (e.g., user interface 5042), as illustrated in FIG. 5U. In some embodiments, the wake screen user interface is initially displayed in a locked state, and later transitions into an unlocked state after authentication information has been obtained (e.g., through passcode entry, or biometric information verification). In some embodiments, the wake screen user interface and the lock screen user interface have a similar appearance. In some embodiments, the wake screen user interface includes a time element (e.g., time element 5024) that displays the current time and optionally date. In some embodiments, the wake screen user interface displays a prompt (e.g., prompt element 5046) for unlocking the device when the device is locked. In some embodiments, the wake screen displays one or more notifications (e.g., notification 5044) at a time when the one or more notifications are newly received (and, optionally, while the notifications maintain the unread status in the always-on lower power mode). In some embodiments, the wake screen user interface includes one or more of the control affordances such as flashlight icon 5034-14 and camera icon 5034-13, as shown in FIG. 5U.

Figure 5V:
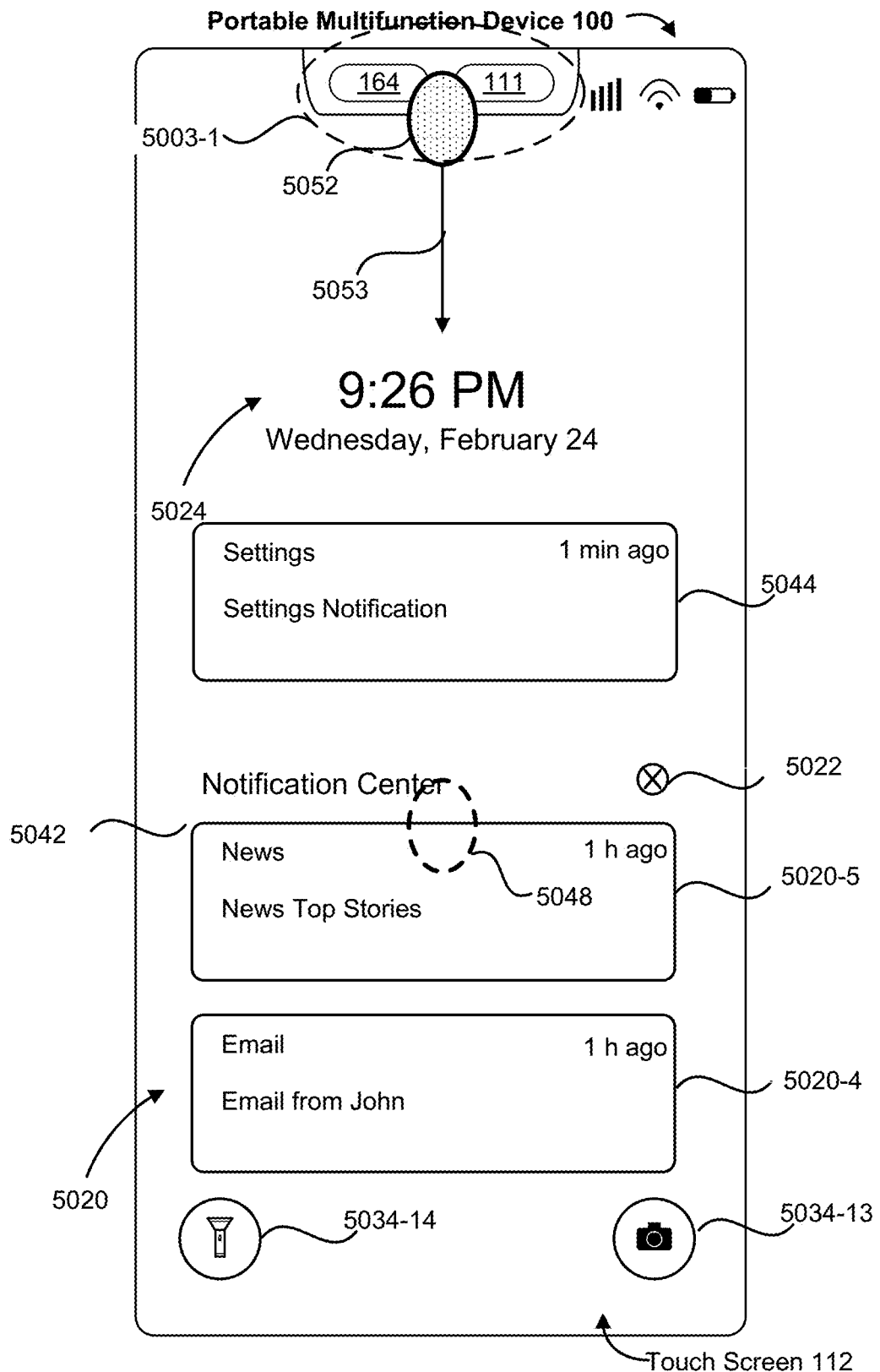

In FIG. 5U, the device detects a contact (e.g., contact 5048) in a middle portion of touch screen 112 (e.g., portion 5025 positioned away from the edges of touch screen 112 corresponding to the interior portion of touch screen 112 shown in FIG. 5I). In FIGS. 5U and 5V, the device detects movement of contact 5048 in the second direction (e.g., upward movement 5049 from the middle portion of touch screen 112). As shown, the movement 5049 of contact 5048 is substantially perpendicular to the top edge of touch screen 112. In some embodiments, movement 5049 of contact 5048 corresponds to an upward swipe starting from the middle portion of touch screen 112 toward the top edge of touch screen 112.

In FIG. 5V, the device has detected lift-off of contact 5048; and in accordance with a determination that the movement of contact 5048 at the lift-off satisfies second criteria for displaying the notification center user interface (e.g., user interface 5020) the device displays the notification center user interface (e.g., interface 5020 including regions 5020-4 and 5020-5). In some embodiments, the second criteria for displaying the notification center user interface include a requirement that contact 5048 is detected while displaying the wake screen user interface (e.g., user interface 5042 in FIG. 5U), in order for the second criteria to be met. In some embodiments, the second criteria for displaying the notification center user interface include a requirement that movement of contact 5048 begins from the middle portion of touch screen 112, in order for the first criteria to be met. In some embodiments, the second criteria for displaying the notification center user interface include a requirement that the movement of contact 5048 is in a substantially upward direction, in order for the second criteria to be met. In some embodiments, initiating display of the notification center user interface includes displaying the notification user interface sliding onto the touch screen in accordance with the upward movement of contact 5048. For example, a top edge of the notification center user interface (e.g., a top edge of region 5046-5) follows the movement of contact 5018 as contact 5018 moves downward. In some embodiments, in accordance with a determination that the swipe gesture is detected, and more than a threshold amount of movement in the downward direction has been made by the contact, the device displays the notification center user interface, partially replacing the wake screen user interface on touch screen 112 (e.g., the notification center user interface continues upward movement on the touch-screen until it replaces the portion of the wake screen user interface on the touch-screen). In some embodiments, the device does not complete the process for displaying the notification center user interface and redisplays the wake screen user interface after the termination of the swipe gesture, if the movement of contact 5048 is reversed and/or does not meet the threshold distance or direction requirements of the second criteria. In some embodiments, initiating display of the notification center user interface includes making the notification center user interface gradually appear on top of the bottom screen user interface.

Figure 5W:
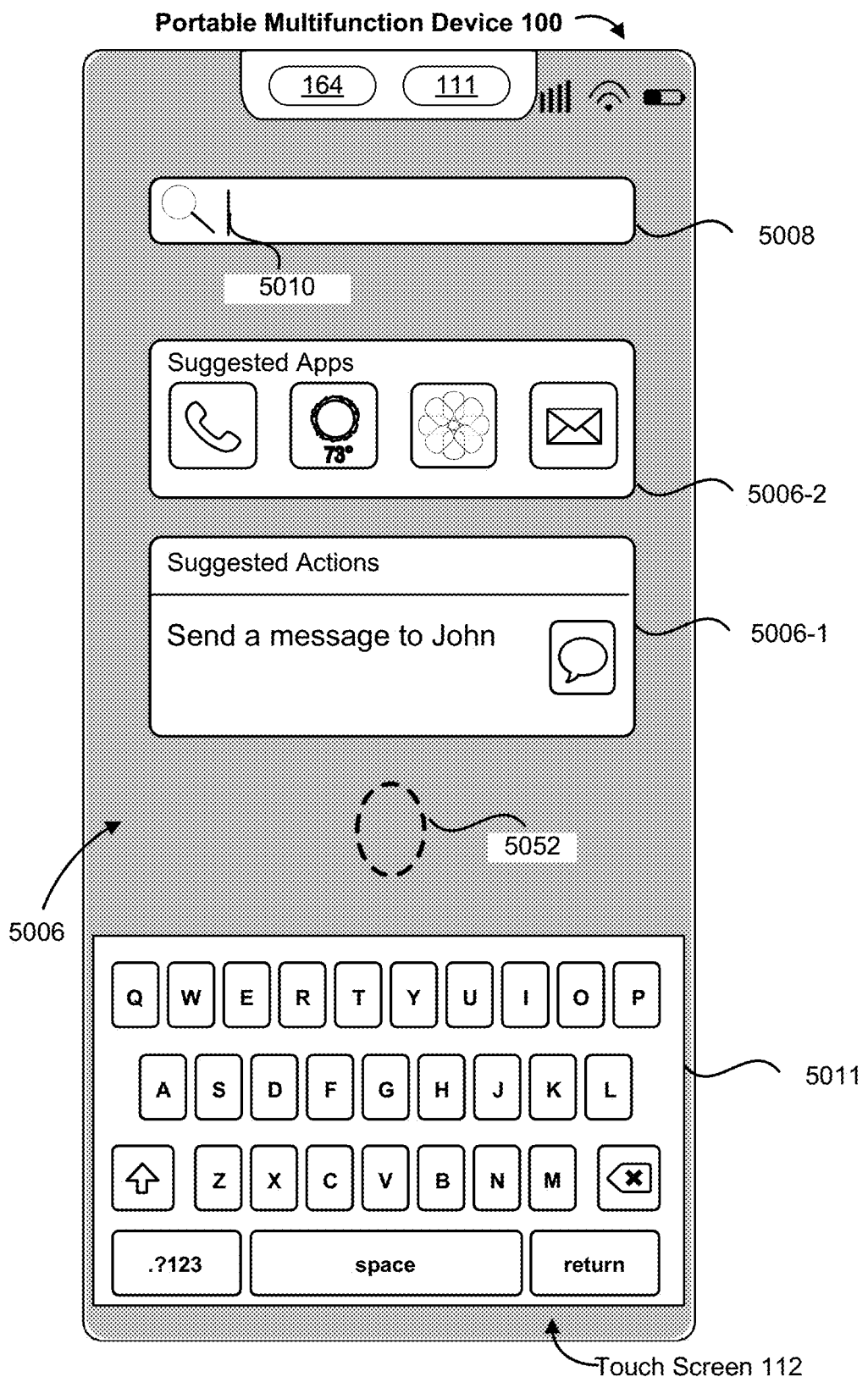

In FIG. 5V, the device further detects a contact (e.g., contact 5052) in the first portion of the edge region (e.g., region 5003-1) of touch screen 112 (e.g., in the middle-top edge region of touch screen 112). In FIGS. 5V-5W, the device detects movement of contact 5038 in the first direction (e.g., downward movement 5053 of contact 5052 from the middle portion of touch screen 112). As shown, movement 5053 of contact 5052 is substantially perpendicular to the top edge of touch screen 112. In some embodiments, the movement 5053 of contact 5052 corresponds to movement 5005 of contact 5004 described above with respect to FIGS. 5A-5C.

In FIG. 5W, the device has detected lift-off of contact 5052; and in accordance with a determination that the movement of contact 5038 at the lift-off satisfies the fourth criteria for displaying the search user interface (e.g., user interface 5020), the device displays the search user interface in the full screen mode. In some embodiments, the device displays replacing the wake screen user interface gradually with the search user interface in accordance with movement 5053 of contact 5052, as described above with respect to replacing the home screen user interface with the search user interface in FIGS. 5A-5C. In some embodiments, the fourth criteria for displaying the search user interface correspond to the first criteria for displaying the search user interface, described above with respect to FIGS. 5A-5C. The device thereby displays the search user interface in accordance with a determination that the movement of the contact meets the first criteria for displaying the search user interface, regardless of detecting the contact while displaying the home screen user interface (e.g., user interface 5002), an application user interface (e.g., email user interface 5036) or the wake screen user interface (e.g., 5042). In accordance with a determination that the movement of contact 5038 does not meet the fourth criteria, the device forgoes displaying the search user interface in the full screen mode and instead continues displaying the wake user interface.

Figure 5X:
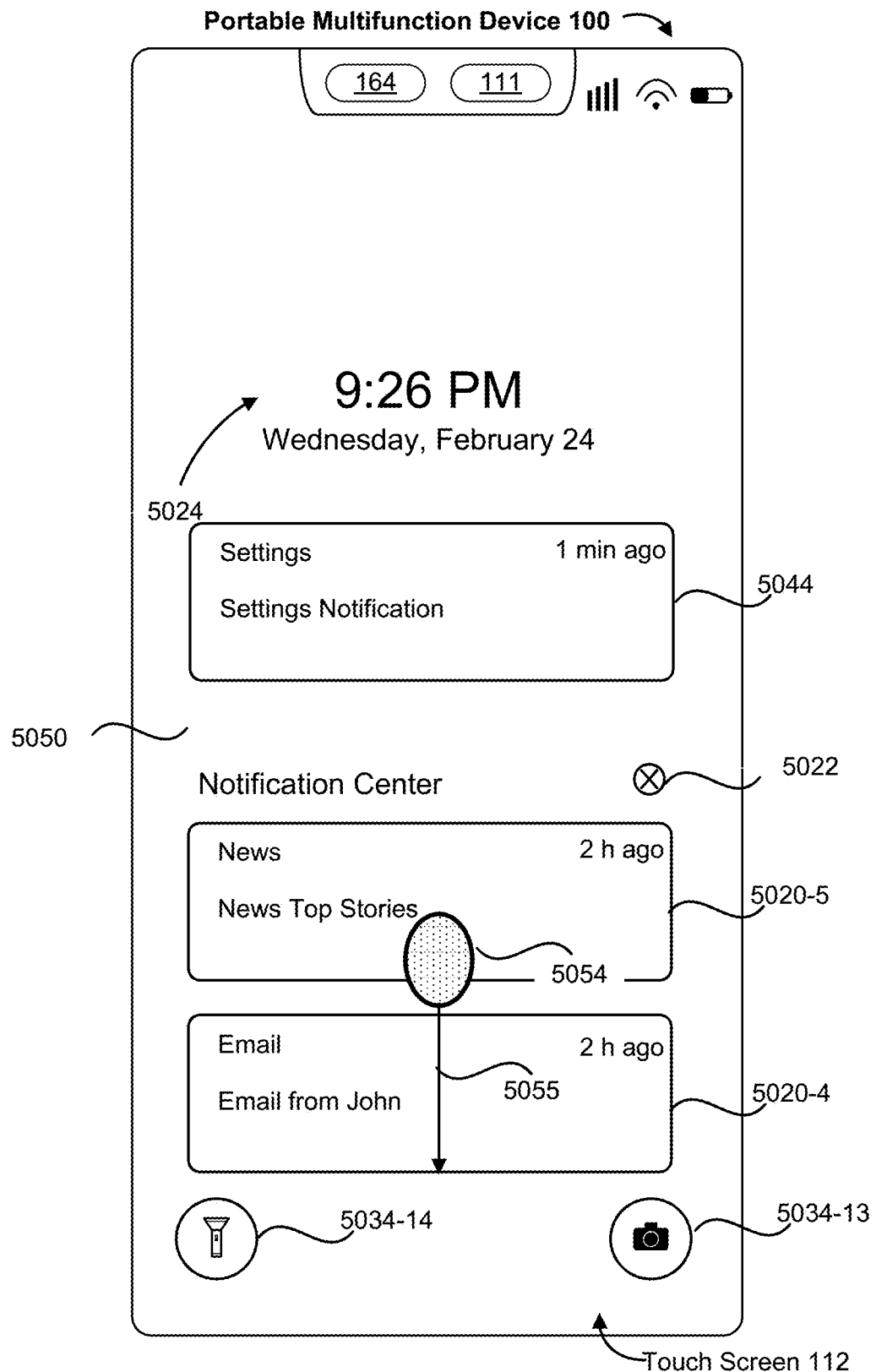
Figure 5Y:
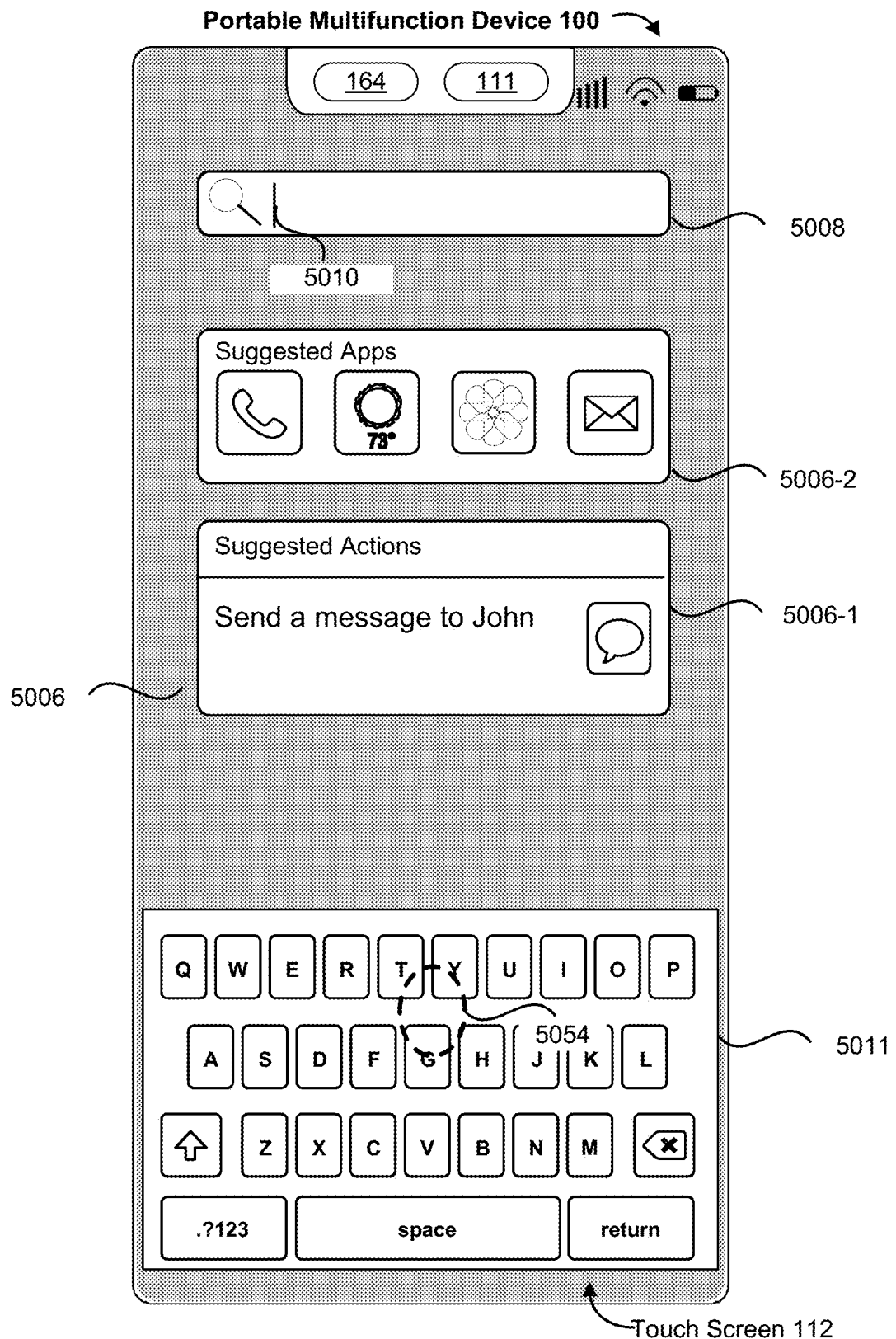

FIGS. 5X-5Y illustrate a downward swipe gesture that causes the device to navigate from a cover sheet user interface of the device to the search user interface, in accordance with some embodiments.

In FIG. 5X, the device 100 displays a cover sheet user interface (e.g., user interface 5050) in the full screen mode. In some embodiments, the cover screen user interface has a same or similar appearance as the wake screen user interface (e.g., user interface 5042 in FIGS. 5U and 5V) or the lock screen user interface. In some embodiments, the cover sheet user interface includes a time element (e.g., time element 5024) showing the current time and optionally the current date. In some embodiments, the cover sheet user interface includes one or more notifications (e.g., notification 5044) at a time when the one or more notifications are newly received (and, optionally, while the notifications maintain the unread status in the always-on lower power mode). In some embodiments, the cover sheet user interface includes a portion of notification center user interface 5020 (e.g., including regions 5020-5 and 5020-2). In some embodiments, however, unlike the wake screen user interface, display of the cover screen user interface does not need to be initiated when the device is in the low power mode and does not cause the device to be screen locked (e.g., dismissal of the cover screen user interface does not require a re-entry of the authentication information). In some embodiments, the cover sheet user interface has the same behavior as that shown in FIGS. 5I-5N. In FIG. 5X, the device detects a contact (e.g., contact 5054) in the middle portion of touch screen 112 (e.g., portion 5025 illustrated in FIG. 5I positioned away from the edges of touch screen 112 corresponding to the interior portion of touch screen 112). In FIGS. 5X-5Y, the device detects movement of contact 5054 in the first direction (e.g., downward movement 5055 of contact 5054 from the middle portion of touch screen 112). As shown, movement 5055 of contact 5054 is substantially perpendicular to the top edge of touch screen 112.

In FIG. 5Y, the device has detected lift-off of contact 5054; and in accordance with a determination that the movement of contact 5054 satisfies fifth criteria for displaying the search user interface (e.g., user interface 5006), the device displays the search user interface in the full screen mode. In some embodiments, the device displays replacing the cover sheet interface gradually with the search user interface in accordance with movement 5055 of contact 5054, as described above with respect to replacing the home screen user interface with the search user interface in FIGS. 5A-5C. In some embodiments, the fifth criteria for displaying the search user interface include a requirement that the movement of contact 5054 begins from the middle portion of touch screen 112 (e.g., portion 5025 of touch screen 112 shown in FIG. 5I), in order for the fifth criteria to be met. In some embodiments, the fifth criteria include a requirement that the movement of contact 5054 is substantially downward direction, in order for the fifth criteria to be met. In some embodiments, the fifth criteria include a requirement that the movement of contact 5054 is detected while displaying the cover sheet user interface, in order for the fifth criteria to be met. In accordance with a determination that the movement of contact 5054 does not meet the fifth criteria, the device forgoes displaying the search user interface in the full screen mode and instead continues displaying the cover sheet user interface.

Figure 5Z:
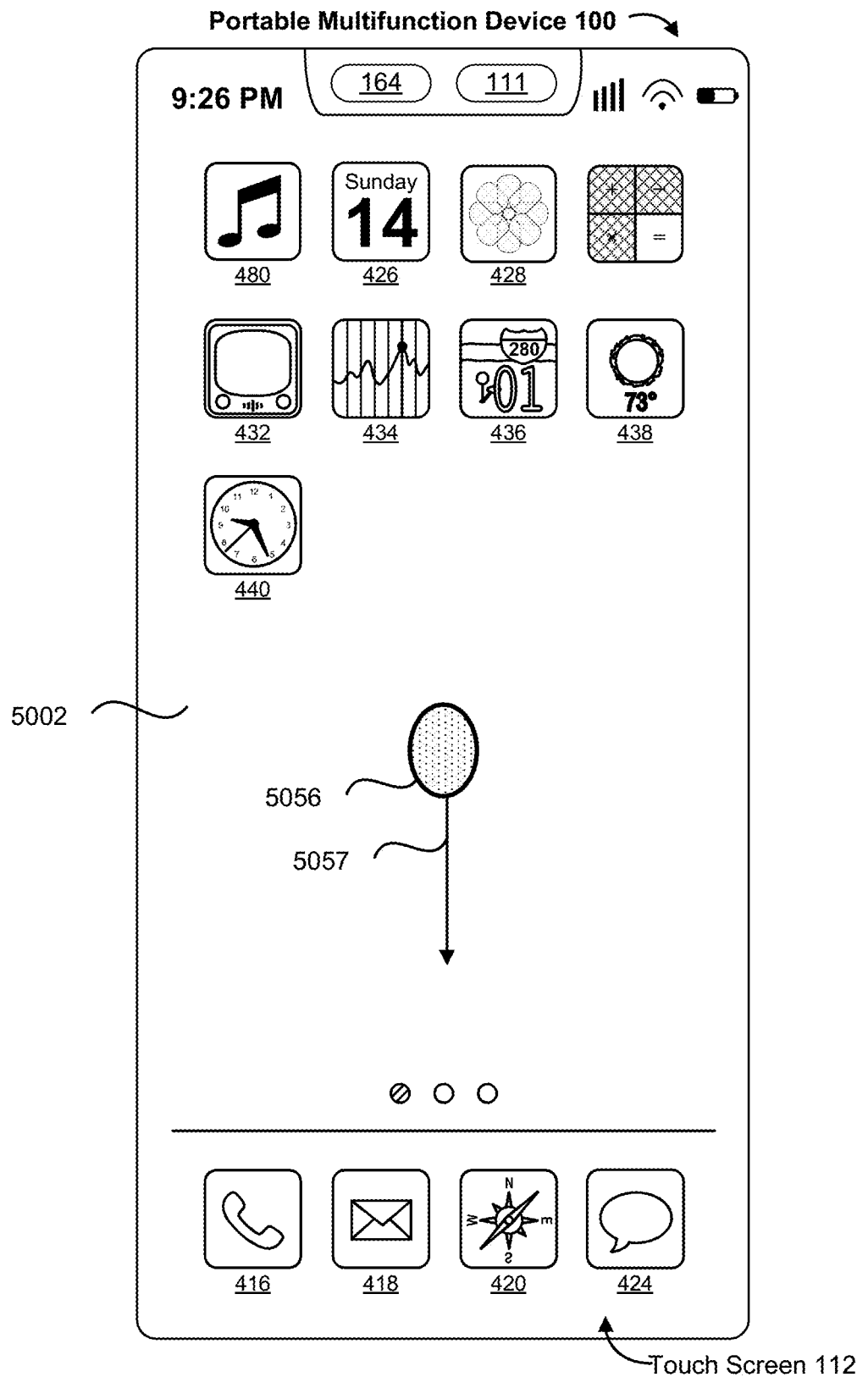
Figure 5A:
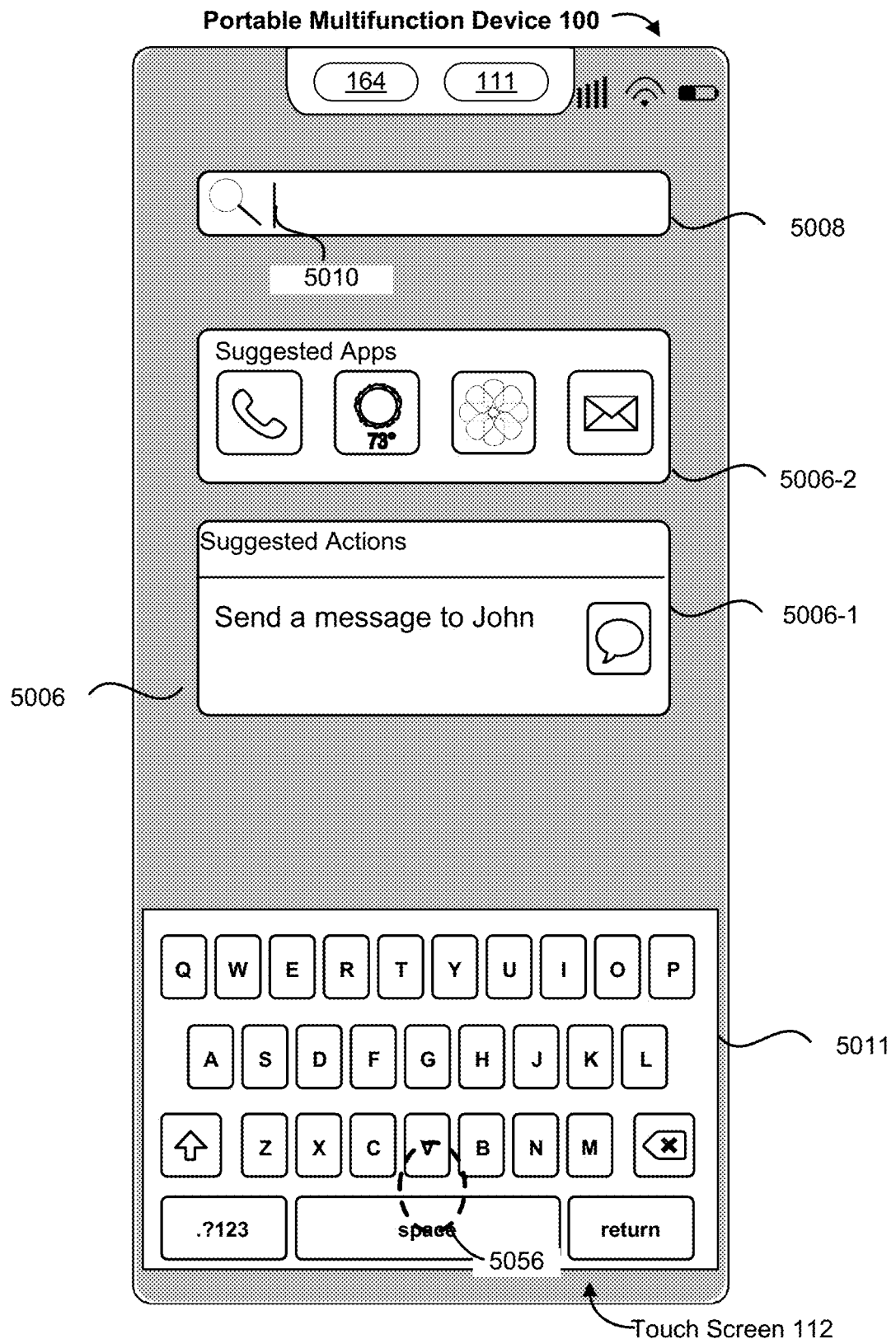
Figure 5A:
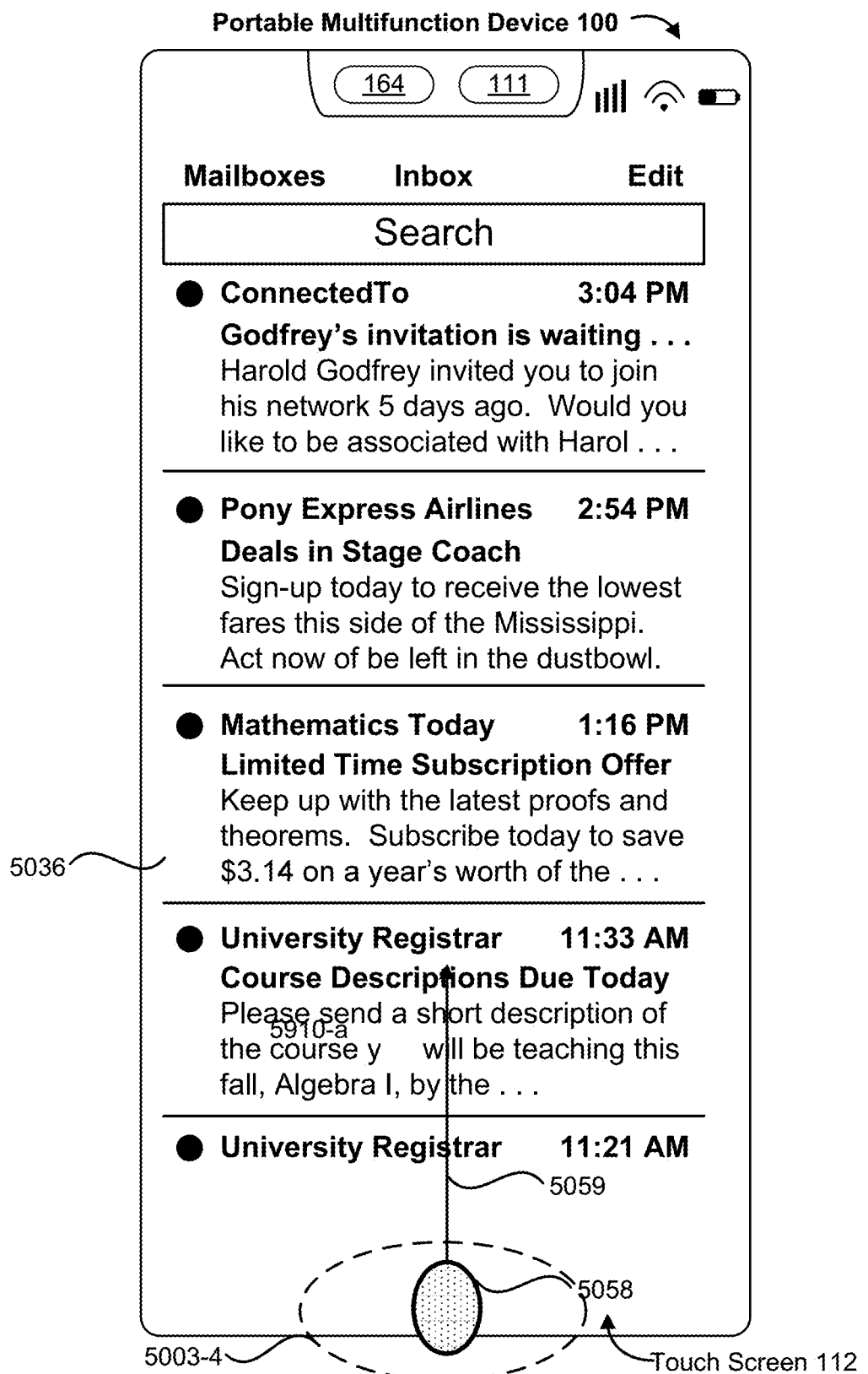
Figure 5A:
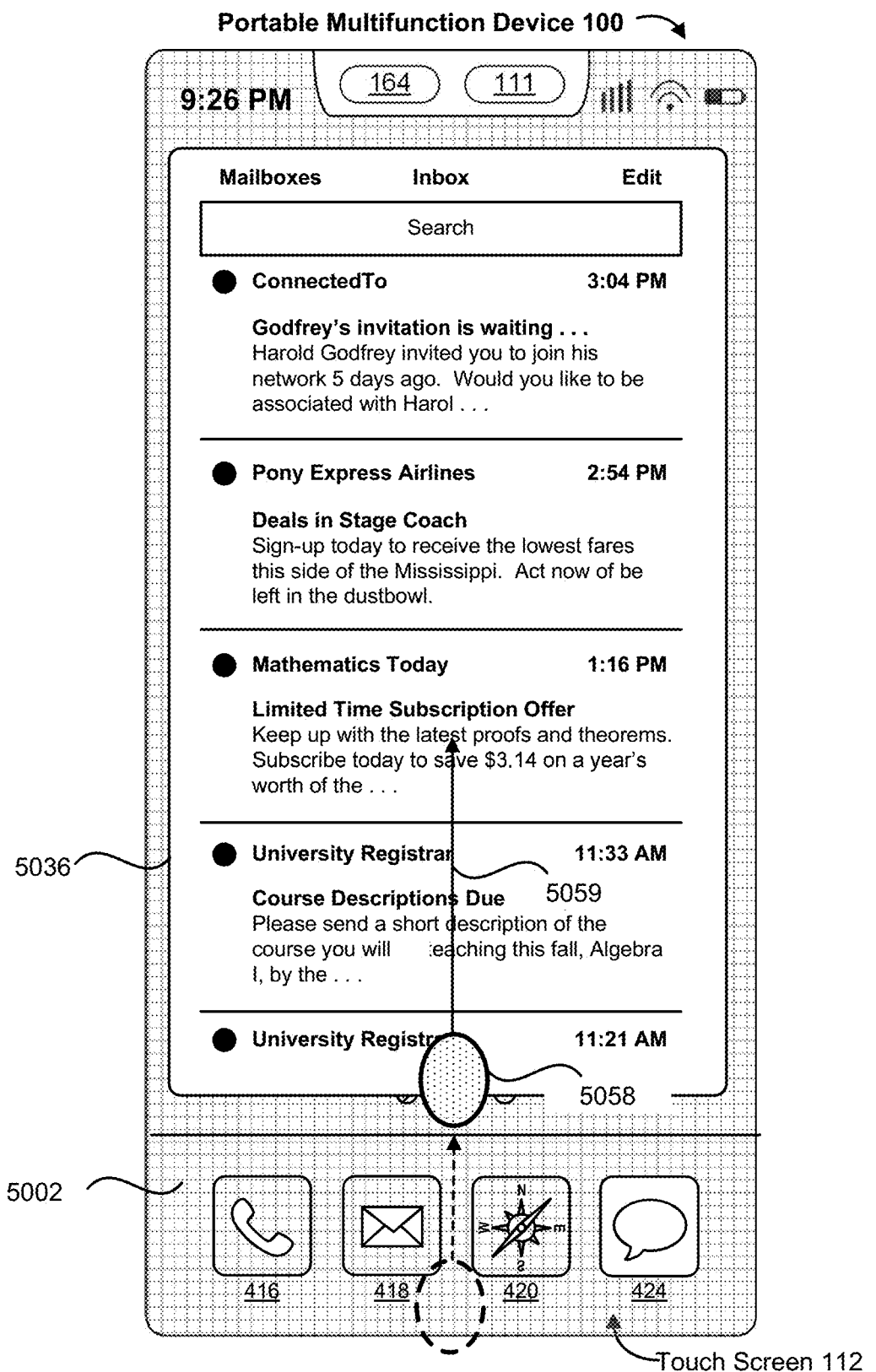
Figure 5A:
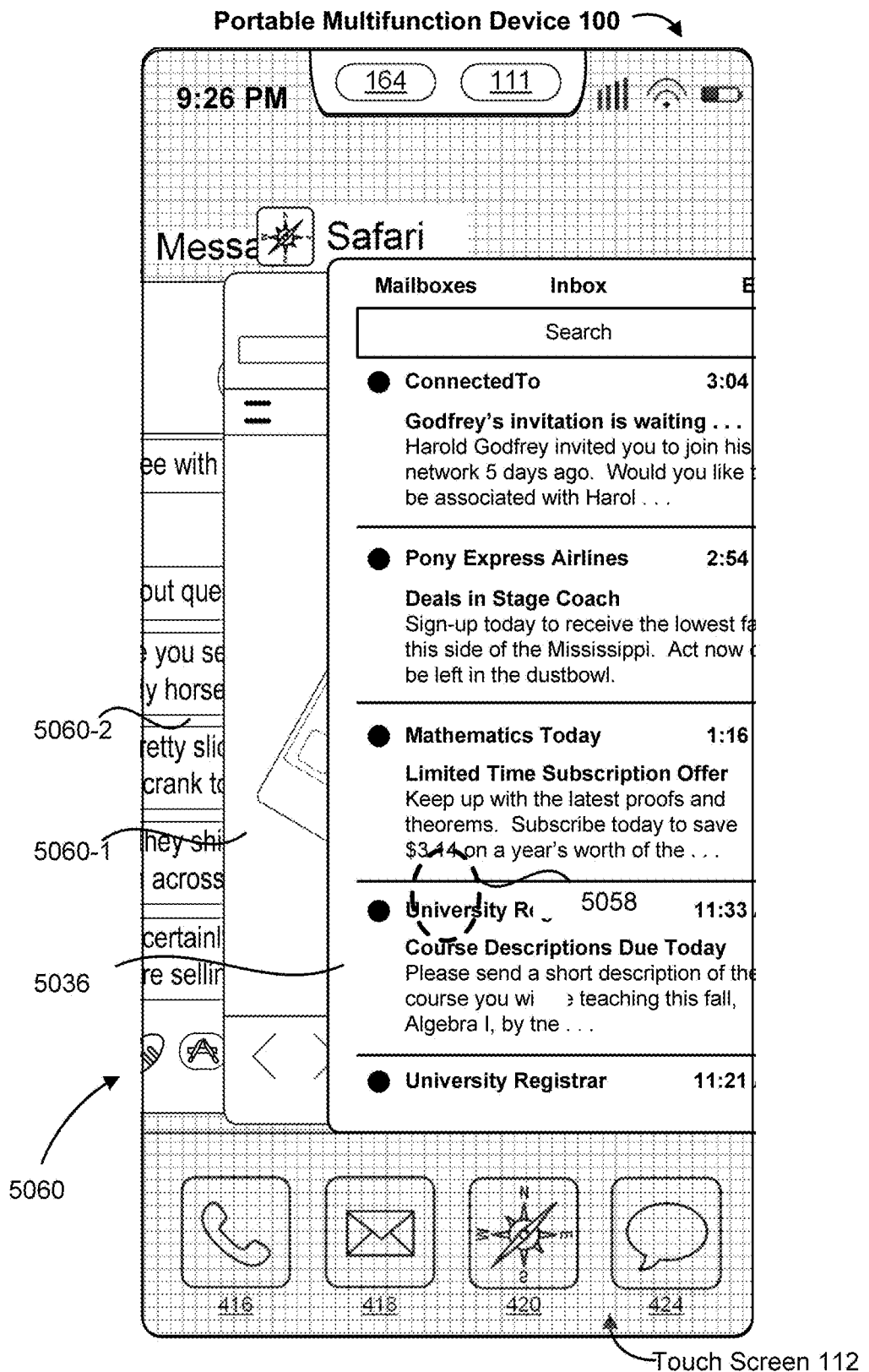
Figure 5A:
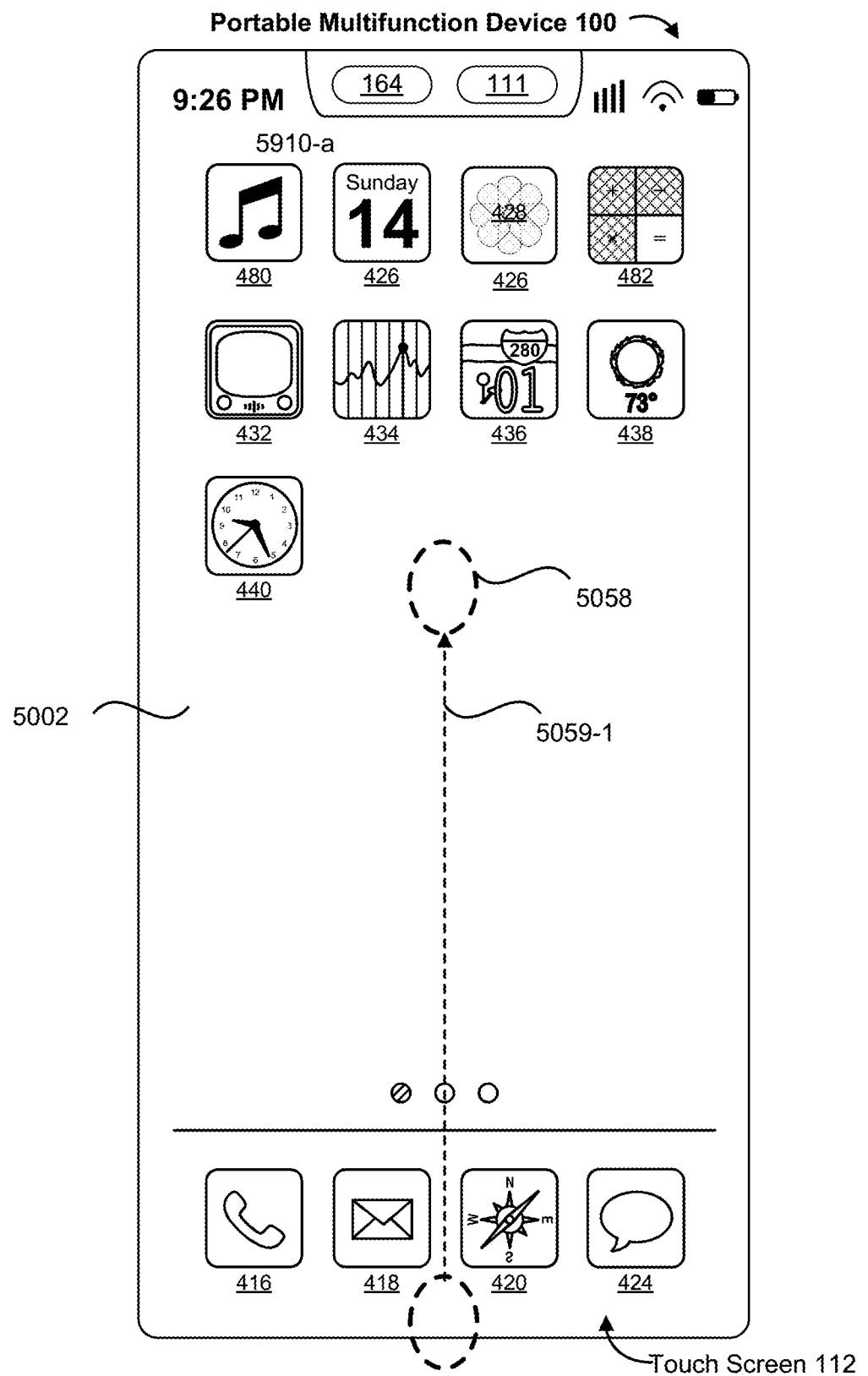
Figure 5A:
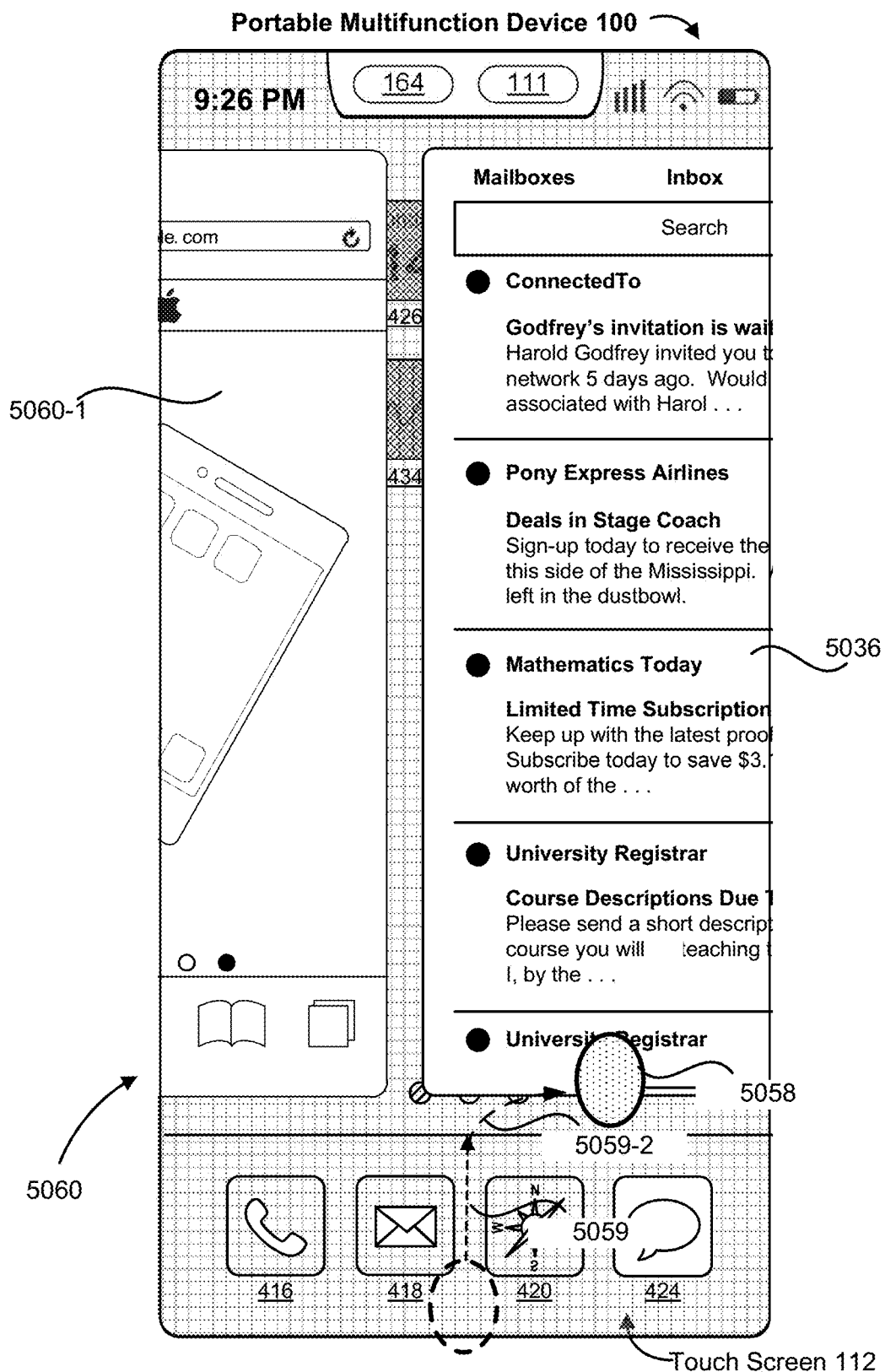
Figure 5A:
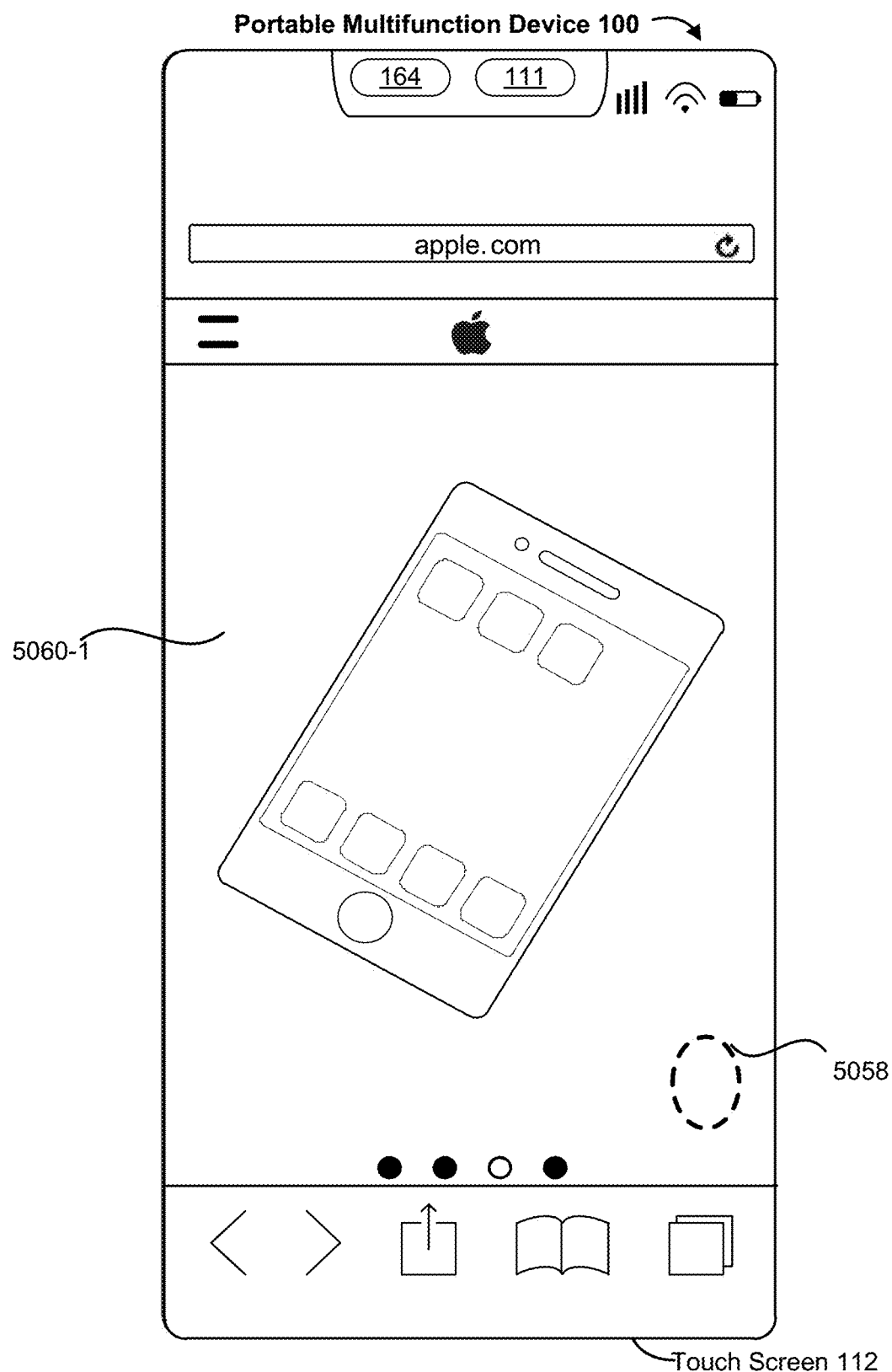
Figure 5A:
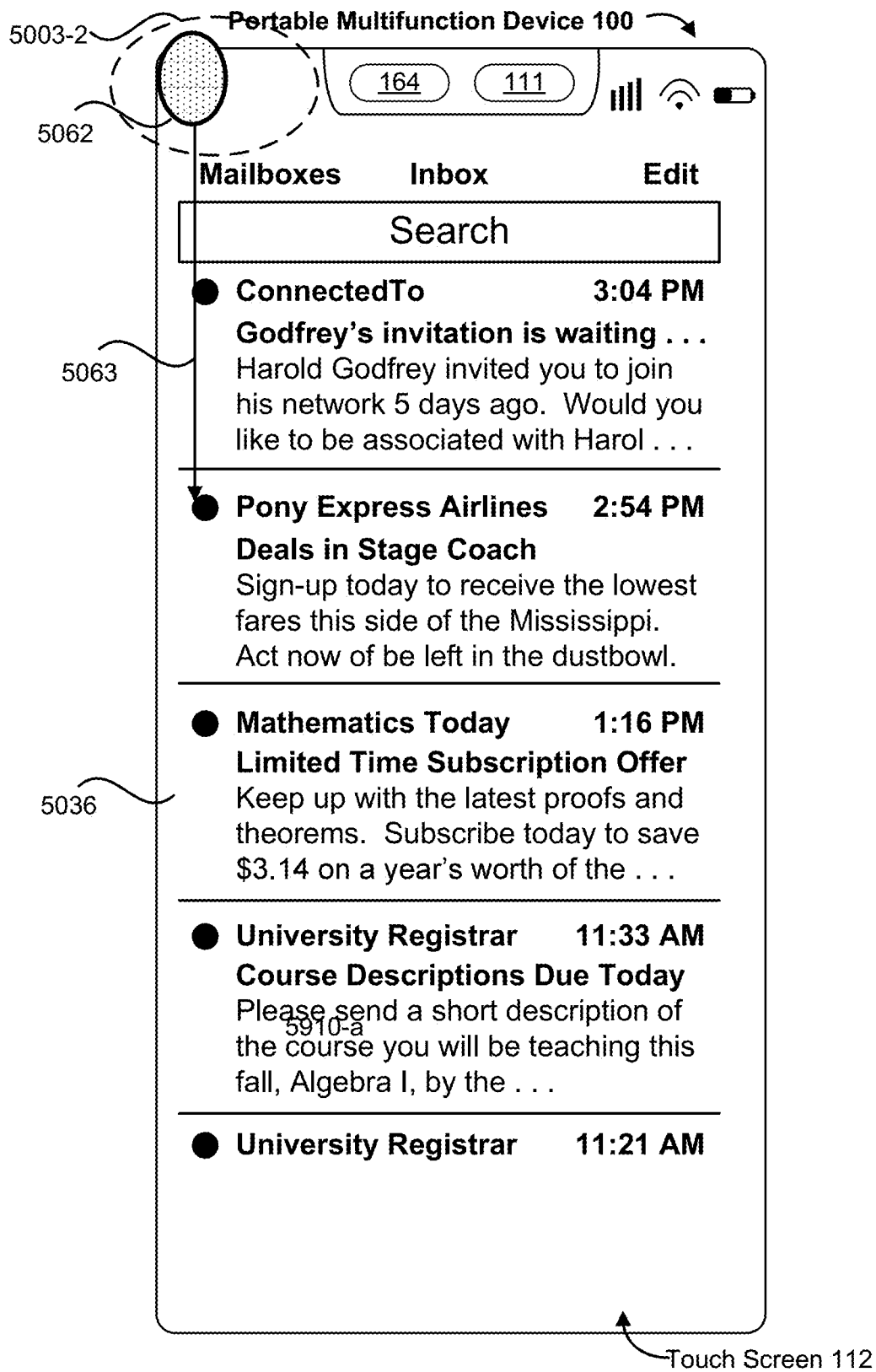
Figure 5A:
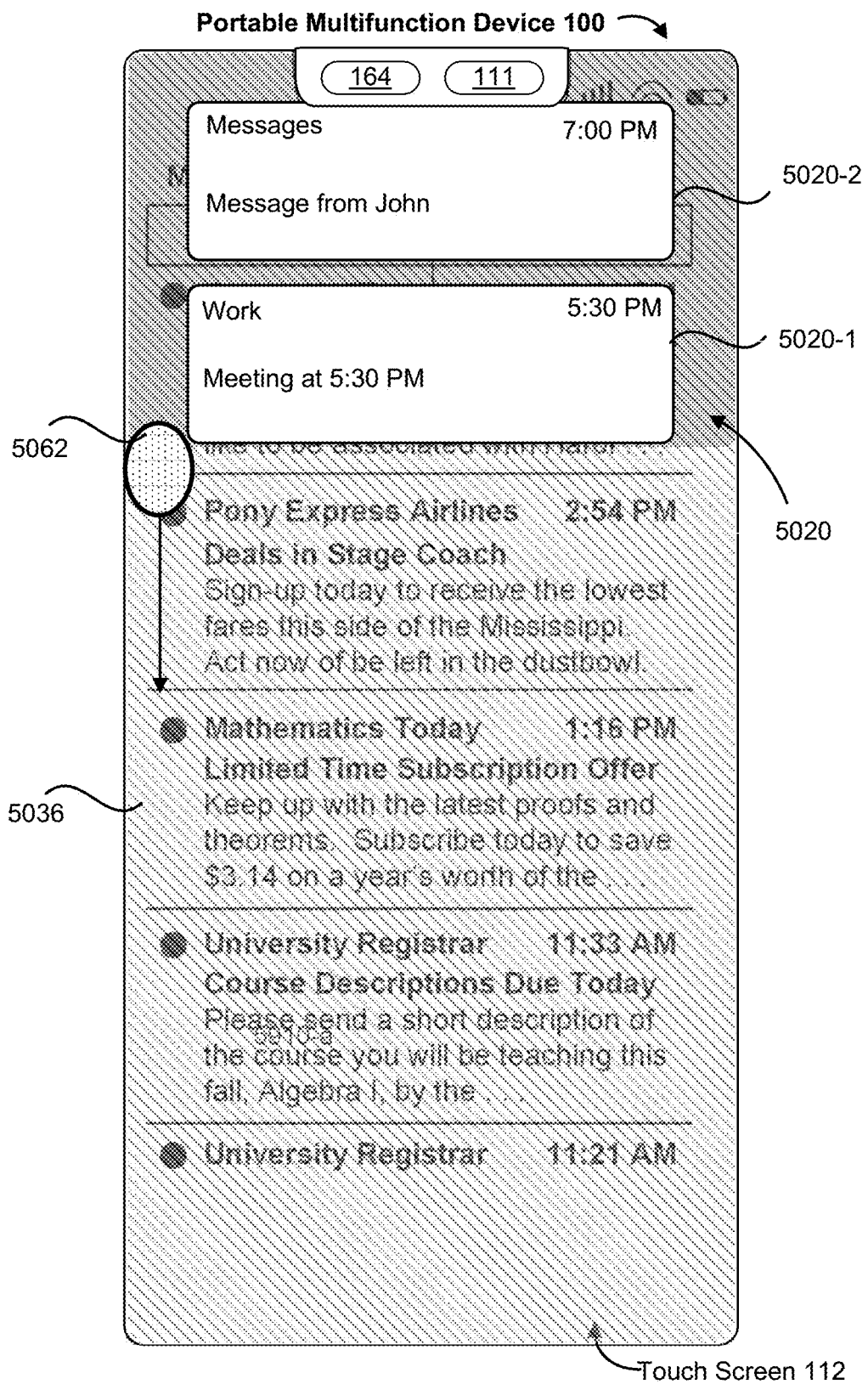
Figure 5A:
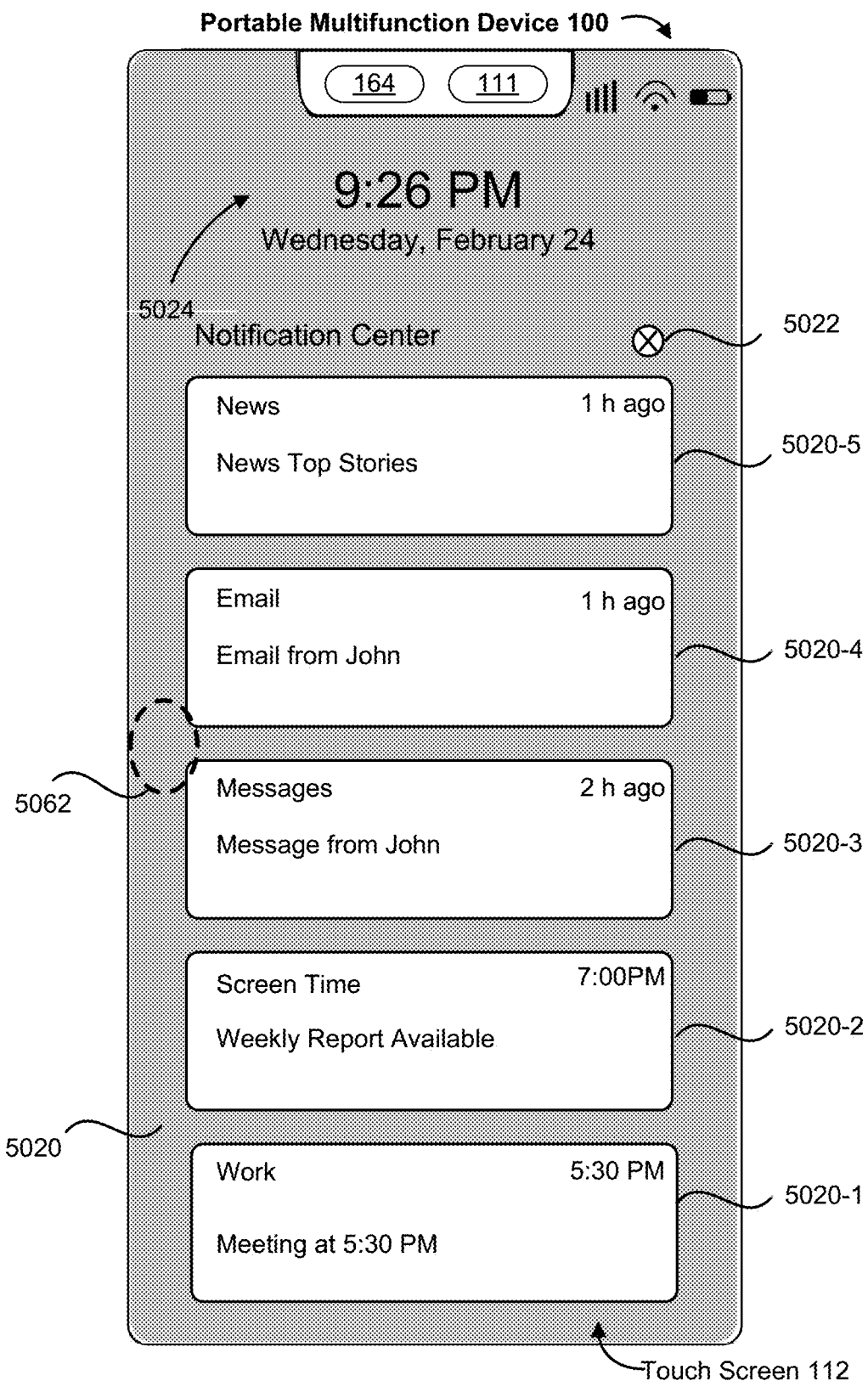
Figure 5A:
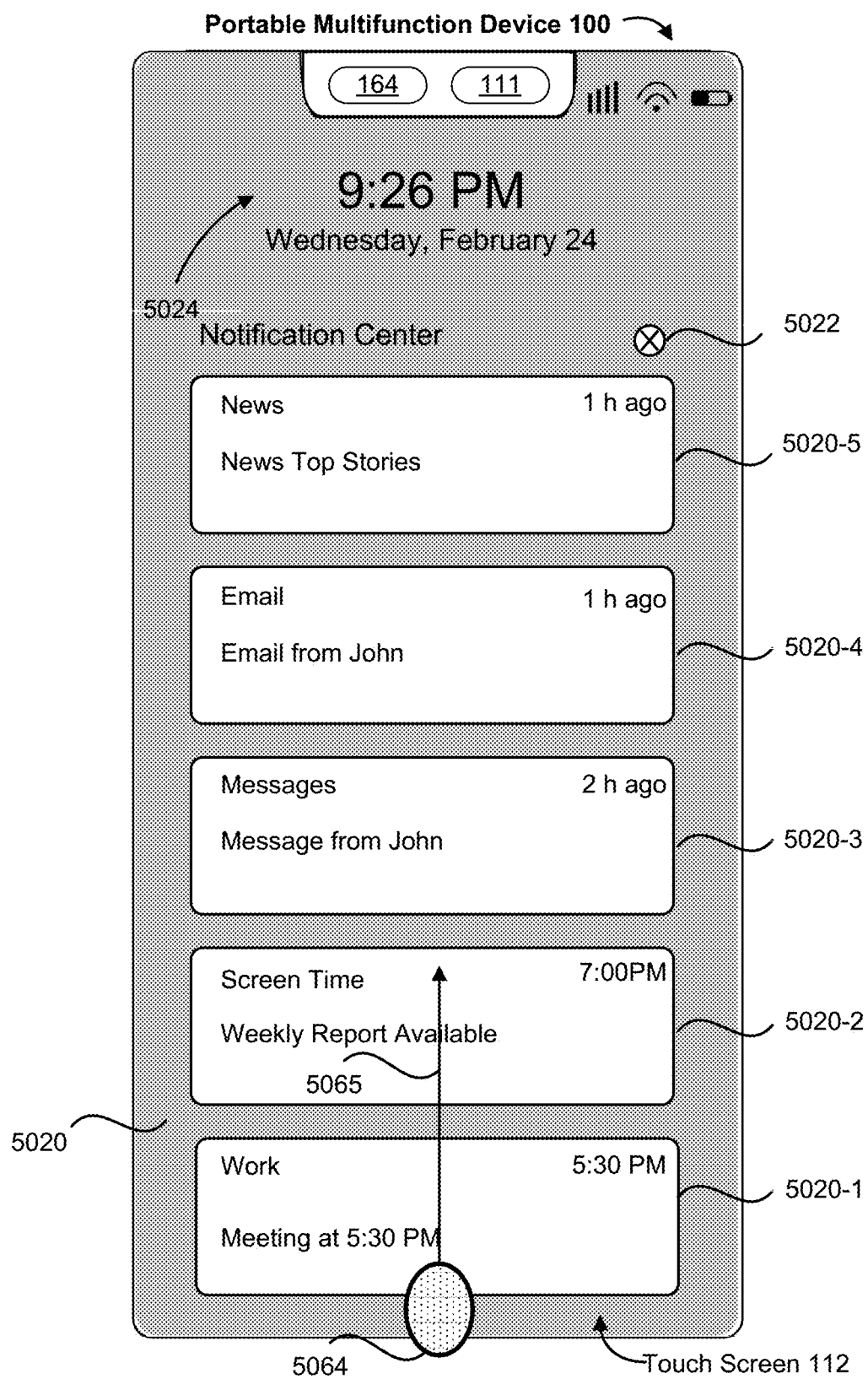
Figure 5A:
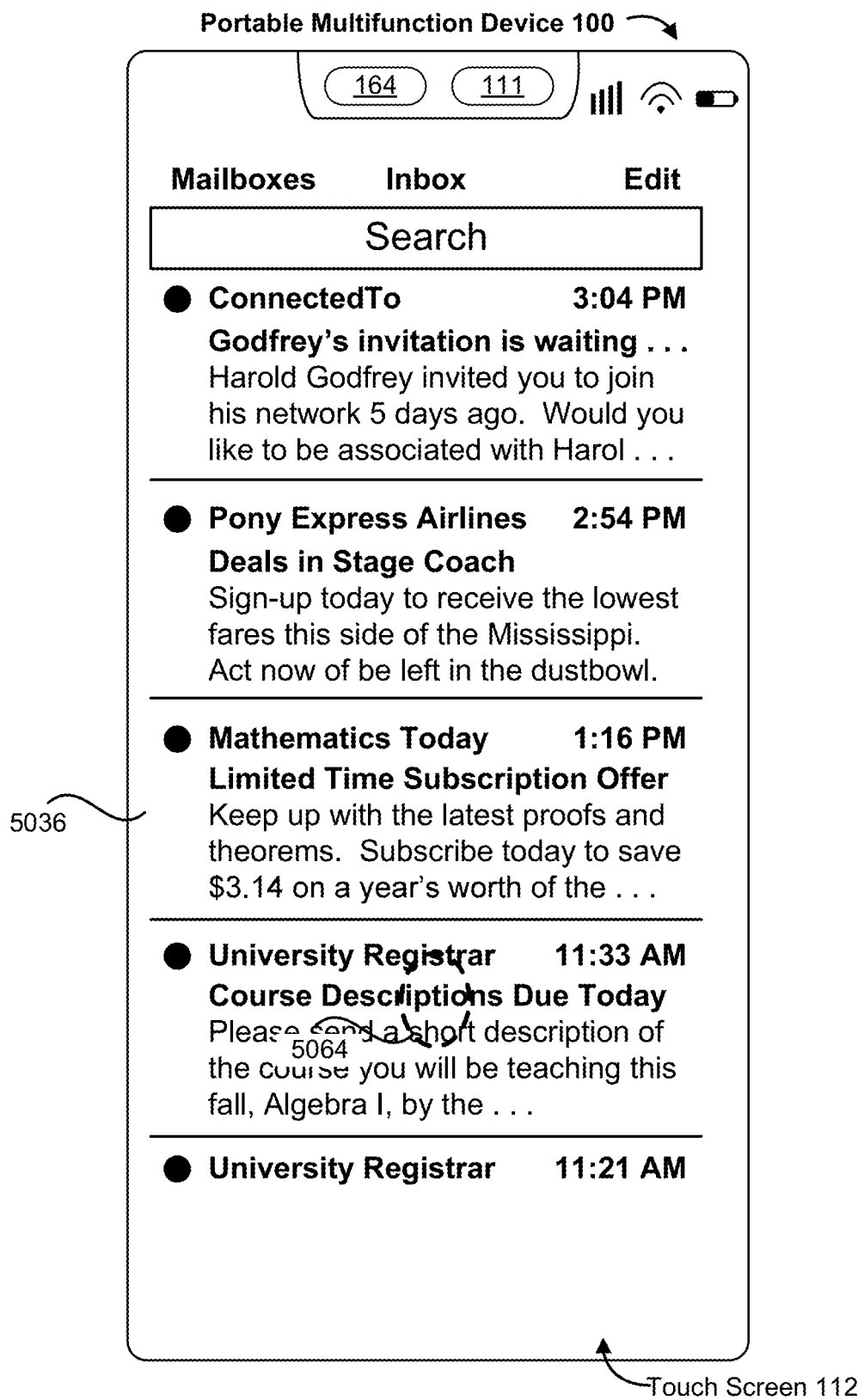
Figure 5A:
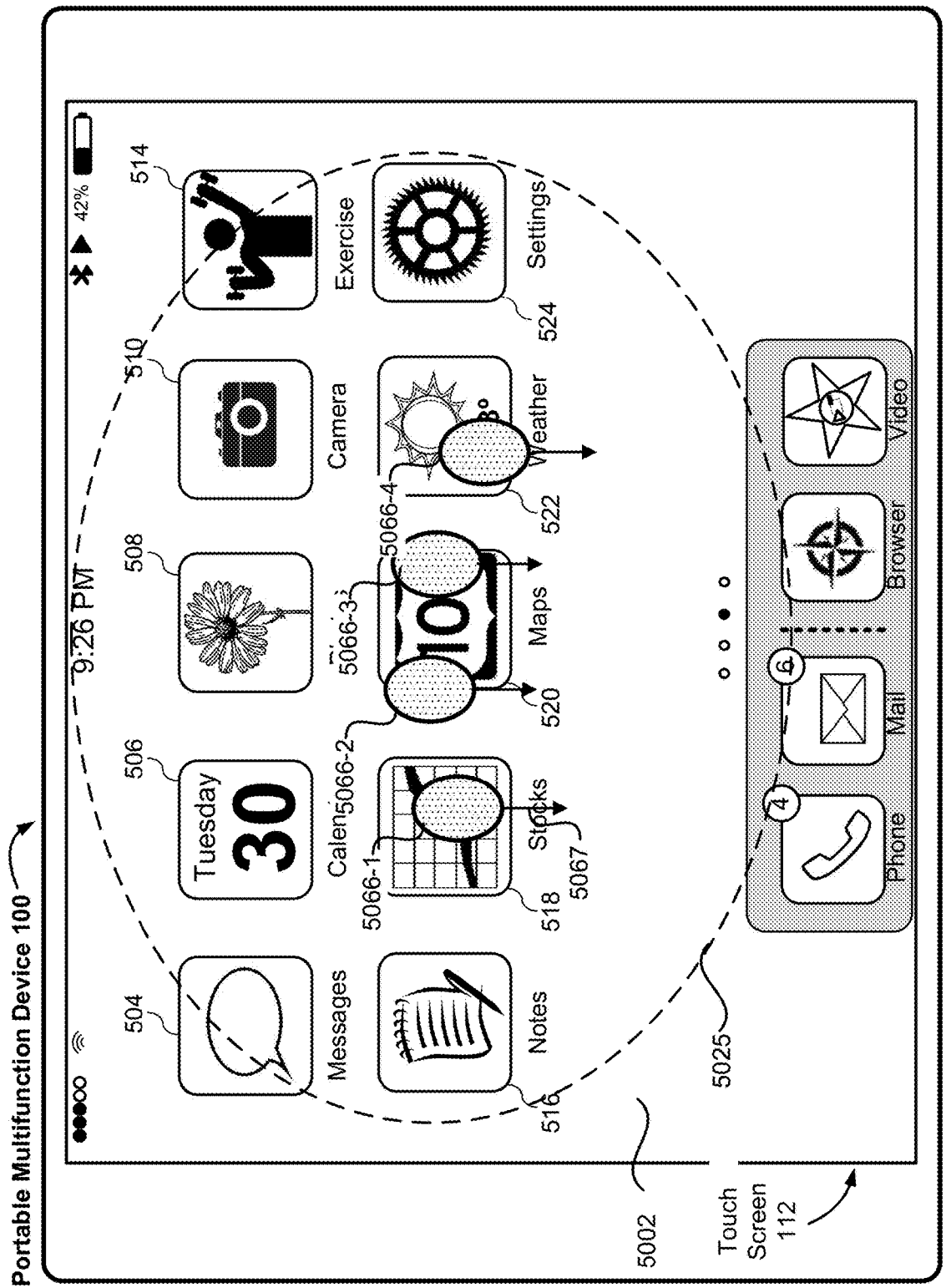
Figure 5A:
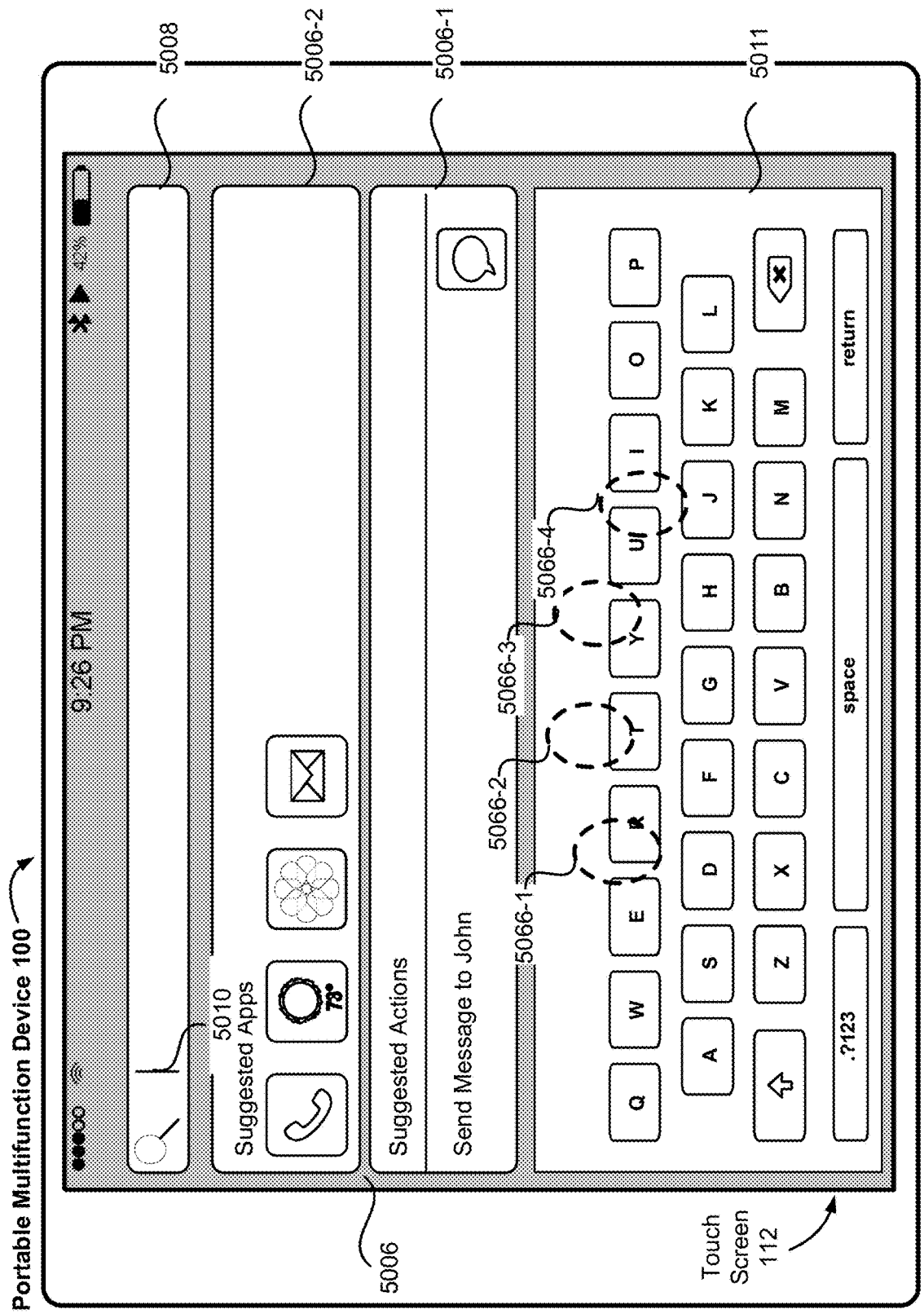
Figure 5A:
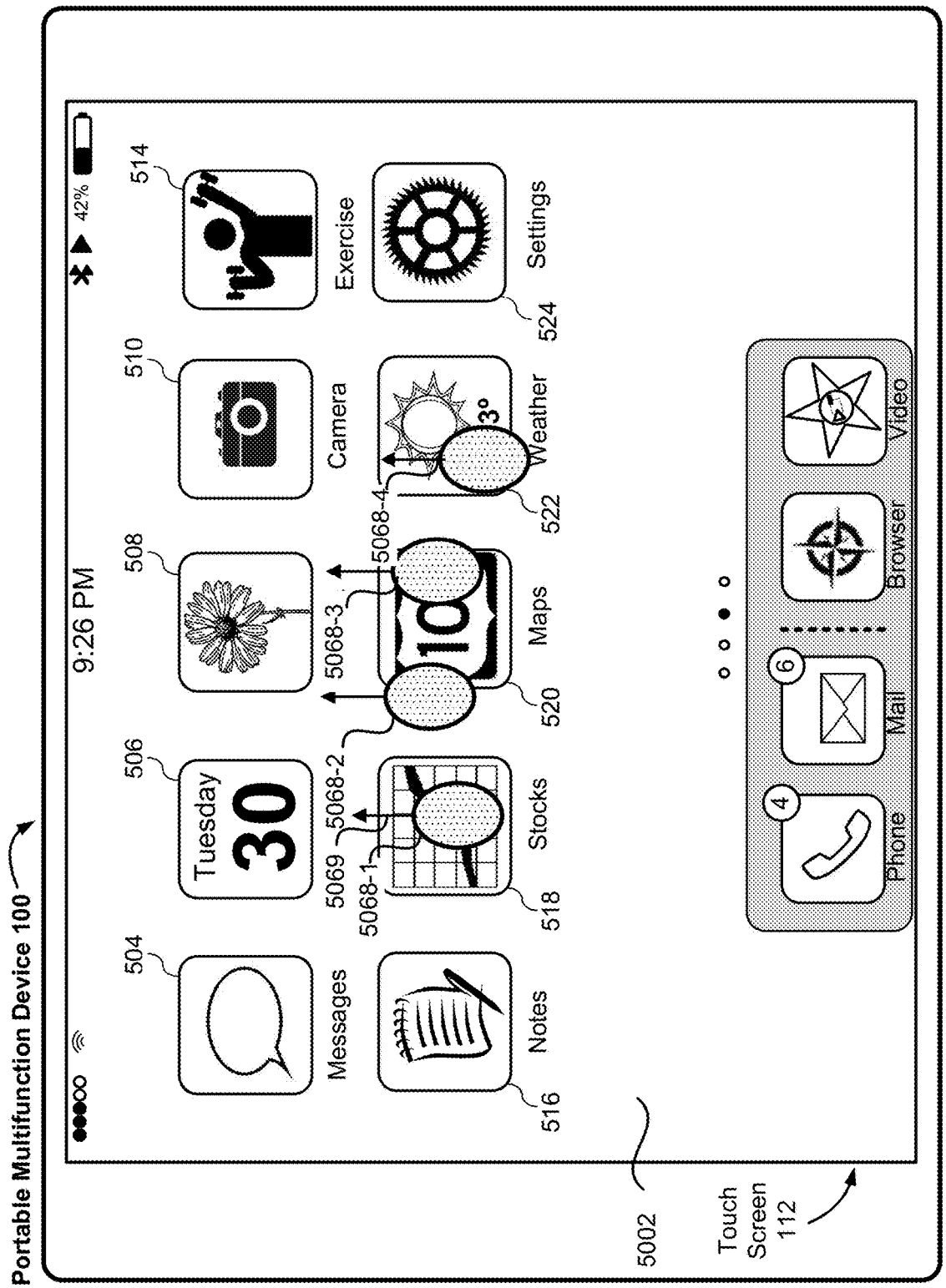
Figure 5A:
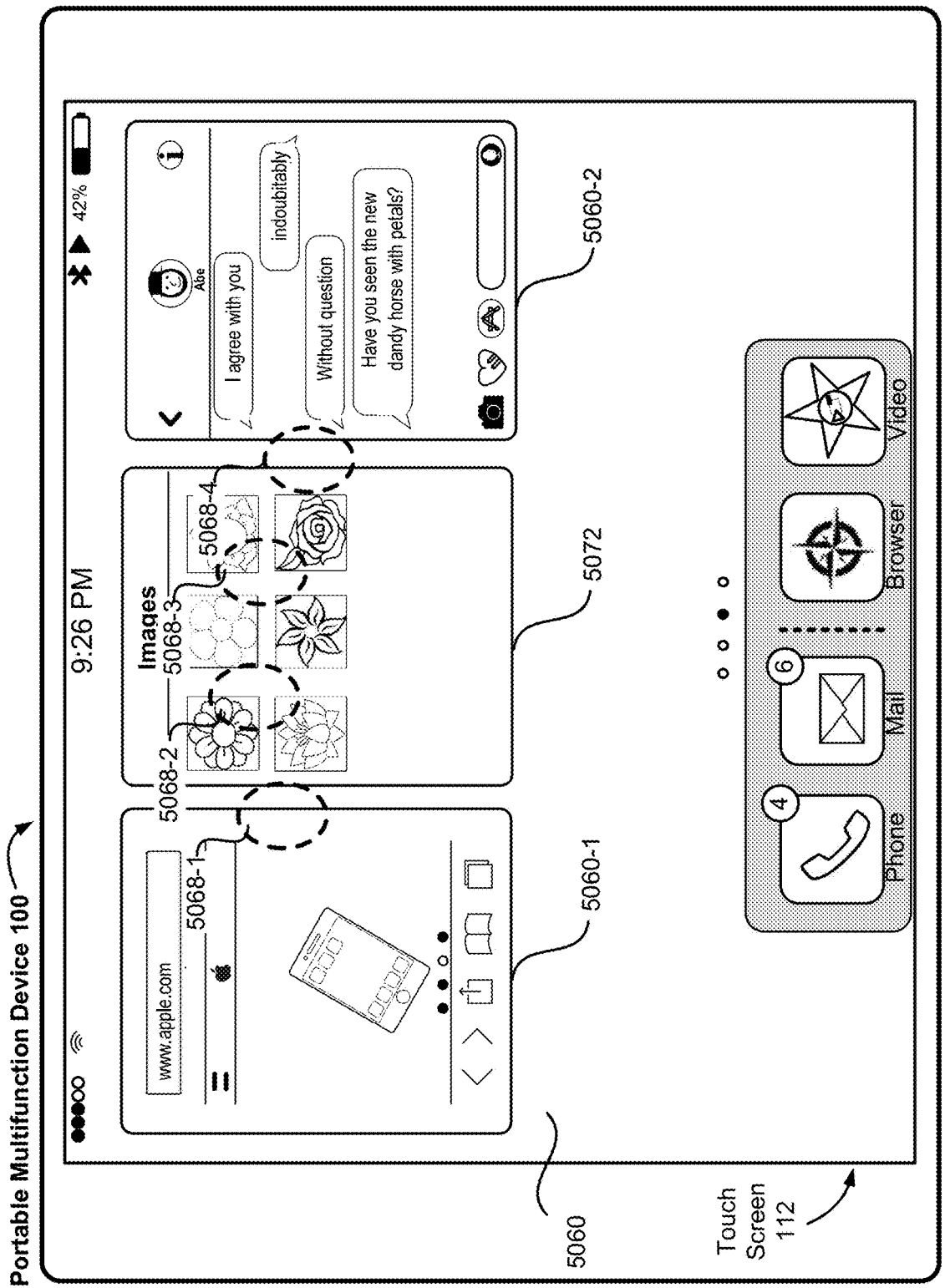
Figure 5A:
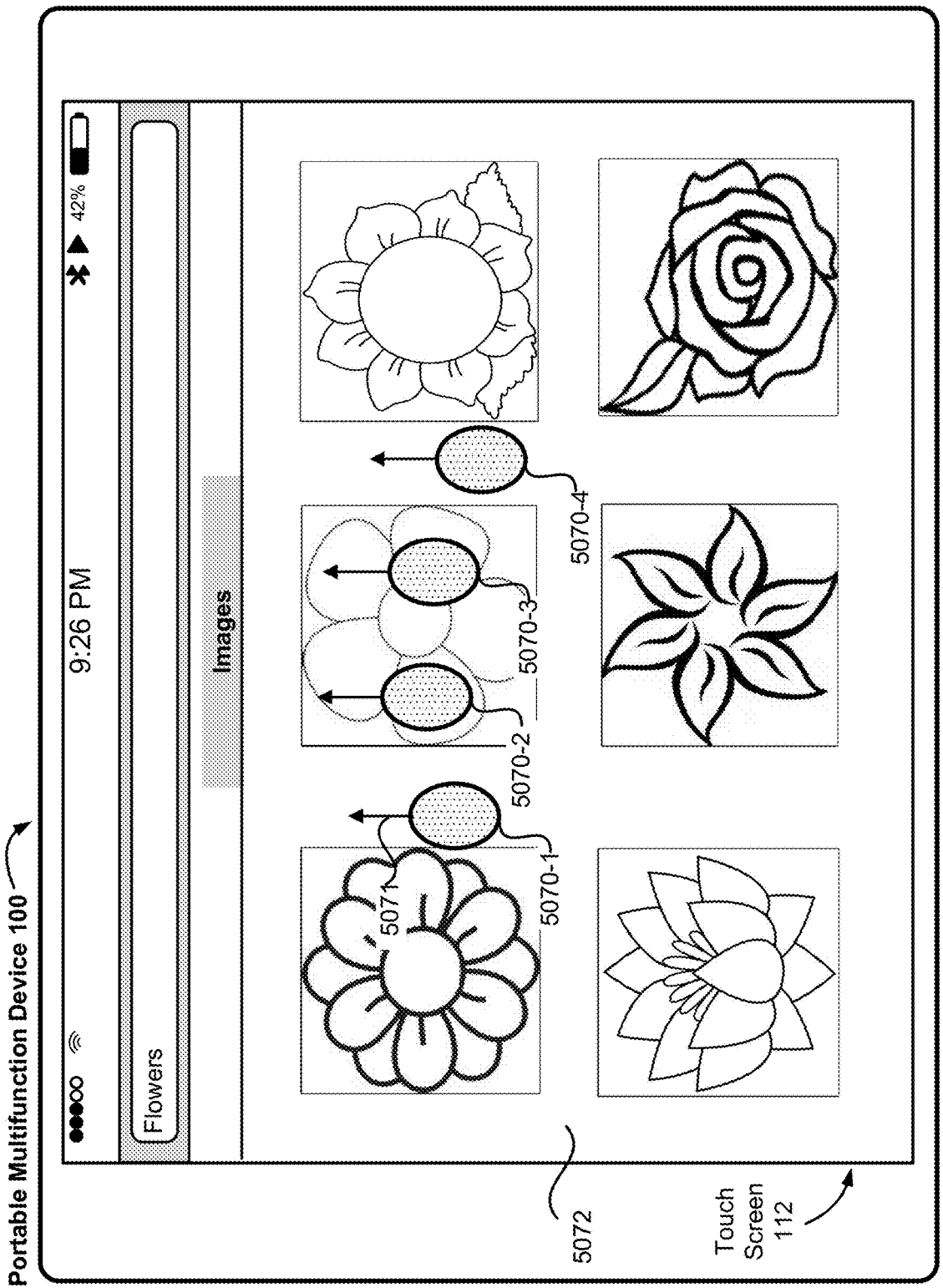
Figure 5A:
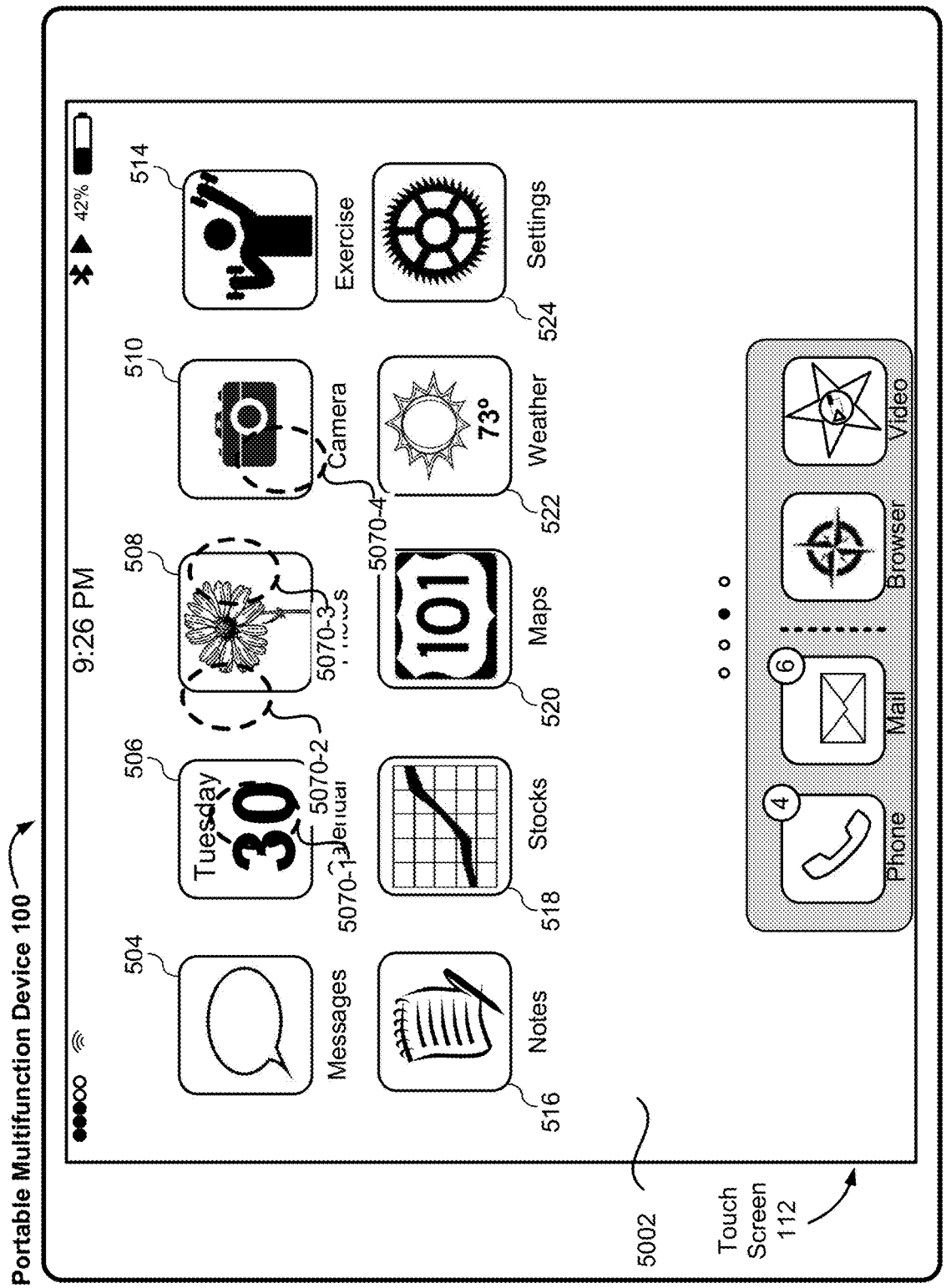
Figure 5A:
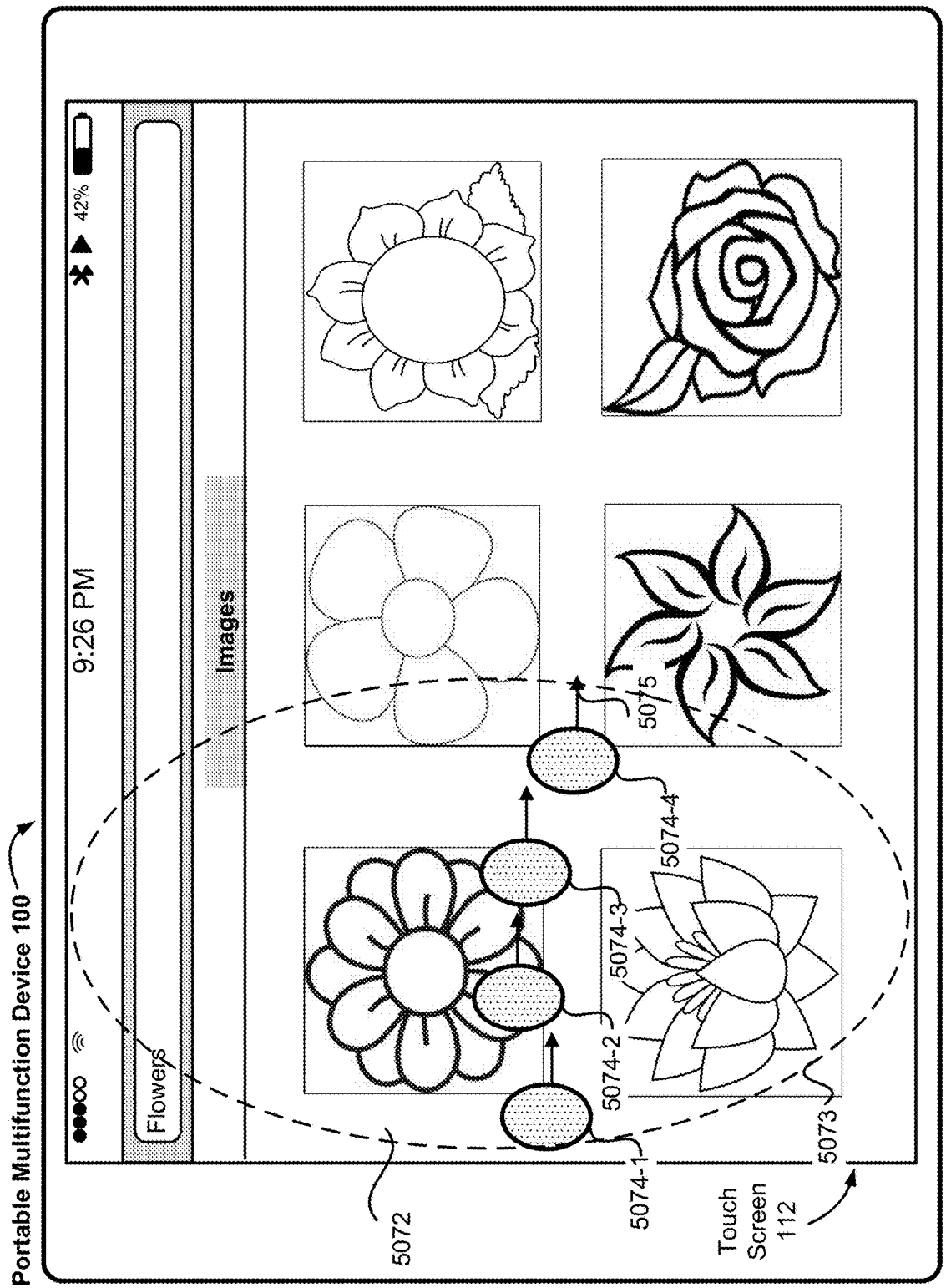
Figure 5A:
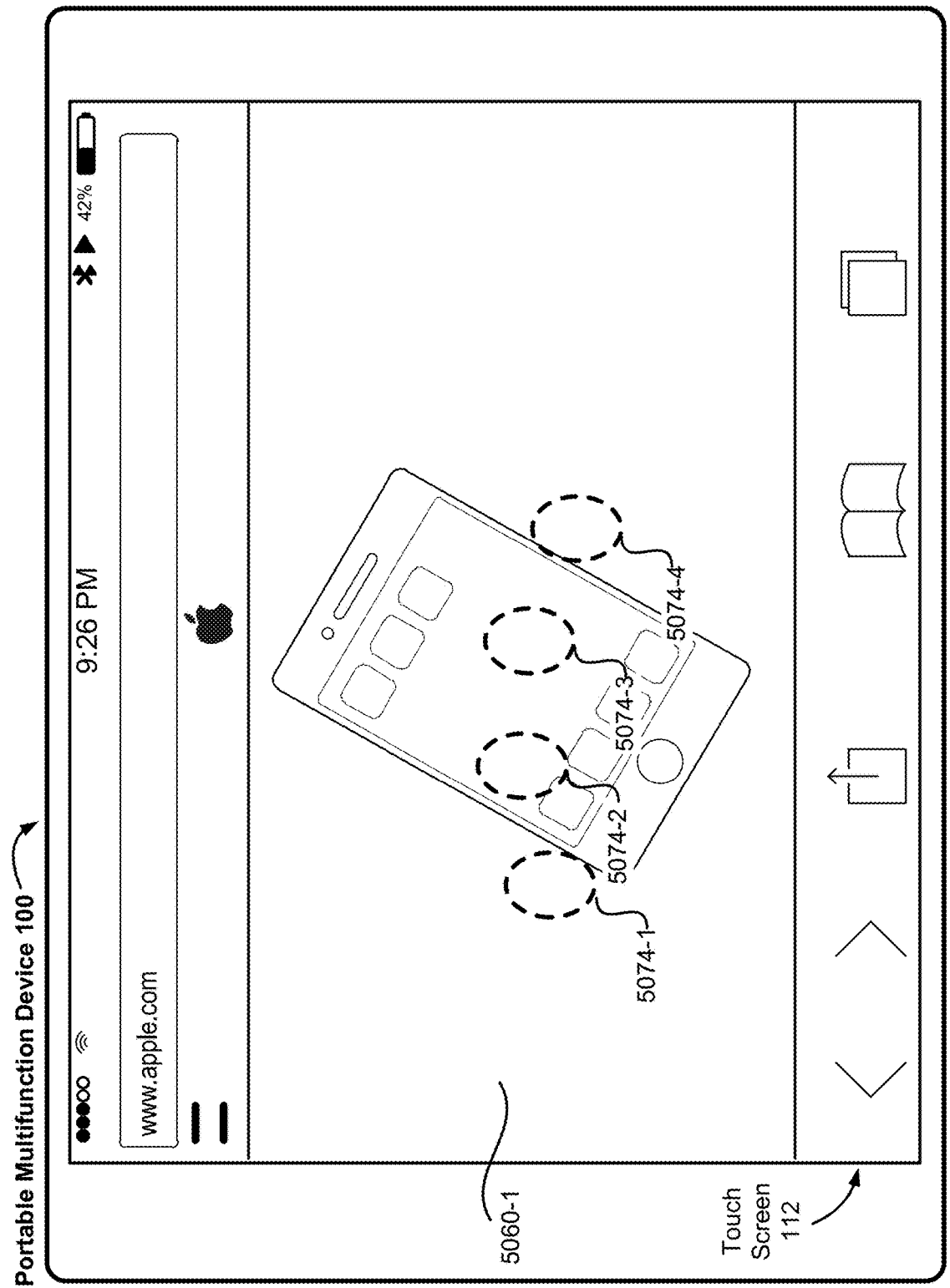
Figure 5A:
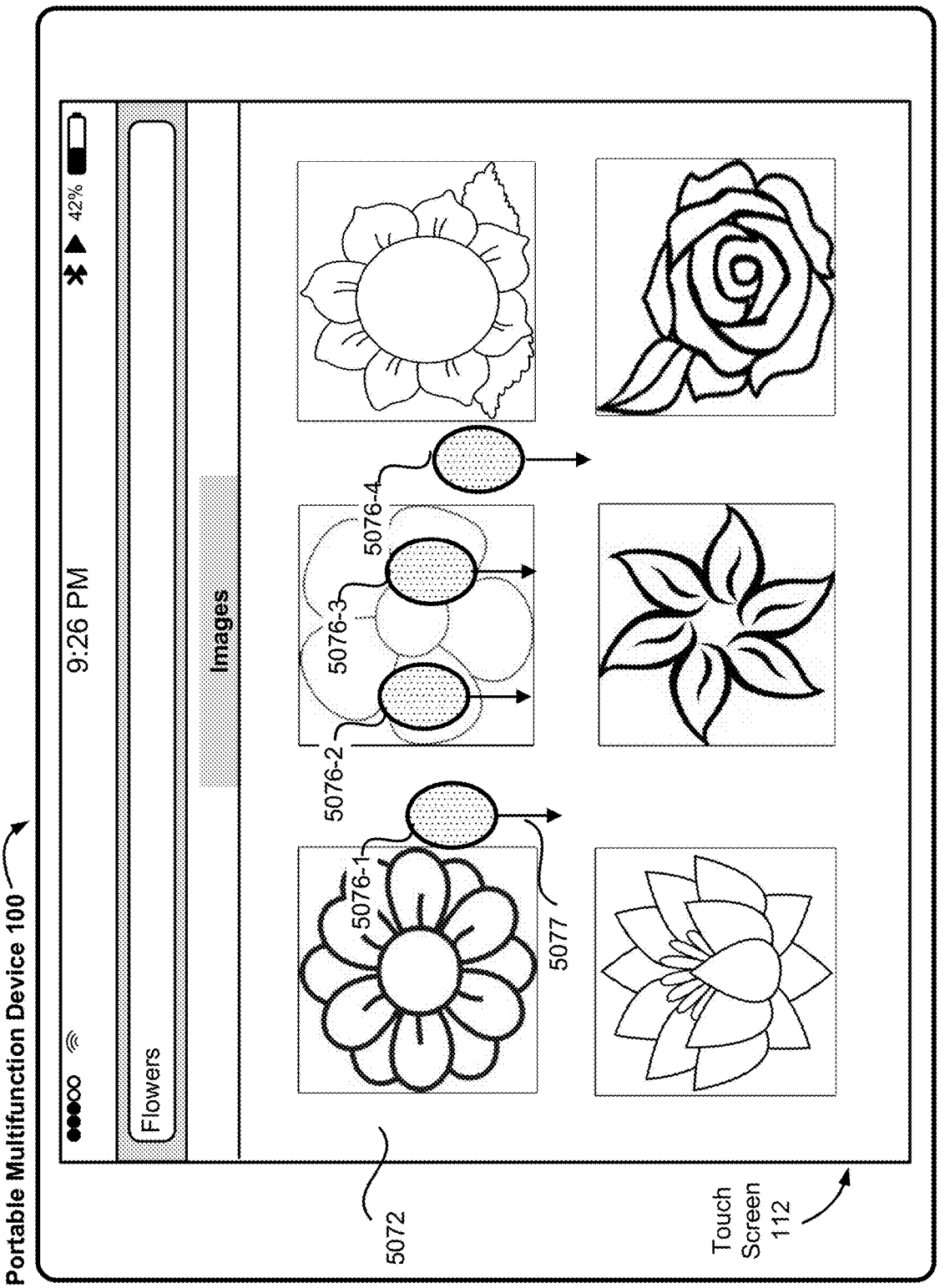
Figure 5A:
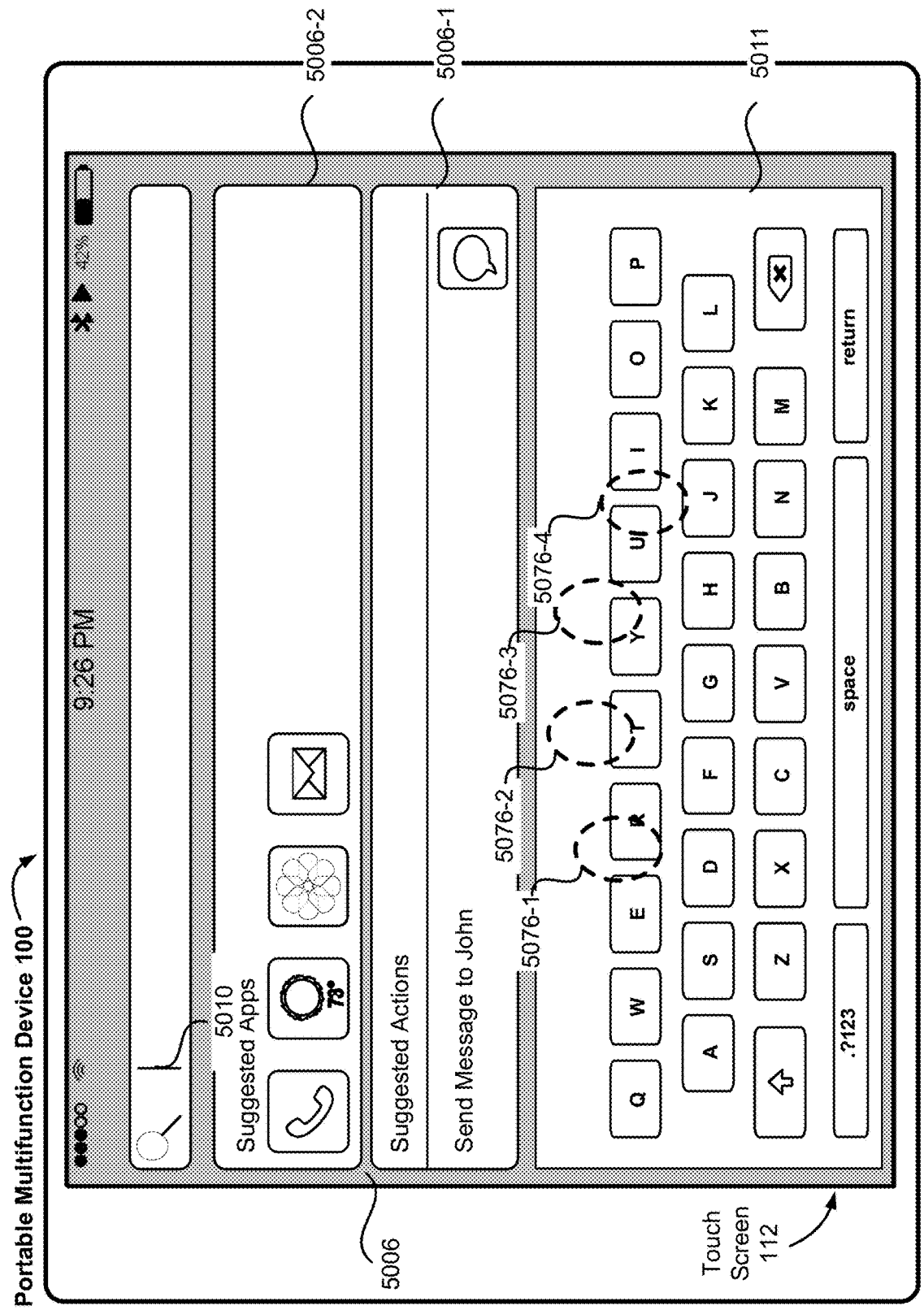
Figure 5A:
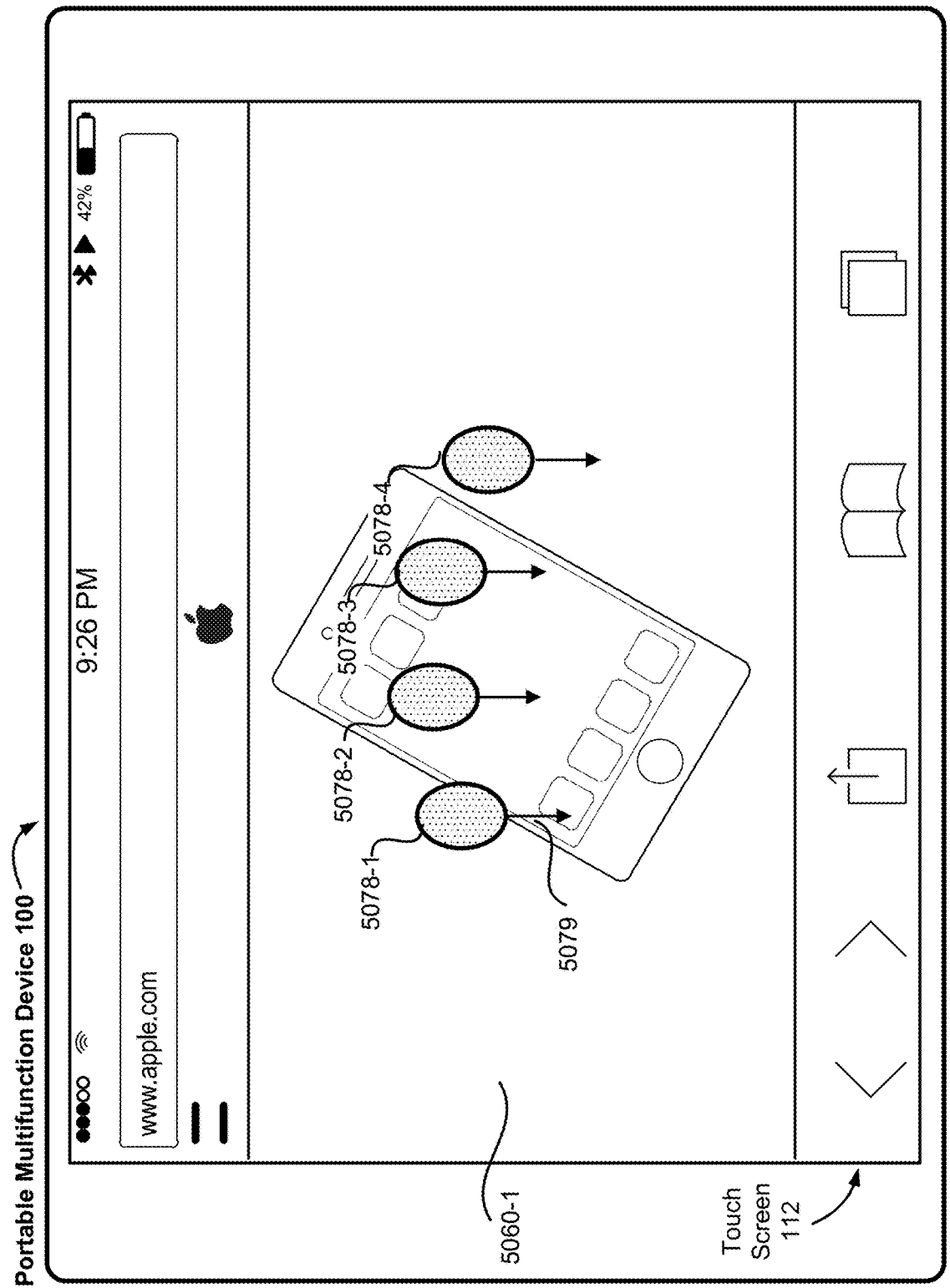
Figure 5A:
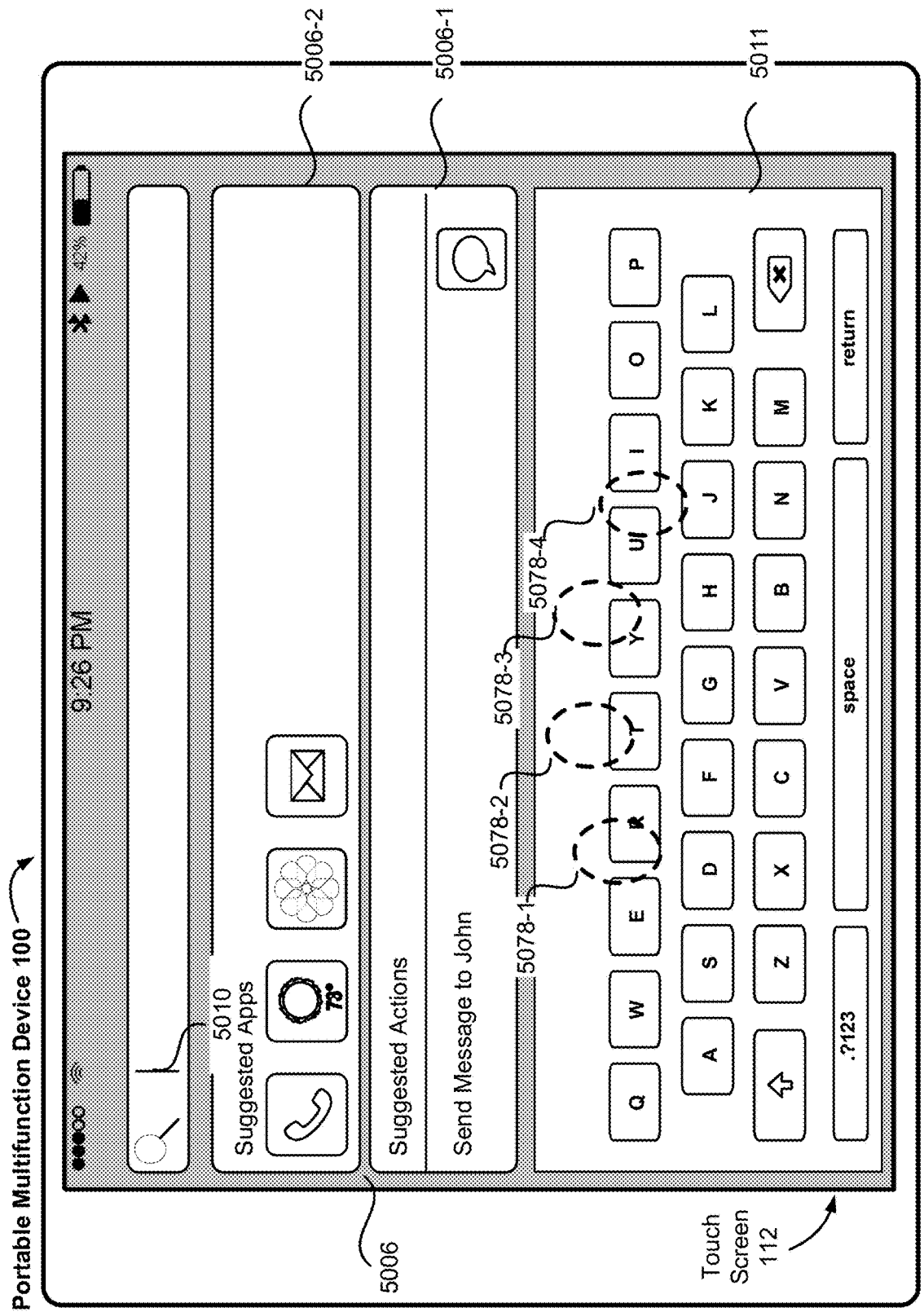
Figure 6A:
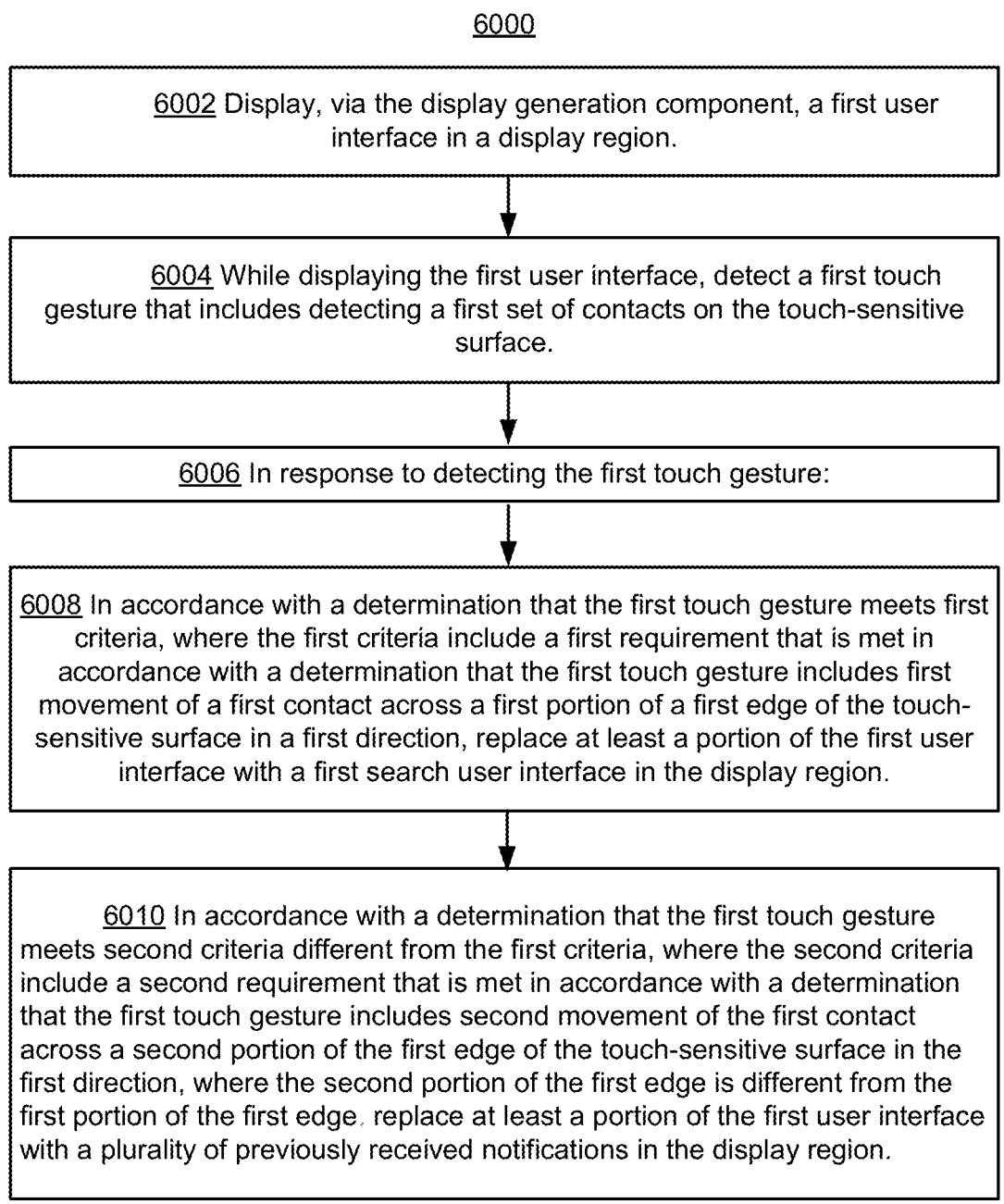

FIGS. 5Z-5AA illustrate a downward swipe gesture that causes the device to navigate from the home screen user interface of the device to the search user interface, in accordance with some embodiments.

In FIG. 5Z, the device 100 displays the home screen user interface (e.g., user interface 5002) in the full screen mode. The device detects a contact (e.g., contact 5056) in the middle portion of touch screen 112 (e.g., portion 5025 in FIG. 5I positioned away from the edges of touch screen 112 corresponding to the interior portion of touch screen 112). In FIGS. 5Z-5AA, the device detects movement of contact 5056 in the first direction (e.g., downward movement 5057 of contact 5056 from the middle portion of touch screen 112). In some embodiments, movement 5057 of contact 5056 is substantially perpendicular to the top edge of touch screen 112. In some embodiments, the movement 5029 of contact 5028 corresponds to a downward swipe starting from the middle portion of touch screen 112 toward the bottom edge of touch screen 112.

In FIG. 5AA, the device has detected lift-off of contact 5054; and in accordance with a determination that the movement of contact 5056 satisfies sixth criteria for displaying the search user interface (e.g., user interface 5006), the device displays the search user interface in the full screen mode. In some embodiments, the device displays replacing the home screen user interface gradually with the search user interface in accordance with movement 5039 of contact 5038, similarly as described above with respect to replacing the home screen user interface with the search user interface in FIGS. 5A-5C. In some embodiments, the sixth criteria for displaying the search user interface include a requirement that the movement of contact 5056 begins from the middle portion of touch screen 112 (e.g., portion 5025 of touch screen 112 in FIG. 5I), in order for the sixth criteria to be met. In some embodiments, the sixth criteria for displaying the search user interface include a requirement that the movement of contact 5056 is in a substantially downward direction, in order for the sixth criteria to be met. In some embodiments, the sixth criteria for displaying the search user interface include a requirement that contact 5030 is detected while the device displays the home screen user interface, in order for the second criteria to be met. In some embodiments, the sixth criteria for displaying the search user interface corresponds to the first criteria for displaying the search user interface with the exception that the movement of the contact begins from the middle portion of touch-screen 112 instead of the first portion of the top-edge region (e.g., region 5003-1) of touch screen 112. In some embodiments, the device displays the search user interface in response to a downward swipe gesture that begins from the first portion of the top-edge region of touch screen 112 (e.g., illustrated in FIGS. 5A-5C) or the middle portion (e.g., illustrated in FIGS. 5M-5N and 5Z-5AA). In accordance with a determination that the movement of contact 5056 does not meet the sixth criteria, the device forgoes displaying the search user interface in the full screen mode and instead continues displaying the home screen user interface.

FIGS. 5AB-5AG illustrate gestures that cause the device to navigate from an application user interface to a multitasking user interface, the home screen user interface, or another application user interface depending on a direction of a respective gesture, in accordance with some embodiments.

In FIG. 5AB, the device 100 displays an application user interface (e.g., email user interface 5036) in the full-screen mode. The device detects a contact (e.g., contact 5058) in a fourth portion of the edge region (e.g., region 5003-4) of touch screen 112 (e.g., in a middle bottom-edge region of touch screen 112). In some embodiments, region 5003-4 is positioned on a different side of touch screen 112 than regions 5003-1, 5003-2, and 5003-3). For example, region 5003-4 is positioned in the bottom edge region of touch screen 112, and regions 5003-1, 5003-2, and 5003-3 are positioned in the top edge region of touch screen 112. In some embodiments, region 5003-4 corresponds to one third of the bottom edge region, a half of the bottom edge region, or substantially the whole width of the bottom edge region of touch screen 112. In some embodiments, the device detects a portion of contact 5058 on touch screen 112 while another portion of contact 5058 is outside of touch screen 112. In FIGS. 5AB-5AC, the device further detects movement of contact 5058 (e.g., upward movement 5059 of contact 5058 from the middle-bottom edge of touch screen 112 to an interior portion of touch screen 112). In some embodiments, movement 5059 of contact 5058 includes upward movement from outside of touch screen 112 across the bottom edge of touch screen 112 onto the interior portion of touch screen 112 (e.g., movement 5059 of contact 5058 crosses the bottom edge of touch screen 112 and moves at least a threshold distance away from the bottom edge of touch screen 112). In some embodiments, the gesture is an upward swipe gesture beginning from the middle bottom-edge region of touch screen 112 toward the interior portion of touch screen 112.

In accordance with a determination that movement 5059 of contact 5058 satisfies first criteria for displaying a multitasking user interface (e.g., user interface 5060 in FIG. 5AD), the device initiates display of the multitasking user interface. The multitasking user interface (e.g., also referred to as an application-switcher user interface) includes one or more representations of user interfaces of one or more open applications (e.g., a multitasking user interface that includes a plurality of cards that are reduced scale images of the last seen user interfaces of different open applications).

In some embodiments, the first criteria for displaying the multitasking user interface include a requirement that the movement of contact 5032 begins from the bottom edge region of touch screen 112 (e.g., region 5004-4 in FIG. 5AB), in order for the first criteria to be met. In some embodiments, the first criteria for displaying the multitasking user interface include a requirement that the movement of contact 5032 begins from the middle bottom edge region of touch screen 112 (e.g., region 5004-4 shown in FIG. 5AB), in order for the first criteria to be met. In some embodiments, the first criteria for displaying the multitasking user interface include a requirement that the movement of contact 5058 is in a substantially upward direction, in order for the first criteria to be met. In some embodiments, the first criteria for displaying the multitasking user interface include a requirement that movement 5059 have a first distance, a first movement acceleration, and/or a first movement speed at lift-off of contact 5058, in order for the first criteria to be met. In some embodiments, initiating display of the multitasking user interface includes reducing a size of the currently displayed application user interface (e.g., email user interface 5036) while concurrently shifting the application user interface gradually upward in accordance with the upward movement of contact 5058. In some embodiments, a reduced visibility (e.g., blurred, darkened, etc.) version of the home screen user interface (e.g., user interface 5002) serves as a background layer of the multitasking user interface. For example, a portion of the home screen user interface with reduced visibility is displayed in the background as the size and position of the application user interface changes.

In FIG. 5AD, the device has detected lift-off of contact 5058 at a location that is in the middle portion of touch screen 112 (e.g., with a movement distance meeting the requirement of the first criteria for displaying the multitasking user interface, and/or with a movement speed at lift-off that meets the first criteria, etc.). In some embodiments, the device has detected a pause of the movement of contact 5058, instead of lift-off of contact 5058 (e.g., the movement of contact 5058 has ceased for a duration that is longer than a threshold duration without lift-off of contact 5058). In accordance with a determination that the first criteria for displaying the multitasking user interface are met by the upward swipe gesture at the lift-off (e.g., or at the pause) of contact 5058, the device displays the multitasking user interface (e.g., user interface 5060) in the full-screen mode. In accordance with a determination that the first criteria for displaying the multitasking user interface are not met by the upward swipe gesture at the lift-off (e.g., or at the pause) of contact 5058, the device forgoes displaying the multitasking user interface in the full-screen mode and instead continues displaying the application user interface (e.g., email user interface 5036).

The multitasking user interface includes one or more representations of user interfaces of one or more open applications (e.g., email user interface 5036, web browser user interface 5060-1, and messages user interface 5060-2). The multitasking user interface includes representations of all or some of the open applications. In some embodiments, the multitasking user interface includes a preset number, or less, of representations of open applications. As shown in FIG. 5AD, the multitasking user interface includes reduced scale images of the open application. In some embodiments, the reduced scale images of the open applications are partial (e.g., email user interface 5036, web browser user interface 5060-1, and messages user interface 5060-2 in FIG. 5AD are partial representations of the images of the respective open applications). In some embodiments, multiple ones of the cards illustrates an image of the last seen user interface of a corresponding application. In some embodiments, the device displays the cards arranged in a stack. In some embodiments, the cards in the stack are arranged in a chronological order based on the time when the application was previously seen. For example, in FIG. 5AD, a card representing email user interface 5036 is displayed on top of the stack as email user interface 5036 is the most recently seen user interface. Furthermore, web browser user interface 5060-1 is displayed behind email user interface 5036 while messages user interface 5060-2 is displayed behind web browser user interface 5060-1. A representation of an application user interface, when activated in accordance with preset criteria (e.g., activated by a tap gesture, a double tap gesture, etc.), causes the device to display the respective application user interface corresponding to the respective application icon. The multitasking user interface therefore allows navigation through multiple open applications.

In FIG. 5AE, the device has detected movement 5059-1 of contact 5058 (e.g., movement 5059-1 of contact 5058 in the second direction). In some embodiments, movement 5059-1 of contact 5058 begins from the middle bottom-edge region of touch screen 112 and has the same substantially upward direction as described with respect to movement 5059 of contact 5058 in FIGS. 5AB-5AC. However, movement 5059-1 has certain features that are distinct from movement 5059 of contact 5058 that distinguish the upward swipe feature of FIG. 5AE from the upward swipe gesture of FIGS. 5AB-5AC. In some embodiments, such features include acceleration, speed, duration, or length of the gesture. In accordance with detecting lift-off of contact 5058 and in accordance with a determination that movement 5059-1 of contact 5058 satisfies first criteria for displaying the home screen (e.g., user interface 5002 in FIG. 5AE) the device initiates display of the home screen. In some embodiments, the first criteria for displaying the home screen user interface include a requirement that movement 5059-1 have a second distance, a second movement acceleration, and/or a second movement speed at lift-off of contact 5058, in order for the first criteria to be met. The second distance, second movement acceleration, and/or the second movement speed are distinct from the first distance, the first movement acceleration, and/or the first movement speed required by the first criteria for displaying the multitasking user interface described with respect to FIGS. 5AC-5AD. In some embodiments, the first criteria for displaying the home screen user interface include a requirement that movement 5059-1 of contact 5058 is detected while displaying the multitask user interface, in order for the first criteria to be met. In some embodiments, the first criteria for displaying the home screen user interface include a requirement that movement 5059-1 of contact 5058 begins from the middle portion of touch screen 112 (e.g., the middle portion positioned away from the edges of touch screen 112 by a threshold distance). In some embodiments, initiating display of the home screen user interface includes making the home user interface gradually appear on top of the multitasking user interface (e.g., the home screen user interface gradually fades onto the foreground while the multitasking user interface gradually fades away into the background). In some embodiments, initiating display of the home screen user interface includes gradually reducing the size of the multitasking user interface (e.g., reducing the size of the reduced scale representations of the one or more user interfaces of different applications) while gradually fading in the home screen user interface onto the foreground. In accordance with a determination that the first criteria for displaying the home screen user interface are met by the upward swipe gesture at the lift-off of contact 5058, the device displays the home screen user interface (e.g., user interface 5002) in the full-screen mode. In accordance with a determination that the first criteria for displaying the home screen user interface are not met by the upward swipe gesture at the lift-off of contact 5058, the device forgoes displaying the home screen user interface in the full-screen mode and instead continues displaying the application user interface (e.g., email user interface 5036).

FIG. 5AF illustrates an alternative movement of contact 5058 subsequent to detecting movement 5059 of contact 5058 in the second direction (e.g., an upward swipe gesture) in FIGS. 5AB-5AC. In FIG. 5AF, instead of detecting continuing the movement of contact 5058 detected in FIG. 5AB in the second direction (e.g., upwards) in FIGS. 5AC and 5AE, the device detects movement 5059-2 in a third direction. As shown, the movement 5059-2 of contact 5058 is substantially parallel to the bottom edge of touch screen 112. In some embodiments, movement 5059-2 of contact 5058 corresponds to a sideway swipe (e.g., left to right or right to left swipe gesture). In some embodiments, movement 5059-2 includes movement sideways from the interior portion of touch screen 112 toward the left or right edge of touch screen 112. For example, the movement of contact 5058 includes movement 5059 in the upright direction followed by movement 5059-2 of contact 5058 from left to right. In some embodiments, the device detects movements 5059 and 5059-2 of contact 5058 as a continuous swipe gesture. In some embodiments, the device detects a pause or lift-off between movement 5059 and 5059-2 of contact 5058.

As shown in FIG. 5AF, in accordance with a determination that movement 5059-2 of contact 5058 satisfies first criteria for switching between user interfaces of applications with a stored state (e.g., switching between email user interface 5036 in FIG. 5AB and web browser user interface 5060-1 in FIG. 5AF), the device initiates the switching between the open user interfaces. For example, an application with a stored state may be a currently running application having its current user interface stored or an application with a stored state may be closed while its previously viewed user interface is stored so that the previously viewed user interface may be displayed upon request. In some embodiments, applications with a stored state are otherwise referred to as open applications. As explained above with respect to FIG. 5AD, the multitasking user interface includes one or more representations (e.g., cards) of user interfaces of applications with respective stored states. In some embodiments, switching between open user interfaces includes replacing a user interface of a first application (e.g., email user interface 5036 in FIG. 5AB) with a user interface of a second application, where the first and second applications are currently running on the device. In some embodiments, initiating switching between the open user interface includes shifting the user interface of the first application (e.g., email user interface 5036) sideways in accordance with movement 5059-2 of contact 5058 while gradually displaying the user interface of the second application (e.g., web browser user interface 5060-1) in the full screen mode, as shown in FIG. 5AF.

In some embodiments, the first criteria for switching between open user interfaces include a requirement that two or more user interfaces of different applications are with a stored state on the device, in order for the first criteria to be met. In some embodiments, the first criteria for switching between the open user interfaces include a requirement that the movement of contact 5058 begins from the bottom edge region of touch screen 112 (e.g., region 5004-4 in FIG. 5AB), in order for the first criteria to be met. In some embodiments, the first criteria for switching between the open user interfaces include a requirement that the movement of contact 5058 begins from the middle bottom edge region of touch screen 112 (e.g., region 5004-4 in FIG. 5AB), in order for the first criteria to be met. In some embodiments, the first criteria for switching between the open user interfaces include a requirement that a first portion of the movement of contact 5058 is in a substantially upward direction (e.g., movement 5059 in FIG. 5AB) and is subsequently followed by a second portion of the movement of contact 5058 that is in a substantially sideway direction (e.g., movement 5059-2 in FIG. 5AF), in order for the first criteria to be met. In some embodiments, initiating display of the multitasking user interface includes reducing a size of the first application user interface (e.g., email user interface 5036) while concurrently shifting the first application user interface gradually sideways in accordance with the movement (e.g., movement 5059-2) of contact 5058.

In FIG. 5AG, the device has detected lift-off of contact 5058 at a location that is in the middle-right portion of touch screen 112 (e.g., with a movement distance meeting the requirement of the first criteria for switching between open user interfaces, and/or with a movement speed at lift-off that meets the first criteria, etc.); and in accordance with a determination that the first criteria for switching between the open user interfaces are met by the swipe gesture at the lift-off of contact 5058, the device displays the user interface of the second application (e.g., web browser user interface 5060-1) in the full-screen mode. In some embodiments, the device replaces the user interface of the first application (e.g., email user interface 5036) with the user interface of the second application (e.g., web browser user interface 5060-

1). In some embodiments, the device ceases to display the user interface of the first application. In accordance with a determination that the first criteria for switching between the open user interfaces are not met by the swipe gesture at the lift-off of contact 5058, the device forgoes displaying the user interface of the second application (e.g., web browser user interface 5060-1) in the full-screen mode and instead continues displaying the user interface of the first application (e.g., email user interface 5036).

FIGS. 5AH-5AL illustrate swipe gestures that cause the device to navigate between an application user interface and the notification center user interface, in accordance with some embodiments.

FIGS. 5AH-5AJ illustrate a downward swipe gesture for navigating from an application user interface to the notification center user interface. In FIG. 5AH, the device 100 displays the application user interface (e.g., email user interface 5036) in the full-screen mode. The device detects a contact (e.g., contact 5062) in the second portion of the edge region (e.g., region 5003-2) of touch screen 112 (e.g., in a left-top edge region of touch screen 112). In FIGS. 5AH-5AI, the device detects movement of contact 5062 in the first direction (e.g., downward movement 5063 of contact 5062 from the left-top edge of touch screen 112 to the middle-left portion of touch screen 112). In some embodiments, movement 5063 of contact 5062 corresponds to movement 5019 of contact 5018 described with respect to FIGS. 5F-5H.

In accordance with a determination that movement 5063 of contact 5062 satisfies third criteria for displaying the notification center user interface (e.g., user interface 5020), the device initiates displaying the notification center user interface. In some embodiments, the third criteria for displaying the notification center user interface corresponds to the first criteria for displaying the notification user interface, described above with respect to FIGS. 5F-5H. In FIGS. 5F-5H the device initiates displaying the notification center user interface in accordance with a determination that the movement of the contact meets the first criteria for displaying the notification center user interface, regardless of detecting the movement of the contact while displaying the home screen user interface (e.g., user interface 5002) or displaying an application user interface (e.g., email user interface 5036). In some embodiments, the device displays replacing the notification center user interface gradually with the search user interface in accordance with movement 5063 of contact 5062, as described above with respect to replacing the home screen user interface with the notification user interface in FIGS. 5F-5H.

In FIG. 5AJ, the device has detected lift-off of contact 5062 at a location that is in the middle-left portion of touch screen 112 (e.g., with a movement distance meeting the requirement of the first criteria, and/or with a movement speed at lift-off that meets the first criteria, etc.); and in accordance with a determination that the third criteria for displaying the notification center user interface are met by the downward swipe gesture at the lift-off of contact 5062, the device displays the notification center user interface (e.g., user interface 5020) in the full-screen mode. In accordance with a determination that the movement of contacts 5062 does not meet the third criteria for displaying the notification center user interface, the device forgoes displaying the notification center user interface in the full screen mode and instead continues displaying the application user interface.

FIGS. 5AK-5AL illustrate an upward swipe gesture for navigating from the notification center user interface to a previously displayed application interface (e.g., dismissing the notification center user interface). For example, in FIGS. 5AK-5AL the device replaces the notification center user interface in response to an upward swipe gesture by the email user interface (e.g., user interface 5036) that was displayed prior to detecting the downward swipe gesture for displaying the notification center user interface in FIG. 5AH. In FIG. 5AK, the device detects contact 5064 while displaying the notification center user interface in the full-screen mode. The device detects a contact (e.g., contact 5064) in the fourth portion of the edge region (e.g., region 5003-4 shown in FIG. 5AB) of touch screen 112 (e.g., in a middle-bottom region of touch screen 112). In some embodiments, the device detects at least a portion of contact 5064 right on the edge of the touch screen 112. In FIG. 5AK, the device detects movement 5065 in the second direction (e.g., upward movement 5065 of contact 5064 from the middle-bottom edge of touch screen 112 to an interior portion of touch screen 112).

In accordance with a determination that movement 50555 of contact 5054 satisfies first criteria for dismissing the notification center user interface (e.g., user interface 5020) and replacing the notification center user interface with the application user interface that was previously displayed, the device initiates displaying the application user interface. In some embodiments, the first criteria for dismissing the notification center user interface include a requirement that a user interface (e.g., an application user interface) was previously replaced by the notification user interface, in order for the first criteria to be met. For example, displaying the notification center user interface was initiated in response to a swipe gesture detected while displaying an application user. In some embodiments, the first criteria for dismissing the notification center user interface include a requirement that the movement of contact 5064 begins from the bottom edge region of touch screen 112 (e.g., region 5004-4 in FIG. 5AB), in order for the first criteria to be met. In some embodiments, the first criteria for dismissing the notification center user interface include a requirement that the movement of contact 5064 begins from the middle bottom edge region of touch screen 112 (e.g., region 5004-4 in FIG. 5AB), in order for the first criteria to be met. In some embodiments, the first criteria for dismissing the notification center user interface include a requirement that the movement of contact 5064 is in a substantially upward direction, in order for the first criteria to be met. In some embodiments, the device displays replacing the notification center user interface gradually with the application user interface that was previously displayed in accordance with movement 5063 of contact 5062. For example, the bottom edge of the notification center user interface slides upwards in accordance with movement 5063 of contact 5062 while the application user interface is displayed in the background.

In FIG. 5AL, the device has detected lift-off of contact 5064 at a location that is in the middle portion of touch screen 112 (e.g., with a movement distance meeting the requirement of the first criteria, and/or with a movement speed at lift-off that meets the first criteria for dismissing the notification center user interface, etc.); and in accordance with a determination that the first criteria for dismissing the notification center user interface are met by the upward swipe gesture at the lift-off of contact 5064, the device displays the application user interface (e.g., user interface 5036) in the full-screen mode. In accordance with a determination that the movement of contacts 5064 does not meet the first criteria for dismissing the notification center user interface, the device forgoes displaying the application user interface in the full screen mode and instead continues displaying the notification user interface.

The dismissal of the notification center user interface described with respect to FIGS. 5AK-5AL can also be performed for navigating from the notification center user interface back to the home screen, in instances where the user interface that was displayed prior to displaying the notification center user interface was the home screen. For example, the dismissal of the notification center user interface described in FIG. 5AK-5AL can be performed subsequent to performing the operations described above with respect to FIGS. 5F-5H for navigating from the home screen to the notification center by the downward swipe gesture.

FIGS. 5AM-5AN illustrate a downward multi-contact swipe gesture that causes the device to navigate from the home screen user interface of the device to the search user interface, in accordance with some embodiments.

In FIG. 5AM, the device 100 displays the home screen user interface (e.g., user interface 5002) in the full screen mode. The device detects multiple contacts (e.g., two, three, or four contacts) (e.g., multiple contacts 5066 including contacts 5066-1, 5066-2, 5066-3, and 5066-4) in the middle portion of touch screen 112 (e.g., portion 5025 in FIG. 5AM positioned away from the edges of touch screen 112 corresponding to the interior portion of touch screen 112). In FIG. 5AM, the device detects movement of the multiple contacts in the first direction (e.g., downward movement 5067 of contact 5066 from the middle portion of touch screen 112). In some embodiments, movement 5067 of contacts 5066 is substantially perpendicular to the top edge of touch screen 112. In some embodiments, movement 5067 of contacts 5066 corresponds to a downward multi-contact swipe starting from the middle portion of touch screen 112 toward the bottom edge of touch screen 112.

In accordance with a determination that the movement of contacts 5066 satisfies seventh criteria for displaying the search user interface (e.g., user interface 5006), the device displays the search user interface. In some embodiments, the device displays replacing the home screen user interface gradually with the search user interface in accordance with movement 5067 of contacts 5066, similarly as described above with respect to replacing the home screen user interface with the search user interface in FIGS. 5A-5C. In some embodiments, the seventh criteria for displaying the search user interface include a requirement the device detects a preset number of contacts (e.g., two, three, or four contacts), in order for the seventh criteria to be met. In some embodiments, the seventh criteria for displaying the search user interface include a requirement the preset number of contacts is configured in a certain configuration (e.g., the preset number of contacts are positioned in a certain manner with respect to each other), in order for the seventh criteria to be met. In some embodiments, the seventh criteria for displaying the search user interface include a requirement that the preset number of contacts have movement in the first direction substantially concurrently (e.g., the preset number of contacts move in the substantially same direction with the substantially same speed), in order for the seventh criteria to be met. In some embodiment, the seventh criteria for displaying the search user interface include a requirement that the movement of the contact has reached a threshold distance and/or has a threshold speed, in order for the seventh criteria to be met.

In FIG. 5AN, the device has detected lift-off of contacts 5066; and in accordance with a determination that the movement of contacts 5066 meets the seventh criteria for displaying the search user interface, the device displays the search user interface in the full screen mode. In some embodiments, replacing the home screen user interface 5002 with the search user interface is performed as described with respect to FIGS. 5A-5C. In accordance with a determination that the movement of contacts 5066 does not meet the seventh criteria, the device forgoes displaying the search user interface in the full screen mode and instead continues displaying the home screen user interface.

In some embodiments, the device displays the search user interface in response to the downward swipe gesture that begins from the first portion of the top-edge region of touch screen 112 (e.g., illustrated in FIGS. 5A-5C), the middle portion (e.g., illustrated in FIGS. 5M-5N and 5Z-5AA) or the multi-contact downward swipe gesture that begins from the middle portion of the touch screen 112 (e.g., illustrated in FIGS. 5AM-5AN).

FIGS. 5AO-5AP illustrate an upward multi-contact swipe gesture that causes the device to navigate from the home screen user interface of the device to the multitasking user interface, in accordance with some embodiments.

In FIG. 5AO, the device 100 displays the home screen user interface (e.g., user interface 5002) in the full screen mode. The device detects multiple contacts (e.g., two, three, or four contacts) (e.g., multiple contacts 5068 including contacts 5068-1, 5068-2, 5068-3, and 5068-4) in the middle portion of touch screen 112 (e.g., portion 5025 in FIG. 5AM positioned away from the edges of touch screen 112 corresponding to the interior portion of touch screen 112). In FIG. 5AO, the device detects movement of the multiple contacts in the second direction (e.g., upward movement 5069 of contacts 5068 from the middle portion of touch screen 112). In some embodiments, movement 5069 of contacts 5068 is substantially perpendicular to the top edge of touch screen 112. In some embodiments, movement 5069 of contacts 5068 corresponds to an upward multi-contact swipe starting from the middle portion of touch screen 112 toward the bottom edge of touch screen 112.

In accordance with a determination that the movement of contacts 5068 satisfies second criteria for displaying the multitasking user interface (e.g., user interface 5060), the device displays the multitasking user interface. The multitasking user interfaces (e.g., also referred to as an application-switcher user interface) includes representations of user interfaces of one or more applications with stores states (e.g., a multitasking user interface that includes a plurality of cards that are reduced scale images of the last seen user interfaces of different applications with stored states). In FIG. 5AP, representations of web browser user interface 5060-1, photos user interface 5072, and messages user interface 5060-2 are illustrated. In the configuration illustrated in FIG. 5AP, the representations of user interfaces of the one or more applications with stored states are arranged next to each other instead of in a stack shown in FIG. 5AD. In some embodiments, the device displays replacing the home screen user interface gradually with the multitasking user interface in accordance with movement 5069 of contacts 5068, similarly as described above with respect to replacing the home screen user interface with the multitasking user interface in FIGS. 5AB-5AD. In some embodiments, the second criteria for displaying the multitasking user interface include a requirement the device detects a preset number of contacts 5068 (e.g., two, three, or four contacts), in order for the seventh criteria to be met. In some embodiments, the second criteria for displaying the multitasking user interface include a requirement the preset number of contacts 5068 is configured in a certain configuration (e.g., the preset number of contacts are positioned in a certain manner with respect to each other), in order for the second criteria to be met. In some embodiments, the second criteria for displaying the search user interface include a requirement that the preset number of contacts 5068 have movement in the second direction substantially concurrently (e.g., the preset number of contacts move in the substantially same direction with the substantially same speed), in order for the second criteria to be met. In some embodiment, the second criteria for displaying the multitasking user interface include a requirement that the movement of the contacts 5068 has reached a threshold distance and/or has a threshold speed, in order for the second criteria to be met.

In FIG. 5AP, the device has detected lift-off of contacts 5068; and in accordance with a determination that the movement of contacts 5068 meets the second criteria for displaying the multitasking user interface, the device displays the multitasking user interface in the full screen mode. In some embodiments, replacing the home screen user interface with the multitasking user interface is performed as described with respect to FIGS. 5AB-5AD. In accordance with a determination that the movement of contacts 5066 does not meet the second criteria for displaying the multitasking user interface, the device forgoes displaying the multitasking user interface and instead displays the home screen user interface.

In some embodiments, the device displays the multitasking user interface in response to the upward swipe gesture that begins from the fourth portion of the bottom-edge region of touch screen 112 (e.g., illustrated in FIGS. 5AB-5AD) or the multi-contact upward swipe gesture that begins from the middle portion of the touch screen 112 (e.g., illustrated in FIGS. 5AO-5AP).

FIGS. 5AQ-5AR illustrate an upward multi-contact swipe gesture that causes the device to navigate from an application user interface to the home screen user interface of the device, in accordance with some embodiments.

In FIG. 5AQ, the device 100 displays an application user interface (e.g., photos user interface 5072) in the full screen mode. The device detects multiple contacts (e.g., multiple contacts 5070 including contacts 5070-1, 5070-2, 5070-3, and 5070-4) in the middle portion of touch screen 112 (e.g., portion 5025 in FIG. 5AM positioned away from the edges of touch screen 112 corresponding to the interior portion of touch screen 112). In FIG. 5AQ, the device further detects movement of the multiple contacts in the second direction (e.g., upward movement 5071 of contacts 5068 from the middle portion of touch screen 112). In some embodiments, movement 5071 of contacts 5070 is substantially perpendicular to the top edge of touch screen 112. In some embodiments, movement 5071 of contacts 5070 corresponds to an upward multi-contact swipe starting from the middle portion of touch screen 112 toward the bottom edge of touch screen 112.

In accordance with a determination that the movement of contacts 5070 satisfies second criteria for displaying the home screen user interface (e.g., user interface 5002), the device displays the home screen user interface. In some embodiments, the device displays replacing the application user interface gradually with the home screen user interface in accordance with movement 5071 of contacts 5070, similarly as described above with respect to replacing the home screen user interface with the search user interface in FIGS. 5A-5C. In some embodiments, the second criteria for displaying the home screen user interface include a requirement the device detects a preset number of contacts 5070 (e.g., two, three, or four contacts), in order for the second criteria to be met. In some embodiments, the second criteria for displaying the home screen user interface include a requirement that the device detects the preset number of contacts 5070 while displaying an application user interface (e.g., photos user interface 5072), in order for the second criteria to be met. In some embodiments, the second criteria for displaying the home screen user interface include a requirement the preset number of contacts 5070 is configured in a certain configuration (e.g., the preset number of contacts are positioned in a certain manner with respect to each other), in order for the second criteria to be met. In some embodiments, the second criteria for displaying the search user interface include a requirement that the preset number of contacts 5070 have movement in the second direction substantially concurrently (e.g., the preset number of contacts move in substantially the same direction with the substantially same speed), in order for the second criteria to be met. In some embodiment, the second criteria for displaying the multitasking user interface include a requirement that the movement of the contacts 5068 has reached a threshold distance and/or has a threshold speed, in order for the second criteria to be met.

In FIG. 5AR, the device has detected lift-off of contacts 5070; and in accordance with a determination that the movement of contacts 5070 meets the second criteria for displaying the home screen interface, the device displays the home screen user interface. In some embodiments, replacing the application user interface with the multitasking user interface is performed as described with respect to replacing the home screen user interface with the search user interface in FIGS. 5A-5C. In accordance with a determination that the movement of contacts 5070 does not meet the second criteria for displaying the home screen user interface, the device forgoes displaying the home screen user interface and instead displays the application user interface.

FIGS. 5AS-5AT illustrate a right-to-left or left-to-right multi-contact swipe gesture that causes the device to switch between user interfaces of applications with stored states, in accordance with some embodiments.

In FIG. 5AS, the device 100 displays an application user interface (e.g., photos user interface 5072) in the full screen mode. The device detects multiple contacts (e.g., multiple contacts 5074 including contacts 5074-1, 5074-2, 5074-3, and 5074-4) in the middle-left portion of touch screen 112 (e.g., region 5073 in FIG. 5AS positioned in the interior portion of touch screen 112 and in the vicinity of left edge of touch screen 112). In FIG. 5AS, the device further detects movement of the multiple contacts in the third direction (e.g., left-to-right movement 5075 of contacts 5074 from the middle-right portion of touch screen 112). In some embodiments, movement 5071 of contacts 5070 is substantially parallel to the top edge of touch screen 112. In some embodiments, movement 5075 of contacts 5074 corresponds to a substantially horizontal (e.g., left-to-right or right-to-left) multi-contact swipe starting from the middle-right portion of touch screen 112 toward the middle portion of touch screen 112.

In accordance with a determination that the movement of contacts 5074 satisfies second criteria for switching between open user interfaces (e.g., switching from photos user interface 5072 to web browser user interface 5060-1), the device switches between the open user interfaces. In some embodiments, switching between open user interfaces includes replacing a user interface of a first application (e.g., photos user interface 5072 in FIG. 5AS) with a user interface of a second application (e.g., web browser user interface 5060-1 in FIG. 5AT), where the first and second applications are currently open on the device. In some embodiments, initiating switching between the open user interface includes sliding the user interface of the second application (e.g., web browser user interface 5060-1) from the left edge of touch screen 112 toward the center of touch screen 112 in accordance with the movement 5075 of contacts 5074 while gradually revealing the user interface of the second application (e.g., web browser user interface 5060-1). In some embodiments, the second criteria for first criteria for switching between open user interfaces include a requirement that two or more user interfaces of different applications are open on the device, in order for the second criteria to be met. In some embodiments, the second criteria for switching between open user interfaces include a requirement that the movement of the contacts 5074 is detected while displaying an application user interface, in order for the second criteria to be met. In some embodiments, the second criteria for switching between the open user interfaces include that the movement of contacts 5074 begins from the left-middle portion of touch screen 112 (e.g., region 5073 in FIG. 5AS), in order for the second criteria to be met. In some embodiments, the second criteria for switching between the open user interfaces include a requirement that the movement of contact 5074 is in a substantially sideway (e.g., horizontal) direction (e.g., movement 5075 in FIG. 5AS), in order for the first criteria to be met.

In FIG. 5AT, the device has detected lift-off of contacts 5074 at a location that is in the middle-right portion of touch screen 112 (e.g., with a movement distance meeting the requirement of the second criteria for switching between open user interfaces, and/or with a movement speed at lift-off that meets the second criteria, etc.); and in accordance with a determination that the second criteria for switching between the open user interfaces are met by the sideway swipe gesture at the lift-off of contacts 5074, the device displays the user interface of the second application (e.g., web browser user interface 5060-1) in the full-screen mode. In some embodiments, the device replaces the user interface of the first application (e.g., photos user interface 5072) with the user interface of the second application (e.g., web browser user interface 5060-1). In some embodiments, the device ceases to display the user interface of the first application.

FIGS. 5AU-5AV illustrate a downward multi-contact swipe gesture that causes the device to navigate from an application user interface of the device to the search user interface, in accordance with some embodiments.

In FIG. 5AU, the device 100 displays an application user interface (e.g., photos user interface 5072) in the full screen mode. The device detects multiple contacts (e.g., multiple contacts 5076 including contacts 5076-1, 5076-2, 5076-3, and 5076-4) in the middle portion of touch screen 112 (e.g., portion 5025 in FIG. 5AM positioned away from the edges of touch screen 112 corresponding to the interior portion of touch screen 112). In FIG. 5AU, the device further detects movement of the multiple contacts in the first direction (e.g., downward movement 5077 of contact 5076 from the middle portion of touch screen 112). In some embodiments, movement 5077 of contacts 5076 is substantially perpendicular to the top edge of touch screen 112. In some embodiments, movement 5077 of contacts 5076 corresponds to a downward multi-contact swipe starting from the middle portion of touch screen 112 toward the bottom edge of touch screen 112.

In accordance with a determination that the movement of contacts 5076 satisfies eighth criteria for displaying the search user interface (e.g., user interface 5006), the device displays the search user interface. In some embodiments, the device displays replacing the application user interface gradually with the search user interface in accordance with movement 5077 of contacts 5076, similarly as described above with respect to replacing the home screen user interface with the search user interface in FIGS. 5A-5C. In some embodiments, the eight criteria for displaying the search user corresponds to the seventh criteria for displaying the search user interface described with respect to FIGS. 5AM-5AN. The device thereby initiates displaying the search user interface in accordance with a determination that the movement of the contacts meets the seventh criteria for displaying the search user interface, regardless of detecting the movement of the contacts while displaying the home screen user interface (e.g., user interface 5002) or displaying an application user interface (e.g., photos user interface 5072).

In FIG. 5AV, the device has detected lift-off of contacts 5076; and in accordance with a determination that the movement of contacts 5076 meets the eighth criteria for displaying the search user interface, the device displays the search user interface in the full screen mode. In some embodiments, replacing the application user interface with the search user interface is performed as described with respect to replacing the home screen user interface with the search user interface in FIGS. 5A-5C. In accordance with a determination that the movement of contacts 5076 does not meet the eighth criteria, the device forgoes displaying the search user interface and instead continues to display the application user interface.

FIGS. 5AW-5AX illustrate a downward multi-contact swipe gesture that causes the device to navigate from an application user interface of the device to the search user interface, in accordance with some embodiments.

In FIG. 5AW, the device 100 displays an application user interface (e.g., web browser user interface 5060-1) in the full screen mode. The application user interface in FIG. 5AW (e.g., web browser user interface 5060-1) is different from the application user interface in FIG. 5AU (e.g., photos user interface 5072). The device detects multiple contacts (e.g., multiple contacts 5078 including contacts 5078-1, 5078-2, 5078-3, and 5078-4) in the middle portion of touch screen 112 (e.g., portion 5025 in FIG. 5AM positioned away from the edges of touch screen 112 corresponding to the interior portion of touch screen 112). In FIG. 5AV, the device further detects movement of the multiple contacts in the first direction (e.g., downward movement 5079 of contacts 5078 from the middle portion of touch screen 112). In some embodiments, movement 5079 of contacts 5078 is substantially perpendicular to the top edge of touch screen 112. In some embodiments, movement 5079 of contacts 5078 corresponds to a downward multi-contact swipe starting from the middle portion of touch screen 112 toward the bottom edge of touch screen 112.

In accordance with a determination that the movement of contacts 5078 satisfies the eighth criteria for displaying the search user interface (e.g., user interface 5006), the device displays the search user interface. The device thereby initiates displaying the search user interface in accordance with a determination that the movement of the contacts meets the eight criteria for displaying the search user interface, regardless of detecting the movement of the contacts while displaying photos user interface 5072 or displaying web browser user interface 5060-1.

FIGS. 6A-6J are flow diagrams illustrating methods of interacting with an application switching user interface, in accordance with some embodiments. Although some of the examples which follow will be given with reference to inputs on a touch-sensitive display in which a touch-sensitive surface and a display are combined, in some embodiments, the device detects inputs on a touch-sensitive surface 451 that is separate from the display 450, as shown in FIG. 4B.

In some embodiments, methods 6000 and 6100 are performed by an electronic device (e.g., portable multifunction device 100, FIG. 1A) and/or one or more components of the electronic device (e.g., I/O subsystem 106, operating system 126, etc.). In some embodiments, methods 6000 and 6100 are governed by instructions that are stored in a non-transitory computer-readable storage medium and that are executed by one or more processors of a device, such as the one or more processors 122 of device 100 (FIG. 1A). For ease of explanation, the following describes methods 6000 and 6100 are performed by device 100. In some embodiments, with reference to FIG. 1A, the operations of method 6000 are performed by or use, at least in part, operating system 126, communication module 128, and/or graphics module 132, as well as a touch-sensitive display (e.g., touch screen 112). Some operations in methods 6000 and 6100 are, optionally, combined and/or the order of some operations is, optionally, changed.

As described below, methods 6000 and 6100 (and associated interfaces) provide intuitive ways to invoke a search feature, such as displaying a search user interface in response to a gesture detected in different context (e.g., while displaying applications, wake screen, cover sheet, or home screen user interfaces, etc.). The methods reduce the number, extent, and/or nature of the inputs from a user when performing a search operation, thereby creating a more efficient human-machine interface. For battery-operated electronic devices, enabling a user to perform search operations faster and more efficiently conserves power and increases the time between battery charges.

Method 6000 is performed at an electronic device with a display generation component (e.g., a touch-screen display, a projector, a standalone display, a heads-up display, a head-mounted display, etc.) and a touch-sensitive surface.

In method 6000, the device displays (6002), via the display generation component, a first user interface (e.g., a home screen, a lock screen, a wake screen, a cover sheet, an application UI, etc.) in a display region (e.g., home screen user interface 5002 displayed on touch screen 112 in FIG. 5A). In some embodiments, the display generation component and the touch-sensitive surface is integrated into a touch-screen display. In some embodiments, the display generation component is a display that is separately housed from the touch-sensitive surface, and a respective position on the touch-sensitive surface, optionally, has a corresponding position on the display. In some embodiments, a respective position on the touch-sensitive surface has a corresponding position in the display region provided via the display generation component (e.g., a spatial region that has a finite and preset spatial extent in which computer-generated content is capable of being presented visually), and a respective movement of a contact across the touch-sensitive surface corresponds to (e.g., in terms of magnitude, speed, direction, etc.) a movement across the display region provided by the display generation component. In some embodiments, the first user interface occupies substantially all of the display area provided by the display generation component, and is a full-screen user interface. In some embodiments, the first user interface reaches a boundary of the display region provided by the display generation component, where the boundary corresponds to a first edge of the display region. While displaying the first user interface, the device detects (6004) a first touch gesture that includes detecting a first set of one or more contacts on the touch-sensitive surface (e.g., a tap gesture, a touch and hold gesture, a swipe gesture, a multi-finger pinch gesture, a multi-finger swipe gesture, a fluid gesture that includes multiple types of movements, like movement in two or more directions, pinch movement, expansion movements, pivot movements, etc., of one or more concurrently detected contacts, etc., by one or more contacts provided by one or more fingers or styluses). In response to detecting the first touch gesture (6006), and in accordance with a determination that the first touch gesture meets first criteria, where the first criteria include a first requirement that is met in accordance with a determination that the first touch gesture includes first movement of a first contact (e.g., a gesture corresponding to movement 5005 of contact 5004 in FIGS. 5A-5C) across a first portion of a first edge (e.g., region 5003-1) (e.g., left half of the top edge, right quarter of the top edge, top half of the left edge, bottom half of the left edge, left one third of the bottom edge, right one third of the bottom edge, etc.) of the touch-sensitive surface in a first direction (e.g., the first movement crosses the first portion of the first edge in a direction that is substantially perpendicular to the first edge, and/or toward the center or central portion of the touch-sensitive surface) (e.g., downward from the top edge, leftward from the right edge, upward from the bottom edge, rightward from the left edge, etc.), the device replaces (6008) at least a portion of the first user interface with a first search user interface in the display region. This is illustrated, for example, in FIGS. 5B-5C following FIG. 5A, where the device displays search user interface 5006 in response to the downward swipe gesture by contact 5004 that begins from the middle-top edge region (e.g., region 5003-1 in FIG. 5A) of touch screen 112. In some embodiments, the first user interface shifts in the display region to make room for the display of the first user interface including a first search input region, and optionally a background layer and/or other user interface objects (e.g., suggested searches, dynamically generated search results, etc.). In some embodiments, the first user interface fades out into the background to allow the first search user interface to be displayed in a display layer on top of the first user interface. In some embodiments, the first user interface shrinks in size to make room for the display of the first search user interface. In some embodiments, the first user interface recedes in depth in a direction away from the user and the first search user interface is displayed in a display layer previously occupied by the first user interface. In some embodiments, the first user interface is replaced completely in the display region by the first search user interface that includes the first search input region. In some embodiments, at least a portion of the first user interface remains displayed concurrently with the first search input area in response to detecting the first touch gesture (e.g., some elements of the first user interface remains displayed and is concurrently visible with the first search input region in the first search user interface). In some embodiments, the first user interface ceases to be displayed in response to detecting the first touch gesture. In some embodiments, the first search user interface that includes the first search input region slides in from the edge of the touch-screen in accordance with the movement direction of the swipe input of the first touch gesture, while the first user interface recedes in a direction away from the surface of the touch-screen. In some embodiments, the first search user interface that includes the first search input region has a translucent background, and after the first search user interface that includes the first search input region is fully displayed on the touch-screen, the background partially reveals the first user interface in a display layer underneath the first search user interface, e.g., with a blurred and/or darkened image of the first user interface. In accordance with a determination that the first touch gesture meets second criteria different from the first criteria, where the second criteria include a second requirement that is met in accordance with a determination that the first touch gesture includes second movement of the first contact (e.g., a gesture corresponding to movement 5019 of contact 5018 in FIGS. 5F-5H) across a second portion of the first edge (e.g., region 5003-2) (e.g., right quarter of the top edge, left half of the top edge, bottom half of the left edge, top half of the left edge, right one third of the bottom edge, left one third of the bottom edge, etc.) of the touch-sensitive surface in the first direction (e.g., the second movement crosses the second portion of the first edge in a direction that is substantially perpendicular to the first edge, and/or toward the center or central portion of the touch-sensitive surface) (e.g., downward from the top edge, leftward from the right edge, upward from the bottom edge, rightward from the left edge, etc.), where the second portion of the first edge is different from the first portion of the first edge (e.g., the first movement and the second movement crosses the same edge of the touch-sensitive surface in different redefined interaction regions), the device replaces (6010) at least a portion of the first user interface with a plurality of previously received notifications (e.g., notification center user interface 5020 in FIG. 5H) in the display region. This is illustrated, for example, in FIGS. 5G-5H following FIG. 5F, where the device displays notification center user interface 5020 in response to the downward swipe gesture by contact 5018 that begins from the left-top edge region (e.g., region 5003-2 in FIG. 5F) of touch screen 112. For example, in some embodiments, instead of replacing the portion of the first user interface with the first search user interface, the device replaces the portion of the first user interface with a user interface that includes a plurality of previously received notifications. In some embodiments, the first user interface shifts in the display region to make room for the display of the previously received notifications. In some embodiments, the first user interface fades out into the background to allow the previously received notifications to be displayed on top of the first user interface. In some embodiments, the first search input region shrinks in size to make room for the display of the previously received notifications. In some embodiments, the first user interface is replaced completely in the display region by another user interface that includes the previously received notifications. In some embodiments, at least a portion of the first user interface remains displayed concurrently with the previously received notifications in response to detecting the first touch gesture. In some embodiments, the first user interface ceases to be displayed in response to detecting the first touch gesture. In some embodiments, the plurality of previously received notifications and the first search input region are not concurrently displayed in response to the first touch gesture (e.g., the plurality of previously received notifications is displayed without displaying the first search input region; and the first search input region is displayed without the displaying the plurality of previously received notifications). In some embodiments, the plurality of previously received notifications are not concurrently displayed with the first search input region in the display region provided by the display generation component, in response to the detection of the first touch gesture, because the first touch gesture cannot meet both the first criteria and the second criteria. In some embodiments, the user interface that includes the previously received notifications slides in from the edge of the touch-screen in accordance with the movement direction of the swipe input of the first touch gesture, while the first user interface recedes in a direction away from the surface of the touch-screen. In some embodiments, the user interface that includes the previously received notifications has a translucent background, and after the user interface that includes the previously received notifications is fully displayed on the touch-screen, the background partially reveals the first user interface in a display layer underneath the first search input region, e.g., with a blurred and/or darkened image of the first user interface. In some embodiments, the first user interface is more obfuscated by the user interface that includes the previously received notifications than the first search user interface that includes the first search input region. In some embodiments, the first user interface is less or equally obfuscated by the user interface that includes the previously received notifications as compared to the first search user interface that includes the first search input region. In some embodiments, the first criteria and the second criteria cannot be met concurrently (e.g., a downward swipe gesture is either on a first portion of the top edge region (e.g., region 5003-1 in FIG. 5A) or on a second portion of the top edge region (e.g., region 5003-2 in FIG. 5F) of the touch screen 112).

Displaying a user interface with a search input region in accordance with a determination that a touch gesture includes movement across a first portion of an edge of a touch-sensitive surface and displaying a user interface with a plurality of previously received notifications in accordance with a determination that the touch gesture includes movement across a second portion of the edge of the touch-sensitive surface provides additional control options for displaying user interfaces without a need for displaying user interface controls for invoking these user interfaces. Providing additional control options without cluttering the user interface with additional displayed controls enhances the operability of the device, which, additionally, reduces power usage and improves battery life of the device by enabling the user to use the device more quickly and efficiently.

In some embodiments, the first portion of the first edge and the second portion of the first edge (e.g., regions 5003-1 and 5003-2 of the top-edge of touch screen 112 illustrated in FIGS. 5A and 5F, respectively) are (6012) operationally adjacent to each other (e.g., the first portion of the first edge is (immediately) next to the second portion of the first edge; there are no interactive region between the first portion of the first edge and the second portion of the first edge, there are no input region in between the first portion and the second portion of the first edge; etc.). In some embodiments, the edge portions of the display region that respectively correspond to the first portion of the first edge and the second portion of the first edge are not visually marked with respective boundaries on the display region. For example, the portions of the display region that correspond to the first portion and the second portion of the first edge do not have corresponding graphical user interface elements respectively displayed at or near the portions of the display region that correspond to the first portion and the second portion of the first edge (e.g., the first portion and the second portion of the first edge of the touch screen, the first edge portion and second edge portion along a first edge of the display region that respectively correspond to the first portion and the second portion of the first edge of the touch-sensitive surface, etc.). In some embodiments, the portions of the display region (e.g., edge portions of the touch screen, edge portions of the display region provided by the display generation component, etc.) at, near, or corresponding to the first portion of the first edge and the second portion of the first edge respectively display some of the portion of the first user interface that is later replaced by the first search user interface or the previously received notifications.

Displaying different user interfaces in response to touch gestures including movement across different, and operationally adjacent, portions of an edge of a touch-sensitive surface provides additional control options for displaying user interfaces without a need for displaying user interface controls for the different user interfaces. Providing additional control options without cluttering the user interface with additional displayed controls enhances the operability of the device, which, additionally, reduces power usage and improves battery life of the device by enabling the user to use the device more quickly and efficiently.

In some embodiments, replacing the portion of the first user interface with the first search user interface in the display region includes (6014) displaying a search input region (e.g., search input region 5008 in FIG. 5C) in a respective portion of the display region and replacing the portion of the first user interface with the plurality of previously received notifications (e.g., region 5006-1 including suggested actions and region 5006-2 including suggested applications in FIG. 5C) includes displaying a notification in the respective portion of the display region. In some embodiments, a respective portion of the display region provided by the display generation component displays at least a portion of the first search input region in accordance with the determination that the first touch gesture meets the first criteria and displays at least a portion of the plurality of previously received notification in accordance with the determination that the first touch gesture meets the second criteria. In other words, in some embodiments, the display region displaying the first search input region and the display region displaying the previously received notifications are the same display region or overlap. Displaying different user interfaces on a respective portion of a display area in accordance with a determination that a touch gesture meets first criteria or second criteria provides additional control options for displaying the different user interfaces without a need for displaying user interface controls for the different user interfaces. Providing additional control options without cluttering the user interface with additional displayed controls enhances the operability of the device, which, additionally, reduces power usage and improves battery life of the device by enabling the user to use the device more quickly and efficiently In some embodiments, detecting the first touch gesture includes detecting (6016) movement of the first set of one or more contacts (e.g., movement 5005 of contact 5004) from outside of the touch-sensitive surface across the first edge of the touch-sensitive surface (e.g., the top-edge of touch screen 112) onto the touch-sensitive surface, and the first direction is substantially perpendicular to the first edge of the touch-sensitive surface (e.g., movement 5005 of contact 5004 is substantially downward) (e.g., the first edge is a top edge of the touch-screen display region and the first touch gesture is a downward swipe from the top edge; the first edge is a left edge of the touch-screen display, and the first touch gesture is a rightward swipe from the left edge; etc.).

Displaying different user interfaces in response to a touch gesture (e.g., an edge gesture) including movement of a contact from outside of a touch-sensitive surface onto the touch-sensitive surface on different portions of an edge of the touch-sensitive surface provides additional control options for displaying the different user interfaces without a need for displaying user interface controls for the different user interfaces. Providing additional control options without cluttering the user interface with additional displayed controls enhances the operability of the device, which, additionally, reduces power usage and improves battery life of the device by enabling the user to use the device more quickly and efficiently.

In response to detecting the first touch gesture, and in accordance with a determination that the first touch gesture meets third criteria, where the third criteria include a third requirement that is met in accordance with a determination that the first touch gesture includes third movement of the first contact across the touch-sensitive surface in the first direction and a determination that third movement begins in a first interior portion of the touch-sensitive surface that is outside of the first portion and the second portion of the first edge and positioned away from the first edge (e.g., separated from the first edge by one or more other input regions on the touch-sensitive surface (e.g., one or more edge input regions, and/or one or more interior input regions, etc.)) (and, optionally, separate from other edges of the touch-sensitive surface), the device replaces (6018) the at least a portion of the first user interface with the first search user interface in the display region. These features are illustrated, for example, in FIGS. 5Z-5AA, where the device replaces the home screen user interface (e.g., user interface 5002) with the search user interface (e.g., user interface 5006) in response to a downward swipe gesture that begins from the middle portion of touch screen 112. In some embodiments, the first search user interface that includes the first search input region that is displayed in response to a touch gesture that meets the first criteria and the first search user interface that includes the first search input region that is displayed in response to a touch gesture that meets the third criteria are the same search user interface with the same first search input region. In some embodiments, the first search user interface that includes the first search input region has a translucent background that partially reveals the first user interface that has receded into a display layer underneath the first search input region as a blurred and/or darkened image of the first user interface (e.g., home screen, application user interface, wake screen, cover sheet, lock screen, a notification history user interface, etc.). In some embodiments, the first search input region is a user interface object that is displayed over the first user interface (e.g., in the original state, or optionally, a blurred and/or darkened version of the original state, etc.) in response to a touch gesture meeting either the first criteria and/or the third criteria. In some embodiments, the third criteria require that the first user interface do not already have another function already associated with a swipe gesture that meets the direction and location requirements of the third criteria. In some embodiments, the first criteria, the second criteria and the third criteria cannot be met concurrently (e.g., a downward swipe gesture is either on a first portion of the top edge region (e.g., region 5003-1 in FIG. 5A), on a second portion of the top edge region (e.g., region 5003-2 in FIG. 5F) or on a third portion of the top edge region (e.g., region 5003-3 in FIG. 5F) of the touch screen 112).

Displaying a user interface with a search input region in accordance with a determination that a touch gesture includes movement across a first portion of an edge of a touch-sensitive surface or in accordance with a determination that the touch gesture includes movement across the touch-sensitive surface beginning in an interior portion of the touch-sensitive surface provides additional control options for displaying the user interface without a need for displaying a user interface control for the user interface with the search input region. Providing additional control options without cluttering the user interface with additional displayed controls enhances the operability of the device, which, additionally, reduces power usage and improves battery life of the device by enabling the user to use the device more quickly and efficiently.

In response to detecting the first touch gesture, and in accordance with a determination that the first touch gesture meets fourth criteria, where the fourth criteria include a fourth requirement that is met in accordance with a determination that the first touch gesture includes fourth movement of the first contact across a third portion (e.g., region 5003-3 of top-edge of touch screen 112 in FIG. 5O) of the first edge of the touch-sensitive surface, different from the first portion and the second portion of the first edge of the touch-sensitive surface (e.g., the third portion functionally adjacent to the first portion or the second portion of the touch-sensitive surface, the third portion is an end portion of the first edge (e.g., a left top corner of the top edge or a right top portion of the top edge, etc.), in the first direction, the device replaces (6020) at least a portion of the first user interface with a control panel user interface. These features are illustrated, for example, in FIGS. 5O-5Q, where the device replaces a portion of the home screen user interface (e.g., user interface 5002) with the control panel user interface (e.g., user interface 5034) in response to a downward swipe gesture (e.g., movement 5033 of contact 5032) that begins from the top-right edge region of touch screen 112 (e.g., region 5003-3). The control panel user interface includes a plurality of user interface objects (e.g., icons 5034-1 to 5034-14) (e.g., buttons, sliders, dials, etc.) corresponding to different device control functions (e.g., turning on/off WiFi, turning on/off airplane mode, turning on/off other network connectivity mode, playback controls for a media player, display brightness control, audio volume control, turning on/off call and notification silencing mode, turning on/off flashlight, turning on/off camera, etc.).

Displaying a user interface with a search input region in accordance with a determination that a touch gesture includes movement across a first portion of an edge of a touch-sensitive surface, displaying a user interface with a plurality of previously received notifications in accordance with a determination that the touch gesture includes movement across a second portion of the edge of the touch-sensitive surface, and displaying a user interface with a control panel in accordance with a determination that the touch gesture includes movement across a third portion of the edge of the touch-sensitive surface provides additional control options for displaying user interfaces without a need for displaying user interface controls for these user interfaces. Providing additional control options without cluttering the user interface with additional displayed controls enhances the operability of the device, which, additionally, reduces power usage and improves battery life of the device by enabling the user to use the device more quickly and efficiently.

In some embodiments, the first criteria and the second criteria (and, optionally, the third, fourth, and/or fifth criteria, etc.) are (6022) capable of being met while displaying an application user interface (e.g., the first user interface is a user interface of a first application) (e.g., a messages application, a maps application, a gaming application, a media player application, a browser application, etc.). This is illustrated, for example, in FIGS. 5R-5S, where the device replaces an application user interface (e.g., email user interface 5036) with the search user interface (e.g., user interface 5006) in response to detecting a downward swipe gesture (e.g., movement 5039 of contact 5038) that begins from the top-middle edge region of touch screen 112. For example, the user interface of the first application is displayed in response to activation of an application icon (e.g., by a tap input, or a voice command, etc.) corresponding to the first application. In some embodiments, the user interface of the first application has an application function associated with a touch gesture that meets the third criteria (e.g., scrolling within the application user interface, or drawing a line within the application user interface, etc.), and the touch gesture that meets the third criteria does not trigger display of the first search user interface if the touch gesture is detected while the first user interface is the user interface of the first application (e.g., but instead triggers the application function, or requires an additional confirmation input, etc.), while only the touch gesture that meets the first criteria (and, optionally, a touch gesture that meets the fifth criteria) triggers display of the first search user interface.

Displaying a user interface with a search input region or a user interface with a plurality of previously received notifications in response to a touch gesture received while displaying an application user interface provides ways of displaying the user interfaces with reduced number of inputs (e.g., without a need of closing the displayed application user interface and opening a home screen before providing the touch gesture for displaying the user interfaces). Reducing the number of inputs needed to perform an operation enhances the operability of the device, which, additionally, reduces power usage and improves battery life of the device by enabling the user to use the device more quickly and efficiently.

In some embodiments, the first criteria and the second criteria (and, optionally, the third, fourth, and/or fifth criteria, etc.) are (6024) capable of being met (e.g., are met, can be met under this and one or more other conditions, etc.) while displaying a home screen user interface (e.g., the first user interface is a home screen user interface) that includes a plurality of application icons corresponding to different applications. This is illustrated, for example, in FIGS. 5A-5C, where the device replaces the home screen user interface (e.g., user interface 5002) with the search user interface (e.g., user interface 5006) in response to detecting a downward swipe gesture (e.g., movement 5005 of contact 5004) that begins from the top-middle edge region of touch screen 112. A respective application icon of the plurality of application icons (e.g., icon 440 for alarm clock, icon 432 for online video module, icon 434 for stocks widget, icon 436 for map, and icon 438 for weather widget), when activated in accordance with preset criteria, (e.g., by a tap input, by a double tap input, etc.) causes display of a respective application of the different applications that corresponds to the respective application icon. For example, in response to detecting a tap gesture on an application icon (e.g., icon 440 for alarm clock), the device displays a user interface corresponding to the respective icon (e.g., an alarm clock user interface). In some embodiments, the home screen user interface is displayed in response to activation of a home button, or detection a home gesture, and the home screen user interface replaces display of a currently displayed user interface in response to the activation of the home button or the detection of the home gesture. In some embodiments, a home screen user interface includes multiple pages that the user can browse through using one or more navigation inputs (e.g., horizontal swipes, vertical swipes, etc.).

Displaying a user interface with a search input region or a user interface with a plurality of previously received notifications in response to a touch gesture received while displaying a home screen user interface, provides ways of displaying the used user interfaces with reduced number of inputs (e.g., without a need of providing an input for scrolling through a plurality of user interface icons on the home screen and providing an input to display a respective user interface icon). Reducing the number of inputs needed to perform an operation enhances the operability of the device, which, additionally, reduces power usage and improves battery life of the device by enabling the user to use the device more quickly and efficiently.

In some embodiments, the first criteria and the second criteria (and, optionally, the third, fourth, and/or fifth criteria, etc.) are (6026) capable of being met (e.g., are met, can be met under this and one or more other conditions, etc.) while displaying a wake screen (e.g., the first user interface is a wake screen user interface) that is displayed in response to detecting a request to wake the display generation component from a low power mode (e.g., a low power always-on mode, a display-off mode, a power-saving sleep mode, etc.). These features are illustrated, for example, in FIGS. 5T-5W, where the device replaces wake screen user interface 5042 with the search user interface (e.g., user interface 5006) in response to detecting a downward swipe gesture (e.g., movement 5053 of contact 5054) that begins from the middle-top edge region of touch screen 112. The wake screen user interface is displayed in response to detecting a request to wake the display generation component from a low power mode (e.g., low power mode 5040 in FIG. 5T). In some embodiments, the wake screen user interface is initially displayed in a locked state, and later transitions into an unlocked state after authentication information has been obtained (e.g., through passcode entry, or biometric information verification). In some embodiments, the wake screen user interface includes a time element that displays the current time and optionally date. In some embodiments, the wake screen user interface displays a prompt for unlocking the device when the device is locked. In some embodiments, the wake screen displays one or more notifications at a time when the one or more notifications are newly received (and, optionally, while the notifications maintains the unread status in the always-on lower power mode) and when the display generation component is woken from the low power mode and enters the normal operational mode.

Displaying user interface with a search input region or a user interface with a plurality of previously received notifications in response to a touch gesture received while displaying a wake screen user interface, provides ways of displaying the used user interfaces with reduced number of inputs (e.g., without a need of closing the displayed wake screen user interface and opening a home screen before providing the touch gesture for opening the frequently used user interfaces). Reducing the number of inputs needed to perform an operation enhances the operability of the device, which, additionally, reduces power usage and improves battery life of the device by enabling the user to use the device more quickly and efficiently.

In some embodiments, the first criteria and the second criteria (and, optionally, the third, fourth, and/or fifth criteria, etc.) are (e.g., 6028) capable of being met (e.g., are met, can be met under this and one or more other conditions, etc.) while displaying a cover screen user interface (e.g., the first user interface is a cover screen user interface) that covers a currently displayed user interface in a plurality of contexts (e.g., different application user interfaces) in response to a preset touch gesture. For example, the cover sheet user interface (e.g., user interface 5050) illustrated in FIG. 5X has the same features as the wake screen user (e.g., user interface 5043) illustrated in FIGS. 5U-5V. In FIGS. 5U-5W, the wake screen user interface 5043 is replaced with the search user interface (e.g., user interface 5006) in response to detecting a downward swipe gesture (e.g., movement 5053 of contact 5054) that begins from the middle-top edge region of touch screen 112. The currently displayed user interface is redisplayed when the cover screen user interface is dismissed. For example, in an instance where the cover sheet user interface is displayed in response to a request to display the cover sheet user interface while displaying an application user interface, the device redisplays the application user interface in response to a request to dismiss the cover sheet user interface. In some embodiments, the cover screen user interface has a same or similar appearance as the wake screen user interface or the lock screen user interface, and has the same time element showing the current time. In some embodiments, unlike the wake screen user interface, display of the cover screen user interface does not need to be initiated when the device is in the low power mode, and does not cause the device to be screen locked (e.g., dismissal of the cover screen user interface does not require re-entry of the authentication information). In some embodiments, in accordance with a determination that the first criteria and the second criteria are capable of being met while displaying any of a plurality of user interfaces (e.g., wake screen user interface, lock screen user interface, cover screen user interface, home screen user interface, application user interface, etc.), the device detects a touch gesture while displaying a respective user interface, and in response to detecting the touch gesture, the device determines whether the respective user interface is one of the plurality of user interfaces, and in accordance with a determination that the respective user interface is one of the plurality of user interfaces, the device evaluates the gesture against the first criteria and the second criteria (and the other criteria described herein), to determine the operation that is to be performed (e.g., displaying the first search user interface, the previously received notifications, the control panel user interface, etc.). In some embodiments, the device sequentially performs the above mentioned evaluation and operation, at different times when a touch gesture is detected while different user interfaces of the plurality of user interfaces are respectively displayed.

Displaying user interface with a search input region or a user interface with a plurality of previously received notifications in response to a touch gesture received while displaying a cover sheet user interface, provides ways of displaying the used user interfaces with reduced number of inputs (e.g., without a need of closing the displayed cover sheet user interface and opening a home screen before providing the touch gesture for displaying the user interfaces). Reducing the number of inputs needed to perform an operation enhances the operability of the device, which, additionally, reduces power usage and improves battery life of the device by enabling the user to use the device more quickly and efficiently.

In some embodiments, in response to detecting the first touch gesture and in accordance with a determination that the first touch gesture meets fifth criteria, where the fifth criteria include a fifth requirement that is met in accordance with a determination that the first touch gesture includes fifth movement of a preset number of concurrently detected contacts across the touch-sensitive surface in the first direction (e.g., the preset number of contacts being two or more concurrently detected contacts, being two concurrently detected contacts, three concurrently detected contacts, and/or four concurrently detected contacts, etc.) that begins in a respective portion (e.g., an interior portion) of the touch-sensitive surface that is different from the first portion and the second portion of the first edge of the touch-sensitive surface (e.g., a portion of the touch-sensitive surface that is outside of the first portion and the second portion of the first edge (and the third portion of the first edge) and positioned away from the first edge (e.g., separated from the first edge by one or more other input regions on the touch-sensitive surface (e.g., one or more edge input regions, and/or one or more interior input regions, etc.)) (and, optionally, separate from other edges of the touch-sensitive surface)), the device replaces (6030) the at least a portion of the first user interface with the first search input region on the display region. These features are illustrated, for example, in FIGS. 5AM-5AN, where the device replaces the home screen user interface (e.g., user interface 5002) with the search user interface (e.g., user interface 5006) in response to detecting a downward multi-contact swipe gesture (e.g., movement 5067 of contacts 5066). In some embodiments, the first search user interface that includes the first search input region that is displayed in response to a touch gesture that meets the first criteria and the first search user interface that includes the first search input region that is displayed in response to a touch gesture that meets the fifth criteria are the same search user interface with the same first search input region. In some embodiments, the first search input region is a user interface object that is displayed in a display layer over the first user interface (e.g., in the original state, or optionally, a blurred and/or darkened version of the original state, etc.) in response to a touch gesture meeting either the first criteria, the third criteria, and/or the fifth criteria.

Displaying a user interface with a search input region in accordance with a determination that a touch gesture includes movement of a single contact across a first portion of an edge of a touch-sensitive surface or in accordance with a determination that a touch gesture includes movement of a preset number of contacts across the touch-sensitive surface beginning in an interior portion of the touch-sensitive surface provides additional control options for displaying the user interfaces without a need for displaying user interface controls for these user interfaces. Providing additional control options without cluttering the user interface with additional displayed controls enhances the operability of the device, which, additionally, reduces power usage and improves battery life of the device by enabling the user to use the device more quickly and efficiently.

In some embodiments, in response to detecting the first touch gesture, and in accordance with a determination that the first touch gesture meets sixth criteria, where the sixth criteria include a sixth requirement that is met in accordance with a determination that the first touch gesture includes sixth movement of the preset number of concurrently detected contacts across the touch-sensitive surface in a second direction, different from the first direction (e.g., substantially opposite the first direction, substantially perpendicular to the first direction, etc.), the device replaces (6032) display of the first user interface with display of application selection user interface (e.g., a multitasking user interface, a selection user interface of recent applications, etc.) including a plurality of representations (e.g., application views, application icons) of recently open applications (e.g., currently open or running applications or closed applications saved in a previously used state). These features are illustrated, for example, in FIGS. 5AO-5AP, where the device replaces the home screen user interface (e.g., user interface 5002) with the multitasking user interface (e.g., user interface 5060) in response to detecting an upward multi-contact swipe gesture (e.g., movement 5069 of contacts 5068). A respective representation of the plurality of representations, when activated in accordance with preset criteria (e.g., by a tap input, a double tap input, etc.), causes redisplay of a respective application of the recently open applications that corresponds to the respective representation. For example, in response to detecting an input (e.g., a tap input) on a respective representation of application user interfaces (e.g., representations of web browser user interface 5060-1, photos user interface 5072, or messages user interface 5060-2) the device redisplays the application corresponding to the respective representation. In some embodiments, the first touch gesture that includes the preset number of concurrently detected contacts are detected anywhere in an interior portion of the touch-sensitive surface away from the first edge and optionally other edges of the touch-sensitive surface. The movement of the present number of concurrently detected contacts prior to liftoff of the contacts are evaluated against different sets of criteria (e.g., the fifth criteria, the six criteria, etc.), to determine whether the first search input region or the application selection user interface, or some other user interface (e.g., home screen, widget user interface, application library, cover screen user interface, etc.).

Displaying different user interfaces in response gestures of a preset number of contacts in different directions provides additional control options for displaying the different user interfaces without a need for displaying user interface controls for the different user interfaces. Providing additional control options without cluttering the user interface with additional displayed controls enhances the operability of the device, which, additionally, reduces power usage and improves battery life of the device by enabling the user to use the device more quickly and efficiently.

In some embodiments, in response to detecting the first touch gesture, and in accordance with a determination that the first touch gesture meets seventh criteria, wherein the seventh criteria include a requirement that is met in accordance with a determination that the first touch gesture includes seventh movement of the preset number of concurrently detected contacts across the touch-sensitive surface in a second direction, different from the first direction (e.g., substantially opposite the first direction, substantially perpendicular to the first direction, etc.), the device replaces (6034) display of the first user interface with display of a home screen user interface. This is illustrated, for example, in FIGS. 5AQ-5AR, where the device replaces an application user interface (e.g., photos user interface 5072) with the home screen user interface 5002 in response to an upward multi-contact swipe gesture (e.g., movement 5071 of contacts 5070). The home screen user interface includes a plurality of application icons corresponding to different applications (e.g., application icons 504 to 524). A respective application icon, when activated in accordance with present criteria (e.g., by a tap input, a double tap input, etc.), causes display of a respective application of the different applications that corresponds to the respective application icon. For example, in response to detecting an input (e.g., a tap input on application icon 504 for messages, the device displays a user interface of the messages application (e.g., user interface 5060-2). In some embodiments, the first touch gesture that includes the preset number of concurrently detected contacts are detected anywhere in an interior portion of the touch-sensitive surface away from the first edge and optionally other edges of the touch-sensitive surface. The movement of the present number of concurrently detected contacts prior to liftoff of the contacts are evaluated against different sets of criteria (e.g., the fifth criteria, the six criteria, the seventh criteria, etc.), to determine whether the first search input region, the home screen user interface, or some other user interface (e.g., application selection user interface, widget user interface, application library, cover screen user interface, etc.). In some embodiments, the fifth criteria and the sixth criteria are both capable of being met by movements of the preset number of contacts in the second direction opposite the first direction, however, the fifth criteria and the sixth criteria different in terms of their requirements for various characteristics of the movements (e.g., speed, distance, position, acceleration, or combinations of two or more of the above, etc.). In some embodiments, the movement that ultimately meets the sixth criteria and triggers display of the home screen user interface may have met the requirements of the fifth criteria earlier, and would have led to the display of the application selection user interface rather than the home screen if it had been terminated earlier. Similarly, in some embodiments, the movement that ultimately meets the fifth criteria and leads to the display of the application selection user interface may have met the fifth criteria earlier, and would have led to the display of the home screen user interface rather than the application selection user interface if it had been terminated earlier.

Displaying different user interfaces in response gestures of a preset number of contacts in different directions provides additional control options for displaying the different user interfaces without a need for displaying user interface controls for the different user interfaces. Providing additional control options without cluttering the user interface with additional displayed controls enhances the operability of the device, which, additionally, reduces power usage and improves battery life of the device by enabling the user to use the device more quickly and efficiently.

In some embodiments, in response to detecting the first touch gesture and in accordance with a determination that the first touch gesture meets eighth criteria, where the eighth criteria include a eighth requirement that is met in accordance with a determination that the first touch gesture includes eighth movement of the preset number of concurrently detected contacts across the touch-sensitive surface in a third direction (e.g., substantially perpendicular to the first direction, a left to right swipe or a right to left swipe), different from the first direction and the second direction (e.g., substantially perpendicular to the first direction and the second direction), the device replaces (6036) display the user interface of the first application with a second user interface. This is illustrated, for example, in FIGS. 5AS-5AT, where the device displays switches from displaying an user interface of a first application (e.g., photos user interface in FIG. 5AS) to displays a user interface of a second application that is different from the first application (e.g., web browser user interface in FIG. 5AT). The second user interface is a user interface of a recently open application (e.g., the last displayed user interface of a second application distinct from the first application that provided the first user interface). In some embodiments, the first user interface is a home screen user interface when the first touch gesture that meets the eighth criteria is detected and the device navigates from the home screen user interface to the last displayed user interface of a last displayed application in response to the first touch input that meets the eighth criteria.

Switching between user interfaces of different recently open applications by touch gestures reduces a number of inputs needed for displaying the user interfaces of different recently open applications (e.g., without a need of closing a currently displayed application user interface and opening a recently open application user interface). Reducing the number of inputs needed to perform an operation enhances the operability of the device, which, additionally, reduces power usage and improves battery life of the device by enabling the user to use the device more quickly and efficiently.

In some embodiments, in response to detecting the first touch gesture and in accordance with a determination that the first touch gesture meets ninth criteria, where the ninth criteria includes a ninth requirement that is met in accordance with a determination that the first touch gesture includes ninth movement of the first contact in the first direction that begins in a third interior portion of the touch-sensitive surface that is outside of the first portion and the second portion of the first edge and positioned away from the first edge (e.g., separated from the first edge by one or more other input regions on the touch-sensitive surface (e.g., one or more edge input regions, and/or one or more interior input regions, etc.)) (and, optionally, separate from other edges of the touch-sensitive surface) and a determination that the first user interface is a wake screen user interface or a cover screen user interface, the device replaces (6038) the at least a portion of the first user interface with the first search input region on the display region provided by the display generation component. These features are illustrated, for example, in FIGS. 5X-5Y, where the device replaces the cover sheet user interface (e.g., user interface 5050) with the search user interface (e.g., user interface 5006) in response to detecting a downward swipe gesture that begins from the middle portion of touch screen 112 (e.g., corresponding to movement 5055 of contact 5054). In some embodiments, the touch gesture that causes display of the wake screen user interface and/or the cover screen user interface is a touch-gesture that meets the first criteria or the second criteria, and in such scenarios, the first search user interface including the first search input region is displayed in response to a touch gesture that meets the ninth criteria, but is not displayed in response to touch gestures that meet the first criteria or the second criteria if touch gestures were detected while user interfaces other than the wake screen or cover screen user interface were displayed (e.g., home screen user interface, application user interface, widget screen, application library, etc.).

Displaying a user interface with a search input region or a user interface with a plurality of previously received notifications in response to a touch gesture received while displaying a wake screen user interface provides ways of displaying the user interfaces with a reduced number of inputs (e.g., without a need of closing the displayed wake screen user interface and opening a home screen before providing the touch gesture for displaying the user interfaces). Reducing the number of inputs needed to perform an operation enhances the operability of the device, which, additionally, reduces power usage and improves battery life of the device by enabling the user to use the device more quickly and efficiently.

In some embodiments, the first user interface includes (6040) a plurality of notifications (e.g., notification center user interface 5020 includes regions 5020-1 to 5020-5 corresponding to notifications in FIG. 5H) (e.g., arranged in a longitudinal list that extends beyond the display region provided by the display generation component (e.g., the list includes previously received notifications arranged sequential in accordance with times when notifications were received, alphabetical order, type of notification, etc.), and/or in a scrollable window, etc.) (e.g., the plurality of notifications is already displayed before the detection of the first touch gesture, and/or in response to an initial portion of the first touch gesture, etc.). In response to detecting the first touch gesture and in accordance with a determination that the first touch gesture includes tenth movement of the first contact (e.g., in the first direction, first in the second direction and then in the first direction, etc.) across the touch-sensitive surface and the tenth movement begins in a fourth interior portion of the touch-sensitive surface, in accordance with a determination that an end of the plurality of notifications has been reached in the display region provided by the display generation component in accordance with a movement direction of the tenth movement of the first contact, the device replaces (6040) display of the at least a portion of the first user interface with the first search input region. In accordance with a determination that the end of the plurality of notifications has not been reached in the display region provided by the display generation component in accordance with the movement direction of the tenth movement of the first contact, the device scrolls the plurality of notifications in accordance with the tenth movement of the first contact. These features are illustrated, for example, in FIGS. 5K-5N, describing features of notification center user interface 5020. The wake screen user interface (e.g., user interface 5042 in FIG. 5U and cover sheet user interface 5050 in FIG. 5X) have the same features as those described with respect to the notification user interface in FIGS. 5K-5N. In FIGS. 5K-5L, the device scrolls, in response to a downward swipe gesture beginning from the interior portion of touch screen 112 (e.g., corresponding to movement 5029 of contact 5028), and in accordance with a determination that a list of notifications has not reached an end of the list (e.g., region 5020-5 corresponding to the top-most notification in the list of notification) is not fully displayed, scrolling the list of notifications downwards thereby shifting the list of notifications downward (e.g., FIG. 5L displays region 5020-5 fully). In FIGS. 5M-5N, the device replaces the notification center user interface (e.g., user interface 5020), in response to a downward swipe gesture beginning from the interior portion of touch screen 112 (e.g., corresponding to movement 5031 of contact 5030) and in accordance that the list of notifications has reached the end (e.g., region 5020-5 is fully displayed), with the search user interface (e.g., user interface 5006).

Scrolling an arrangement (e.g., a list) including a plurality of notifications or displaying a search input region in accordance of a determination that an end of the arrangement including the plurality of notifications has or has not been reached provides additional control options for navigating through the user interface including plurality of notifications and the user interface with the search input region without a need for displaying user interface controls for these user interfaces. Providing additional control options without cluttering the user interface with additional displayed controls enhances the operability of the device, which, additionally, reduces power usage and improves battery life of the device by enabling the user to use the device more quickly and efficiently In some embodiments, while displaying the first user interface, the device detects (6042) a second touch gesture that includes movement of a second set of contacts on the touch-sensitive surface (e.g., a tap gesture, a touch and hold gesture, a swipe gesture, a multi-finger pinch gesture, a multi-finger swipe gesture, a fluid gesture that includes multiple types of movements (e.g., movement in two or more directions, pinch movement, expansion movements, pivot movements, etc.) of one or more concurrently detected contacts, etc. by one or more contacts provided by one or more fingers or styluses). In response to detecting the second touch gesture and in accordance with a determination that the second touch gesture meets eleventh criteria, where the eleventh criteria include eleventh requirement that is met in accordance with a determination that the second touch gesture includes eleventh movement of a second contact across a second edge, distinct from the first edge, of the touch-sensitive surface, replace display of the first user interface with a second user interface distinct from the first user interface. These features are illustrated, for example, in FIGS. 5AB-5AG, where the device navigates from an application user interface to a multitasking user interface, the home screen user interface, or another application user interface depending on a direction of a respective gesture. For example, as shown in FIGS. 5AB-5AD in response to an upward swipe gesture beginning from the bottom edge of touch screen 112 and having a first set of features (e.g., corresponding to movement 5059 of contact 5058 in FIG. 5AB), the device replaces email user interface 5036 with multitasking user interface. As shown in FIGS. 5AB-5AE, in response to an upward swipe gesture (e.g., corresponding to movement 5059-1 of contact 5058) that also begins from the bottom edge of touch screen 112 (e.g., contact 5058 in FIG. 5AB) but includes a second set of features (e.g., acceleration, speed, pressure, or corresponding to a different distance) different from the first set of features of the swipe gesture corresponding to movement 5059 of contact 5058, the device replaces email user interface 5036 with home screen user interface 5002. Furthermore, as shown in FIG. 5AF-5AG, in response to a swipe gesture including an upward portion and a sideway portion (e.g., left to right swipe corresponding to movement 5059-2 of contact 5058), the device replaces email user interface 5036 with another application user interface (e.g., web browser user interface 5060-1 in FIG. 5AG). In some embodiments, the second user interface is a home screen user interface (e.g., the first user interface is an application user interface of a first application, a cover screen user interface, a wake screen user interface, a widget screen user interface, a system-arranged application library user interface, etc.). In some embodiments, second user interface is an application selection user interface (e.g., the first user interface is an application user interface of a first application, a cover screen user interface, a wake screen user interface, a widget screen user interface, a system-arranged application library user interface, a home screen user interface, etc.). In some embodiments, second user interface is a user interface of a second application (e.g., the first user interface is an application user interface of a first application, a cover screen user interface, a wake screen user interface, a widget screen user interface, a system-arranged application library user interface, a home screen user interface, an application selection user interface, etc.). In some embodiments, second user interface is another user interface within the same currently displayed application (e.g., a previously displayed user interface within the same application). In some embodiments, each edge of the touch-sensitive surface other than the first edge is associated with a corresponding function, respectively selected from the above (e.g., navigating to the home screen, navigating to another application, displaying the wake screen user interface, bringing on the cover screen user interface, navigating to the widget screen, navigating to the system-arranged home screen, navigating to a different page of the home screen, navigating to a different user interface of the currently displayed application, etc.), and the device determines which function to execute based on which edge the touch input crosses and in which direction. In some embodiments, the widget screen also includes the same first search input region.

Displaying a user interface with a search input region in accordance with a determination that a touch gesture includes movement across a first portion of an edge of a touch-sensitive surface, displaying a user interface with a plurality of previously received notifications in accordance with a determination that the touch gesture includes movement across a second portion of the edge of the touch-sensitive surface, and displaying a different user interface in accordance with determination that a touch gesture includes movement across another edge of a touch-sensitive surface provides additional control options for navigating through the user interfaces without a need for displaying user interface controls for these user interfaces. Providing additional control options without cluttering the user interface with additional displayed controls enhances the operability of the device, which, additionally, reduces power usage and improves battery life of the device by enabling the user to use the device more quickly and efficiently.

In some embodiments, while displaying a second user interface (e.g., same as the first user interface, or different from the first user interface), the device detects (6044) a third touch gesture (e.g., different from the first touch gesture) that includes detecting a third set of contacts on the touch-sensitive surface (e.g., a tap gesture, a touch and hold gesture, a swipe gesture, a multi-finger pinch gesture, a multi-finger swipe gesture, a fluid gesture that includes multiple types of movements (e.g., movement in two or more directions, pinch movement, expansion movements, pivot movements, etc.) of one or more concurrently detected contacts, etc. by one or more contacts provided by one or more fingers or styluses). In response to detecting the third touch gesture and in accordance with a determination that the third touch gesture meets either the first criteria, or additional preset criteria different from the first criteria (e.g., the third criteria, the fifth criteria, the nineth criteria, other criteria, etc.), replace at least a portion of the second user interface with the first search user interface in the display region. For example, in some embodiments, the same search interface is invoked with any of multiple gestures (e.g., swipe down from top edge of touch screen, swipe up anywhere on the interior of the wake screen, and/or multi-finger downward swipe anywhere in the interior of the touch-screen, etc.) in a variety of contexts. These features are illustrated, for example, in FIGS. 5A-5C, 5Z-5AA, and 5AM-5AN (e.g., the search user interface is invoked while displaying the home screen user interface), FIG. 5M-5N (e.g., the search user interface is invoked while displaying the notification center user interface), FIGS. 5R-5S and 5AU-5AX (e.g., the search user interface is invoked while displaying an application user interface), and FIGS. 5V-5Z (e.g., the search user interface is invoked while displaying a wake screen or cover sheet user interface).

Displaying a user interface with a search input region in accordance with a determination that a touch gesture includes movement across a first portion of an edge of a touch-sensitive surface or in accordance with a determination that a touch gesture meets some other preset criteria provides additional control options for displaying the user interface with the search input region without a need for displaying a user interface control for this user interface. Providing additional control options without cluttering the user interface with additional displayed controls enhances the operability of the device, which, additionally, reduces power usage and improves battery life of the device by enabling the user to use the device more quickly and efficiently.

Method 6100 is performed at an electronic device that is in communication with a display generation component (e.g., a touch-screen display, a projector, a standalone display, a heads-up display, a head-mounted display, etc.) and one or more input devices (e.g., a mouse based input or a stylus input).

In method 6100, the device displays (6102), via the display generation component, a first user interface (e.g., a wake screen user interface, a cover sheet user interface, etc.)(e.g., wake screen user interface 5042 in FIG. 5V or cover sheet user interface 5050 in FIG. 5X having a similar appearance and features as described with respect to notification center user interface in FIGS. 5H-5N). The first user interface includes a first plurality of notifications (e.g., a subset, less than all, of the notifications) in a list of notifications (e.g., regions 5020-1 to 5020-5 illustrated in FIG. 5H). In some embodiments, the first user interface is a wake screen user interface that is the initial user interface that is displayed when the electronic device transitions from a display-off state or a low power always-on state to a normal operational state. In some embodiments, the wake screen user interface is initially displayed in a locked state, and transitions into an unlocked state when authentication has been completed (e.g., through fingerprint sensor, retina scanner, facial recognition, voice authentication, password entry, etc.). In some embodiments, the wake screen user interface is a lock screen user interface. In some embodiments, the first user interface is a coversheet user interface that is displayed in response to a user input that corresponds to a request to cover a currently displayed user interface in a variety of contexts (e.g., when the home screen is displayed, when an application user interface is displayed, when a control center user interface is displayed, when a settings user interface is displayed, etc.). In some embodiments, the cover sheet user interface is not a lock screen, and is dismissed without requiring reentry of the authentication information; and once the cover sheet user interface is dismissed in response to preset user input, the previously displayed user interface (the user interface that was "covered" by the coversheet user interface) is restored. In some embodiments, the wake screen user interface and the coversheet user interface have the same or analogous appearance, e.g., both including a time element showing the current time and optionally date, both sharing the same background image, and/or providing similar functions (e.g., displaying unread or saved notifications, navigating to the same user interfaces in response to preset gestures, etc.). In some embodiments, the first user interface is not the home screen user interface, an application user interface, or a control panel user interface. While displaying the first user interface, the device detects (6104) a first user input that includes a first input (e.g., contact 5026 in FIG. 5I) (e.g., the first input is a swipe input of a first contact (e.g., one contact, two simultaneously detected contacts, etc.) moving across the touch sensitive surface) (e.g., a movement of a contact from a middle region of the user interface toward an edge of the first user interface, a movement of a contact that is detected at (e.g., touched down at, passes through, etc.) a position on the touch-sensitive surface that is away from the edge region of the touch-sensitive surface, and that corresponds to a location of the first plurality of notifications displayed on the display, etc.). In response to detecting the first user input (6106), in accordance with a determination that the first input includes a swipe input in a first direction (e.g., a direction toward the top edge of the touch-sensitive surface, a direction toward a bottom edge of the touch-sensitive surface, a direction that corresponds to a scroll direction of the list of notifications, etc.) and a determination that an end of the list of notifications (e.g., the top of the list, the bottom of the list, either the top or the bottom of the list, only the top of the list, only the bottom of the list, etc.) has been reached (e.g., an end that is reached when scrolling the notifications in the first direction), the device displays (6108) a search input region (e.g., a search input region for receiving a textual search query entered by the user, which causes return of search results that correspond to the search query and which are identified from multiple sources (e.g., applications, text messages, emails, images, webpages, address book, etc.)). In some embodiments, displaying the search input region includes replacing display of the first user interface with display of a first search user interface in a display region provided by the display generation component. In some embodiments, displaying the search input region includes displaying a first search input region in the first user interface, without replacing the entirety of the first user interface. In some embodiments, the search input region is configured to receive search inputs (e.g., textual search criteria, search keywords, image-based search criteria, etc.), and cause return of search results that correspond to search criteria received in the search input region (e.g., representations for applications, messages, emails, webpages, images, photos, etc.). This is illustrated, for example, in FIGS. 5M-5N, where the device replaces the notification center user interface (e.g., user interface 5020) with the search user interface (e.g., user interface 5006), in response to detecting a downward swipe gesture beginning from the middle portion of touch screen 112 (e.g., corresponding to movement 5031 of contact 5030) and in accordance with a determination that the end of the list of notifications has been reached (e.g., the top most region 5020-5 of notifications is fully displayed in FIG. 5M). In accordance with a determination that the first input includes the swipe input in the first direction and that an end of the list of notifications (e.g., neither of the top of the list nor the bottom of the list, the top of the list, the bottom of the list, etc.) has not been reached (e.g., an end that is reached when scrolling the notifications in the first direction), the device displays (6110) a second plurality of notifications that are between the first plurality of notifications and the end of the list of notifications (e.g. the second plurality of notifications is scrolled into view on the first user interface in response to the swipe input in the first direction, while some or all of the plurality of notifications that were initially displayed are scrolled out of view on the first user interface) (e.g., the list of notifications is ordered in accordance with a time respective notifications are received and is scrollable in a direction that corresponds to the first direction of the swipe input). This is illustrated, for example, in FIGS. 5K-5L, where the device scrolls the list of notifications downwards, in response to detecting a downward swipe gesture beginning from the middle portion of touch screen 112 (e.g., corresponding to movement 5029 of contact 5028) and in accordance with a determination that the end of the list of notifications has not been reached (e.g., the top most region 5020-5 of notifications is not fully displayed in FIG. 5K). In some embodiments, a single continuous swipe input causes the device to scroll the notifications in the list of notifications until the end of the list of notifications is displayed, and then causes display of the search input region. In some embodiments, at least some of the notifications from the list of notifications are concurrently visible on the first user interface as the search input region. In some embodiments, the notifications from the list of notifications cease to be displayed or are pushed into a background layer when the search input region is displayed.

In response to detecting a user input while displaying a user interface including a first plurality of notifications in a list of notifications, displaying a user interface including a search input region in accordance with a determination that the user input is detected while displaying an end of the list of notifications or displaying a second plurality of notifications in accordance with a determination that the user input is detected while not displaying the end of the list of notifications provides additional control options for displaying user interfaces without a need for displaying user interface controls. Providing additional control options without cluttering the user interface with additional displayed controls enhances the operability of the device, which, additionally, reduces power usage and improves battery life of the device by enabling the user to use the device more quickly and efficiently.

In some embodiments, in response to detecting the first user input and in accordance with a determination that the first input includes a swipe input in a second direction that is different from (e.g., opposite to, perpendicular to, at more than a threshold angle relative to, etc.) the first direction, the device displays (6112) a plurality of previously received notifications in the first user interface. The plurality of previously received notification include notifications that are not in the first plurality of notifications in the list of notifications (e.g., the previously received notifications are different from the second plurality of notifications) (e.g., the previously received notifications correspond to notifications received prior to the plurality of notifications and the second plurality of notifications) (e.g., the previously received notifications are not between the plurality of notifications and the end of the list of notifications). These features are illustrated, for example, in FIGS. 5I-5J, where the device scrolls the list of notifications upwards in response to an upward swipe gesture (e.g., movement 5027 of contact 5026). As shown, in FIG. 5I the device displays a first portion of the list of notification (e.g., regions 5020-1 to 5020-5) prior to detecting the swipe gesture and in FIG. 5J the device displays, in addition to the first portion of the list of notifications, a second portion of the list of notifications (e.g., regions 5020-6 and 5020-7). In some embodiments, the plurality of previously received notifications are stored in a notification history, and the list of notifications are unread notifications that have not been stored in the notification history. In some embodiments, the plurality of previously received notifications are displayed in the first user interface in accordance with a determination that the swipe input is in the second direction that is different from the first direction and a determination that an end of the list of the notifications has been reached. For example, in some embodiments, the list of notifications are unread notifications that are displayed in the first user interface, and the plurality of notifications from the list of notifications can be scrolled in response to an upward swipe input on the plurality of notifications. In response to the upward swipe input, the list of notifications is scrolled upward revealing second plurality of notifications in the list of notifications; and when the end of the list is reached, notification history is displayed on the first user interface. In response to a downward swipe input, the list of notifications is scrolled downward redisplaying the plurality of notifications that had been scrolled out of view earlier by the upward swipe input.

In response to the downward swipe input, when the end of the list of notifications is reached, the search input region is displayed.

Displaying a plurality of previously received notifications in accordance with a determination that the user input includes a swipe input in a different direction than the direction of a swipe input for displaying a user interface including a search input region or displaying a plurality of notifications, different from the previously received notifications, provides additional control options for displaying user interfaces without a need for displaying user interface controls. Providing additional control options without cluttering the user interface with additional displayed controls enhances the operability of the device, which, additionally, reduces power usage and improves battery life of the device by enabling the user to use the device more quickly and efficiently.

In some embodiments, the first user interface is (6114) a wake screen user interface (e.g., wake screen user interface 5042 in FIGS. 5U-5V) that is displayed in response to detecting a request to wake the display generation component from a low power mode (e.g., low power mode 5040 in FIG. 5T) (e.g., a low power always-on mode, a display-off mode, a power-saving sleep mode, etc.). In some embodiments, the wake screen user interface is initially displayed in a locked state, and later transitions into an unlocked state after authentication information has been obtained (e.g., through passcode entry, or biometric information verification such as face, iris, or fingerprint biometric verification). In some embodiments, the wake screen user interface includes for a visual prompt for the user to unlock the device when the device is locked. In some embodiments, the wake screen user interface includes user interface objects that correspond to device functions, such as a flashlight, a camera, etc., and/or user interface objects indicating the locked/unlocked state of the device, etc.

Displaying a user interface including a search input region or displaying a second plurality of notifications in response to detecting a user input while displaying a wake screen user interface provides ways of displaying the used user interfaces with a reduced number of inputs (e.g., without a need of closing the displayed wake screen user interface and opening a home screen before providing the user input for displaying the user interface including the search input region or the second plurality of notifications). Reducing the number of inputs needed to perform an operation enhances the operability of the device, which, additionally, reduces power usage and improves battery life of the device by enabling the user to use the device more quickly and efficiently.

In some embodiments, the wake screen user interface includes (6116) a first region that displays notifications (e.g., newly received notifications, unread notifications, notifications that have not been disposed of by the user, etc.), including the first plurality of notifications (e.g., notification 5044 in FIG. 5V includes a newly received notification). In some embodiments, the first region of the wake screen displays one or more notifications at a time when the one or more notifications are newly received (and, optionally, while the notifications maintains the unread status in the always-on lower power mode) and when the display generation component is woken from the low power mode and enters the normal operational mode. In some embodiments, the notifications are associated with applications (e.g., email, messages, news, etc.). In some embodiments, when a small number of notifications are received, all of the notifications are concurrently displayed in the first region. In some embodiments, when a greater number of notifications accumulate without being disposed of, the newest notifications are displayed in the first region, while earlier undisposed notifications are pushed out of the first region while remaining in the list of notifications that is scrollable back into the first region by the user's swipe input.

Displaying notifications while displaying a wake screen user interface provides ways for displaying the notifications with a reduced number of inputs (e.g., without a need for providing an additional user input for displaying notifications). Reducing the number of inputs needed to perform an operation enhances the operability of the device, which, additionally, reduces power usage and improves battery life of the device by enabling the user to use the device more quickly and efficiently.

In some embodiments, the wake screen user interface includes (6118) a second region that displays stored notification history (e.g., wake screen user interface 5042 includes a portion displaying notification center user interface 5020 including regions 5020-4 and 5020-5 in FIG. 5V) (e.g., previously received notifications that have been automatically stored into notification history without user interaction, previously received notifications that are stored in accordance with user's interaction with the notifications when the notification was first received, etc.). In some embodiments, the first region and the second region are a same region. In some embodiments, the first region and the second region are operationally adjacent to each other (e.g., the second region is next to the first region and there is no visible region between the first region and the second region). In some embodiments, the list of notifications includes the stored notification history. In some embodiments, the second region of the wake screen overlap with the first region of the wake screen that displays one or more notifications at a time when the one or more notifications are newly received (and, optionally, while the notifications maintains the unread status in the always-on lower power mode) and when the display generation component is woken from the low power mode and enters the normal operational mode. In some embodiments, the second region replaces the first region on the display, when the stored notification history is displayed. In some embodiments, the stored notification history is displayed on the wake screen user interface in response to a request for displaying the wake screen user interface. In some embodiments, the stored notification history is displayed on the wake screen user interface in response to a request for displaying the store notification history that is received while the wake screen user interface is displayed.

Displaying stored notification history while displaying a wake screen user interface provides ways for displaying the notifications with a reduced number of inputs (e.g., without a need for providing an additional user input for displaying the stored notification history). Reducing the number of inputs needed to perform an operation enhances the operability of the device, which, additionally, reduces power usage and improves battery life of the device by enabling the user to use the device more quickly and efficiently.

In some embodiments, the wake screen user interface includes (6120) a user interface object that displays a current time (e.g., time element 5024 in FIG. 5V). In some embodiments, the user interface object also displays a current date. The user interface object continues to be updated as the current time changes.

Displaying a user interface object that displays a current time while displaying a wake screen user interface provides ways of displaying the user interface object that displays the current time with a reduced number of inputs (e.g., without a need for providing an additional user input for displaying the current time). Reducing the number of inputs needed to perform an operation enhances the operability of the device, which, additionally, reduces power usage and improves battery life of the device by enabling the user to use the device more quickly and efficiently.

In some embodiments, in response to detecting the first user input (e.g., in accordance with a determination that the first swipe input is in the first direction and, optionally, in accordance with a determination that the end of the list of notifications has been reached), the device ceases (6122) to display one or more user interface objects of the wake screen user interface (e.g., ceasing to display the element displaying the current date and the current time, the flashlight affordance, and/or the affordance for prompting to unlock the device) (e.g., ceasing to display some, less than all, of the wake screen elements). This feature is illustrated, for example, in FIGS. 5I-5J, where the device ceases to display time element 5024 when scrolling of the notification center user interface (e.g., user interface 5020) upwards. The wake screen user interface has similar features as the notification center user interface. In some embodiments, in response to the first user input, the notifications (e.g., notification in the list of notifications, notifications in the notification history, etc.) on the wake screen user interface is scrolled, and some of the user interface objects of the wake screen user interface move in concert with the notifications across the display in the direction of the scroll movement. For example, in some embodiments, as unread notifications, and/or notification history is scrolled upward in response to an upward swipe input on the touch screen, currently displayed portions of the unread notifications and/or notification history moves upward to reveal additional notifications that were previously hidden on the display; and along with the upward movement of the notifications, the user interface objects showing the current time and/or date, the indication of the locked/unlocked state of the device, etc. on the wake screen user interface also move upward, and may cease to be displayed when reaching beyond the top of the display.

Ceasing to display one or more user interface objects of the wake screen user interface in response to detecting a user input for displaying a user interface with a search input region or displaying a second plurality of notifications provides ways for reducing a number of inputs (e.g., without a need for providing an additional user input for ceasing to display the one or more user interface objects while making space for displaying the user interface with the search input region or the second plurality of notifications). Reducing the number of inputs needed to perform an operation enhances the operability of the device, which, additionally, reduces power usage and improves battery life of the device by enabling the user to use the device more quickly and efficiently.

In some embodiments, in response to detecting the first user input and in accordance with the determination that the first input includes the swipe input in the first direction and that the end of the list of notifications has not been reached, the device ceases (6124) to display one or more notifications of the first plurality of notification in the list of notifications. This feature is illustrated, for example, in FIGS. 5M-5N, where the device ceases to display the list of notifications when replacing the notification center user interface with the search user interface. For example, in some embodiments, the list of notifications is a scrollable list that is scrolled in accordance with the first direction, and some of the plurality of notifications that are previously visible in the first region are scrolled out of the first region and cease to be displayed in the first user interface.

Ceasing to display first plurality of notification in the list of notifications in response to detecting a user input for displaying a second plurality of notifications provides ways of reducing a number of inputs (e.g., scrolling through a list of notifications rather than closing and opening different portions of the list of notifications). Reducing the number of inputs needed to perform an operation enhances the operability of the device, which, additionally, reduces power usage and improves battery life of the device by enabling the user to use the device more quickly and efficiently.

In some embodiments, in response to detecting the first user input and in accordance with the determination that the first input includes the swipe input in the first direction and that the end of the list of notifications has been reached, the device displays (6126), concurrently with displaying the search input region, a keyboard (e.g., keyboard in FIG. 5I1) for entering search input into the search input region (e.g., the search input region is displayed in a first portion of the display region provided by the display generation component (e.g., the top portion) and the keyboard is displayed in a second portion of display region provided by the display generation component (e.g., the bottom portion). In some embodiments, the keyboard slides into the display region provided by the display generation component during the portion of the swipe input in the first direction after the end of the list of notification has been reached. In some embodiments, in response to detecting activation of keys in the keyboard, the device displays characters corresponding to the activated keys in the search input region; and correspondingly, displays search results and/or suggested searches corresponding to the search criteria comprising the input characters.

Displaying a keyboard in response to a user input for displaying a user interface with a search input region provides ways of reducing a number of inputs (e.g., without a need for providing an additional user input for opening the keyboard). Reducing the number of inputs needed to perform an operation enhances the operability of the device, which, additionally, reduces power usage and improves battery life of the device by enabling the user to use the device more quickly and efficiently.

In some embodiments, in response to detecting the first user input and in accordance with the determination that the first input includes the swipe input in the first direction and that the end of the list of notifications has been reached, the device displays (6128), concurrently with displaying the search input region, one or more suggested searches (e.g., region 5006-1 including suggested actions and region 5006-2 including suggested applications in FIG. 5C)(e.g., the search input region is displayed in a first portion of the display generation component (e.g., the top portion) and the one or more suggested search criteria are displayed in a second portion of the display generation component (e.g., the bottom portion). For example, the suggested searches include search criteria that are automatically generated based on the user's search history, popular searches, content, contacts, and/or applications on the device, and/or the partial input that has been entered in the search input region by the user. In some embodiments, the suggested searches are textual keywords, images, and/or photos, etc. that are selectable by the user, and cause return of search results that correspond to the selected textual keywords, image, and/or photo.

Displaying one or more suggested searches in response to a user input for displaying a user interface with a search input region provides ways of reducing a number of inputs (e.g., without a need for providing an additional user input for displaying the one or more suggested searches). Reducing the number of inputs needed to perform an operation enhances the operability of the device, which, additionally, reduces power usage and improves battery life of the device by enabling the user to use the device more quickly and efficiently.

In some embodiments, the device detects (6130) (e.g., after the plurality of notifications has been scrolled in response to the first swipe input and/or an earlier swipe input in the second direction preceding the first swipe input) a second user input that includes a second input (e.g., the second input is a swipe input of a second contact (e.g., one contact, two simultaneously detected contacts, etc.)) moving across the touch-sensitive surface (e.g., a movement of a contact from a middle region of the user interface toward an edge of the first user interface, a movement of a contact that is detected at (e.g., touched down at, passes through, etc.) a position on the touch-sensitive surface that is away from the edge region of the touch-sensitive surface, and that corresponds to a location of the plurality of notifications displayed on the display, etc.). In some embodiments, the second contact is the same contact as the first contact (e.g., a continuously maintained contact throughout the movement of the first swipe input and the second swipe input). In some embodiments, the first contact and the second contact are distinct contacts that are separately by liftoff of the first contact and touch down of the second contact. In response to detecting the second user input and in accordance with a determination that the second input includes a swipe input in a second direction that is different from (e.g., opposite to, perpendicular to, at more than a threshold angle relative to, etc.) the first direction, scroll through notifications in the list of notifications in accordance with the movement of the second contact in the second direction. These features are illustrated, for example, in FIGS. 5I-5J, where the device scrolls the list of notifications in response to an upward swipe gesture (e.g., corresponding to movement 5027 of contact 5026). In some embodiments, if the second swipe input is detected while the notification history including a plurality of previously received notifications is displayed in the first user interface, the notifications in the notification history is scrolled in according with the second swipe input.

Scrolling through notifications in a list of notifications in accordance with a movement of a contact provides ways of reducing a number of inputs (e.g., scrolling through a list of notifications without a need of closing and opening different portions of the list of notifications). Reducing the number of inputs needed to perform an operation enhances the operability of the device, which, additionally, reduces power usage and improves battery life of the device by enabling the user to use the device more quickly and efficiently.

In some embodiments, the second user input (e.g., movement 5027 of contact 5026 in FIGS. 5I-5J) is (6132) detected after detection of the first user input, and while the search input region is displayed as a result of the first user input. For example, in some embodiments, after the notifications have been scrolled in the first direction and the search input region is displayed as a result of the end of the list of notification having been reached, the device ceases to display the search input region and redisplay the notifications and scrolls the notifications in the second direction, in response to the second user input in the second direction.

Scrolling through notifications in a list of notifications in response to a user input detected while displaying a user interface with a search input region provides ways of reducing a number of inputs (e.g., scrolling through a list of notifications without a need of providing an additional user input for closing the user interface with the search input region). Reducing the number of inputs needed to perform an operation enhances the operability of the device, which, additionally, reduces power usage and improves battery life of the device by enabling the user to use the device more quickly and efficiently.

In some embodiments, prior to detecting the first user input, the device detects (6134) a third user input that includes a third input (e.g., the third input is a swipe input of a third contact (e.g., one contact, two simultaneously detected contacts, etc.)) moving across the touch-sensitive surface (e.g., a movement of a contact from a middle region of the user interface toward an edge of the first user interface, a movement of a contact that is detected at (e.g., touched down at, passes through, etc.) a position on the touch-sensitive surface that is away from the edge region of the touch-sensitive surface, and that corresponds to a location of the plurality of notifications displayed on the display, etc.). In response to detecting the third user input, in accordance with a determination that the third input includes a swipe input in a second direction that is different from (e.g., opposite to, perpendicular to, at more than a threshold angle relative to, etc.) the second direction, scroll through the list of notifications in accordance with the second direction to reveal the first plurality of notifications in the first user interface. These features are illustrated, for example, in FIGS. 5K-5L, where the device scrolls the list of notifications in response to a downward swipe gesture (e.g., corresponding to movement 5027 of contact 5026).

Scrolling through notifications in a list of notifications in accordance with a movement of a contact provides ways for reducing a number of inputs (e.g., scrolling through a list of notifications without a need for closing and opening different portions of the list of notifications). Reducing the number of inputs needed to perform an operation enhances the operability of the device, which, additionally, reduces power usage and improves battery life of the device by enabling the user to use the device more quickly and efficiently.

In some embodiments, while the second plurality of notifications is displayed (e.g., without displaying the search user interface), the device detects (6136) a fourth user input that includes a fourth input (e.g., the fourth input is a swipe input of a fourth contact (e.g., one contact, two simultaneously detected contacts, etc.)) moving across the touch-sensitive surface. In response to detecting the fourth user input and in accordance with a determination that the fourth input includes a swipe input in the first direction (e.g., a direction toward the top edge of the touch-sensitive surface, a direction toward a bottom edge of the touch-sensitive surface, a direction that corresponds to a scroll direction of the list of notifications, etc.) and a determination that an end of the list of notifications (e.g., the top of the list, the bottom of the list, either the top or the bottom of the list, only the top of the list, only the bottom of the list, etc.) has been reached (e.g., an end that is reached when scrolling the notifications in the first direction), the device displays a search input region (e.g., a search input region for receiving a textual search query entered by the user, which causes return of search results that correspond to the search query and which are identified from multiple sources (e.g., applications, text messages, emails, images, webpages, address book, etc.)). These features are illustrated, for example, in FIGS. 5M-5N, where the device displays the search user interface in response to a downward swipe gesture and in accordance with a determination that the end of the list of notifications has been reached. The device performs this operation regardless of the currently displayed notifications. In some embodiments, displaying the search input region includes replacing display of the first user interface with display of a first search user interface in a display region provided by the display generation component. In some embodiments, displaying the search input region includes displaying a first search input region in the first user interface, without replacing the entirety of the first user interface. In some embodiments, the search input region is configured to receive search inputs (e.g., textual search criteria, search keywords, image-based search criteria, etc.), and cause return of search results that correspond to search criteria received in the search input region (e.g., representations for applications, messages, emails, webpages, images, photos, etc.). In accordance with a determination that the fourth input includes a swipe input in the first direction and that an end of the list of notifications (e.g., neither of the top of the list nor the bottom of the list, the top of the list, the bottom of the list, etc.) has not been reached (e.g., an end that is reached when scrolling the notifications in the first direction), the device displays a third plurality of notifications that are between the second plurality of notifications and the end of the list of notifications (e.g. the second plurality of notifications are scrolled into view on the first user interface in response to the swipe input in the first direction, while some or all of the plurality of notifications that were initially displayed are scrolled out of view on the first user interface) (e.g., the list of notifications is ordered in accordance with a time respective notifications are received and is scrollable in a direction that corresponds to the first direction of the swipe input). In some embodiments, a single continuous swipe input causes the device to scroll the notifications in the list of notifications until the end of the list of notifications is displayed, and then causes display of the search input region. In some embodiments, at least some of the notifications from the list of notifications are concurrently visible on the first user interface as the search input region. In some embodiments, the notifications from the list of notifications cease to be displayed or are pushed into a background layer when the search input region is displayed.

In response to detecting a user input while displaying a user interface including a second plurality of notifications in a list of notifications, displaying a user interface including a search input region in accordance with a determination that the user input is detected while displaying an end of the list of notifications or displaying a third plurality of notifications in accordance with a determination that the user input is detected while not displaying the end of the list of notifications provides additional control options for displaying user interfaces without a need for displaying user interface controls. Providing additional control options without cluttering the user interface with additional displayed controls enhances the operability of the device, which, additionally, reduces power usage and improves battery life of the device by enabling the user to use the device more quickly and efficiently.

It should be understood that the particular order in which the operations in FIGS. 6A-6J have been described is merely one example and is not intended to indicate that the described order is the only order in which the operations could be performed. One of ordinary skill in the art would recognize various ways to reorder the operations described herein. In some embodiments, one or more operations of method 6000 and method 6100 are combined, supplemented, or replaced with one or more operations of other methods described herein.

The operations described above with reference to FIGS. 6A-6J are, optionally, implemented by components depicted in FIGS. 1A-1B. For example, displaying operations 6002 and 6012 and the detecting operations 6004 and 6104, are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device 100) corresponds to a predefined event or sub-event, such as selection of an object on a user interface, or rotation of the device 100 from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

What is claimed is:

1. A method, comprising:
at an electronic device that is in communication with a display generation component and one or more input devices:
displaying, via the display generation component, a first user interface, the first user interface including a representation of a first plurality of notifications that correspond to notifications from a plurality of different applications;
while displaying the first user interface, detecting a first user input that includes a first input; and
in response to detecting the first user input:
in accordance with a determination that the first input includes a swipe input in a first direction across the first user interface that includes the representation of the first plurality of notifications that correspond to notifications from the plurality of different applications, displaying a search input region that enables searches across multiple applications; and
in accordance with a determination that the first input includes the swipe input in a second direction that is substantially opposite the first direction, displaying additional notification information including:
additional information for a notification from a first application of the plurality of different applications, and
additional information for a notification from a second application of the plurality of different applications, wherein the additional information for the notification from the first application and the additional information for the notification from the second application are scrollable in either the first direction or the second direction.

2. The method of claim 1, further including:
in response to detecting the first user input:
in accordance with a determination that the first input includes a swipe input in the second direction that is substantially opposite the first direction, displaying a plurality of previously received notifications in the first user interface, wherein the plurality of previously received notifications include notifications that are not in the first plurality of notifications.

3. The method of claim 1, wherein:
the first user interface is a wake screen user interface that is displayed in response to detecting a request to wake the display generation component from a low power mode.

4. The method of claim 3, wherein:
the wake screen user interface includes a first region that displays notifications, including the representation of the first plurality of notifications.

5. The method of claim 3, wherein:
the wake screen user interface includes a second region that displays stored notification history.

6. The method of claim 3, wherein:
the wake screen user interface includes a user interface object that displays a current time.

7. The method of claim 6, further including:
in response to detecting the first user input:
ceasing to display one or more user interface objects of the wake screen user interface.

8. The method of claim 1, further including:
in response to detecting the first user input:
in accordance with the determination that the first input includes the swipe input in the first direction and that an end of notification information including the first plurality of notifications has been reached, ceasing to display the notification information via the display generation component.

9. The method of claim 1, further including:
in response to detecting the first user input:
in accordance with the determination that the first input includes the swipe input in the first direction and that an end of notification information including the first plurality of notifications has been reached, displaying, concurrently with displaying the search input region, a keyboard for entering search input into the search input region.

10. The method of claim 1, further including:
in response to detecting the first user input:
in accordance with the determination that the first input includes the swipe input in the first direction and that an end of notification information including the first plurality of notifications has been reached, displaying, concurrently with displaying the search input region, one or more suggested searches.

11. The method of claim 1, further including:
detecting a second user input that includes a second input; and
in response to detecting the second user input:
in accordance with a determination that the second input includes a swipe input in the second direction that is substantially opposite the first direction, scrolling through notifications in a list of notifications including the first plurality of notifications in accordance with movement of the second input in the second direction.

12. The method of claim 1, wherein the first user input includes two or more consecutive swipe inputs in the first direction before the search input region is displayed as a result of the first user input.

13. The method of claim 1, including:
prior to detecting the first user input, detecting a third user input that includes a third input; and
in response to detecting the third user input, in accordance with a determination that the third input includes a swipe input in the second direction that is substantially opposite the first direction, scrolling through a list of notifications in accordance with the first direction to reveal the representation of the first plurality of notifications in the first user interface.

14. The method of claim 1, including, while the additional notification information is displayed, detecting a fourth user input that includes a fourth input; and
in response to detecting the fourth user input:
in accordance with a determination that the fourth input includes a swipe input in the first direction, displaying the search input region; and
in accordance with a determination that the fourth input includes a swipe input in the second direction that is substantially opposite the first direction, displaying a third plurality of notifications.

15. An electronic device, comprising:
a display generation component;
one or more input devices;
one or more processors;
memory; and
one or more programs, wherein the one or more programs are stored in the memory and configured to be executed by the one or more processors, the one or more programs including instructions for:
- displaying, via the display generation component, a first user interface, the first user interface including a representation of a first plurality of notifications that correspond to notifications from a plurality of different applications;
- while displaying the first user interface, detecting a first user input that includes a first input; and
- in response to detecting the first user input:
  - in accordance with a determination that the first input includes a swipe input in a first direction across the first user interface that includes the representation of the first plurality of notifications that correspond to notifications from the plurality of different applications, displaying a search input region that enables searches across multiple applications; and
  - in accordance with a determination that the first input includes the swipe input in a second direction that is substantially opposite the first direction, displaying additional notification information including:
    - additional information for a notification from a first application of the plurality of different applications, and
    - additional information for a notification from a second application of the plurality of different applications, wherein the additional information for the notification from the first application and the additional information of the notification from the second application are scrollable in either the first direction or the second direction.

16. The electronic device of claim 15, wherein the one or more programs further include instructions for:
in response to detecting the first user input:
in accordance with a determination that the first input includes a swipe input in the second direction that is substantially opposite the first direction, displaying a plurality of previously received notifications in the first user interface, wherein the plurality of previously received notifications include notifications that are not in the first plurality of notifications.

17. The electronic device of claim 15, wherein:
the first user interface is a wake screen user interface that is displayed in response to detecting a request to wake the display generation component from a low power mode.

18. The electronic device of claim 17, wherein:
the wake screen user interface includes a first region that displays notifications, including the representation of the first plurality of notifications.

19. The electronic device of claim 17, wherein:
the wake screen user interface includes a second region that displays stored notification history.

20. The electronic device of claim 17, wherein:
the wake screen user interface includes a user interface object that displays a current time.

21. The electronic device of claim 20, wherein the one or more programs further include instructions for:
in response to detecting the first user input:
ceasing to display one or more user interface objects of the wake screen user interface.

22. The electronic device of claim 15, wherein the one or more programs further include instructions for:
in response to detecting the first user input:
in accordance with the determination that the first input includes the swipe input in the first direction and that an end of notification information including the first plurality of notifications has been reached, ceasing to display the notification information via the display generation component.

23. The electronic device of claim 15, wherein the one or more programs further include instructions for:
in response to detecting the first user input:
in accordance with the determination that the first input includes the swipe input in the first direction and that an end of notification information including the first plurality of notifications has been reached, displaying, concurrently with displaying the search input region, a keyboard for entering search input into the search input region.

24. The electronic device of claim 15, wherein the one or more programs further include instructions for:
in response to detecting the first user input:
in accordance with the determination that the first input includes the swipe input in the first direction and that an end of notification information including the first plurality of notifications has been reached, displaying, concurrently with displaying the search input region, one or more suggested searches.

25. The electronic device of claim 15, wherein the one or more programs further include instructions for:
detecting a second user input that includes a second input; and
in response to detecting the second user input:
in accordance with a determination that the second input includes a swipe input in the second direction that is substantially opposite the first direction, scrolling through notifications in a list of notifications including the first plurality of notifications in accordance with movement of the second input in the second direction.

26. The electronic device of claim 15, wherein the first user input includes two or more consecutive swipe inputs in the first direction before the search input region is displayed as a result of the first user input.

27. The electronic device of claim 15, wherein the one or more programs further include instructions for:
prior to detecting the first user input, detecting a third user input that includes a third input; and
in response to detecting the third user input, in accordance with a determination that the third input includes a swipe input in the second direction that is substantially opposite the first direction, scrolling through a list of notifications in accordance with the first direction to reveal the representation of the first plurality of notifications in the first user interface.

28. The electronic device of claim 15, wherein the one or more programs further include instructions for:
while the additional notification information is displayed, detecting a fourth user input that includes a fourth input; and
in response to detecting the fourth user input:

in accordance with a determination that the fourth input includes a swipe input in the first direction, displaying the search input region; and in accordance with a determination that the fourth input includes a swipe input in the second direction that is substantially opposite the first direction, displaying a third plurality of notifications.

29. A non-transitory computer readable storage medium storing one or more programs, the one or more programs comprising instructions, which when executed by an electronic device with a display generation component and one or more input devices, cause the electronic device to:

display, via the display generation component, a first user interface, the first user interface including a representation of a first plurality of notifications that correspond to notifications from a plurality of different applications;

while displaying the first user interface, detect a first user input that includes a first input; and in response to detecting the first user input:

in accordance with a determination that the first input includes a swipe input in a first direction across the first user interface that includes the representation of the first plurality of notifications that correspond to notifications from the plurality of different applications, display a search input region that enables searches across multiple applications; and in accordance with a determination that the first input includes the swipe input in a second direction that is substantially opposite the first direction, display additional notification information including:

additional information for a notification from a first application of the plurality of different applications, and additional information for a notification from a second application of the plurality of different applications, wherein the additional information for the notification from the first application and the additional information for the notification from the second application are scrollable in either the first direction or the second direction.

30. The non-transitory computer readable storage medium of claim 29, wherein the one or more programs include instructions, which when executed by the electronic device, cause the electronic device to:

in response to detecting the first user input:

in accordance with a determination that the first input includes a swipe input in the second direction that is substantially opposite the first direction, display a plurality of previously received notifications in the first user interface, wherein the plurality of previously received notifications include notifications that are not in the first plurality of notifications.

31. The non-transitory computer readable storage medium of claim 29, wherein:

the first user interface is a wake screen user interface that is displayed in response to detecting a request to wake the display generation component from a low power mode.

32. The non-transitory computer readable storage medium of claim 31, wherein:

the wake screen user interface includes a first region that displays notifications, including the representation of the first plurality of notifications.

33. The non-transitory computer readable storage medium of claim 31, wherein:

the wake screen user interface includes a second region that displays stored notification history.

34. The non-transitory computer readable storage medium of claim 31, wherein:

the wake screen user interface includes a user interface object that displays a current time.

35. The non-transitory computer readable storage medium of claim 34, wherein the one or more programs include instructions, which when executed by the electronic device, cause the electronic device to:

in response to detecting the first user input:

cease to display one or more user interface objects of the wake screen user interface.

36. The non-transitory computer readable storage medium of claim 29, wherein the one or more programs include instructions, which when executed by the electronic device, cause the electronic device to:

in response to detecting the first user input:

in accordance with the determination that the first input includes the swipe input in the first direction and that an end of notification information including the first plurality of notifications has been reached, cease to display the notification information via the display generation component.

37. The non-transitory computer readable storage medium of claim 29, wherein the one or more programs include instructions, which when executed by the electronic device, cause the electronic device to:

in response to detecting the first user input:

in accordance with the determination that the first input includes the swipe input in the first direction and that an end of notification information including the first plurality of notifications has been reached, display, concurrently with displaying the search input region, a keyboard for entering search input into the search input region.

38. The non-transitory computer readable storage medium of claim 29, wherein the one or more programs include instructions, which when executed by the electronic device, cause the electronic device to:

in response to detecting the first user input:

in accordance with the determination that the first input includes the swipe input in the first direction and that an end of notification information including the first plurality of notifications has been reached, display, concurrently with displaying the search input region, one or more suggested searches.

39. The non-transitory computer readable storage medium of claim 29, wherein the one or more programs include instructions, which when executed by the electronic device, cause the electronic device to:

detect a second user input that includes a second input; and in response to detecting the second user input:

in accordance with a determination that the second input includes a swipe input in the second direction that is substantially opposite the first direction, scroll through notifications in a list of notifications including the first plurality of notifications in accordance with movement of the second input in the second direction.

40. The non-transitory computer readable storage medium of claim 29, wherein the first user input includes two or more consecutive swipe inputs in the first direction before the search input region is displayed as a result of the first user input.

41. The non-transitory computer readable storage medium of claim 29, wherein the one or more programs include instructions, which when executed by the electronic device, cause the electronic device to:
- prior to detecting the first user input, detect a third user input that includes a third input; and
- in response to detecting the third user input, in accordance with a determination that the third input includes a swipe input in the second direction that is substantially opposite the first direction, scroll through a list of notifications in accordance with the first direction to reveal the representation of the first plurality of notifications in the first user interface.

42. The non-transitory computer readable storage medium of claim 29, wherein the one or more programs include instructions, which when executed by the electronic device, cause the electronic device to:
- while the additional notification information is displayed, detect a fourth user input that includes a fourth input; and
- in response to detecting the fourth user input:
    - in accordance with a determination that the fourth input includes a swipe input in the first direction, display the search input region; and
    - in accordance with a determination that the fourth input includes a swipe input in the second direction that is substantially opposite the first direction, display a third plurality of notifications.

\* \* \* \* \*